(12) United States Patent
Wang et al.

(10) Patent No.: US 11,924,513 B2
(45) Date of Patent: Mar. 5, 2024

(54) DISPLAY APPARATUS AND METHOD FOR DISPLAY USER INTERFACE

(71) Applicant: JUHAOKAN TECHNOLOGY CO., LTD., Shandong (CN)

(72) Inventors: Guangqiang Wang, Shandong (CN); Xiaochun Xu, Shandong (CN); Zhezhe Liu, Shandong (CN); Xiangsheng Wu, Shandong (CN); Yuanyuan Li, Shandong (CN); Yinyang Chen, Shandong (CN); Yao Xie, Shandong (CN); Fanwen Zhang, Shandong (CN)

(73) Assignee: JUHAOKAN TECHNOLOGY CO., LTD., Shandong (CN)

( * ) Notice: Subject to any disclaimer, the term of this patent is extended or adjusted under 35 U.S.C. 154(b) by 156 days.

(21) Appl. No.: 17/455,575

(22) Filed: Nov. 18, 2021

(65) Prior Publication Data
US 2022/0072433 A1 Mar. 10, 2022

Related U.S. Application Data

(63) Continuation of application No. PCT/CN2020/109859, filed on Aug. 18, 2020.

(30) Foreign Application Priority Data

Aug. 18, 2019 (CN) .......................... 201910761455.8
Apr. 30, 2020 (CN) .......................... 202010364203.4
(Continued)

(51) Int. Cl.
*H04N 21/478* (2011.01)
*A63F 13/213* (2014.01)
(Continued)

(52) U.S. Cl.
CPC ......... *H04N 21/478* (2013.01); *A63F 13/213* (2014.09); *A63F 13/46* (2014.09); *A63F 13/814* (2014.09); *G06V 10/75* (2022.01)

(58) Field of Classification Search
CPC .................................................... A63F 13/814
See application file for complete search history.

(56) References Cited

U.S. PATENT DOCUMENTS 7,018,211 B1 * 3/2006 Birkholzer ............. A63B 69/00
434/257
7,559,841 B2 * 7/2009 Hashimoto ........... A63F 13/212
345/475
(Continued)

FOREIGN PATENT DOCUMENTS

CN 102185731 A 9/2011
CN 102724449 A 10/2012
(Continued)

OTHER PUBLICATIONS

Chinese Office Action, dated Mar. 2, 2022, from CN Application No. 202010429705.0 filed May 20, 2020.
(Continued)

Primary Examiner — Seng H Lim
(74) Attorney, Agent, or Firm — Workman Nydegger

(57) ABSTRACT

Disclosed are a display apparatus and a method for displaying a user interface. In response to a preset instruction, the display apparatus acquires local images to generate a local video stream, plays a local video picture, and displays a graphic element for identifying a preset expected position in a floating layer above the local video picture. When the moving target exists in the local video picture and an offset of a target position of the moving target in the local video picture relative to the expected position is greater than a preset threshold value, a prompt control for guiding the moving target to move to the expected position is presented (Continued)

in the floating layer above the local video picture according to the offset of the target position relative to the expected position.

18 Claims, 24 Drawing Sheets

(30) Foreign Application Priority Data

| | | | |
|---|---|---|---|
| May 9, 2020 | (CN) | ......................... | 202010386547.5 |
| May 15, 2020 | (CN) | ......................... | 202010412358.0 |
| May 20, 2020 | (CN) | ......................... | 202010429705.0 |
| May 22, 2020 | (CN) | ......................... | 202010440465.4 |
| May 22, 2020 | (CN) | ......................... | 202010444212.4 |
| May 22, 2020 | (CN) | ......................... | 202010444296.1 |
| May 27, 2020 | (CN) | ......................... | 202010459886.1 |
| May 29, 2020 | (CN) | ......................... | 202010479491.8 |
| Jul. 13, 2020 | (CN) | ......................... | 202010673469.7 |

(51) Int. Cl.
*A63F 13/46* (2014.01)
*A63F 13/814* (2014.01)
*G06V 10/75* (2022.01)

(56) References Cited

U.S. PATENT DOCUMENTS

| | | | |
|---|---|---|---|
| 9,195,304 B2 | 11/2015 | Shimomura et al. | |
| 9,283,429 B2* | 3/2016 | Aragones | A63B 24/00 |
| 10,282,914 B1 | 5/2019 | Tran et al. | |
| 11,273,342 B2* | 3/2022 | Mao | G06V 20/46 |
| 2002/0160823 A1* | 10/2002 | Watabe | A63F 13/54 463/7 |
| 2006/0046847 A1* | 3/2006 | Hashimoto | A63F 13/213 463/36 |
| 2011/0306398 A1* | 12/2011 | Boch | A63F 13/52 463/7 |
| 2012/0143358 A1* | 6/2012 | Adams | G06F 3/0482 700/92 |
| 2012/0183939 A1* | 7/2012 | Aragones | A63B 24/0062 434/247 |
| 2013/0338802 A1* | 12/2013 | Winsper | A63B 24/0075 700/92 |
| 2016/0216770 A1 | 7/2016 | Jang et al. | |
| 2017/0018117 A1 | 1/2017 | Chen et al. | |
| 2018/0130373 A1 | 5/2018 | Bernard-Paroly et al. | |
| 2018/0308524 A1 | 10/2018 | Muyal et al. | |
| 2019/0050137 A1 | 2/2019 | Mildrew et al. | |
| 2021/0060385 A1* | 3/2021 | Karlsson | A63B 24/0003 |
| 2022/0218209 A1* | 7/2022 | Shah | A61B 5/024 |

FOREIGN PATENT DOCUMENTS

| | | |
|---|---|---|
| CN | 103164024 A | 6/2013 |
| CN | 103764235 A | 4/2014 |
| CN | 105451330 A | 3/2016 |
| CN | 105898133 A | 8/2016 |
| CN | 106228143 A | 12/2016 |
| CN | 106570719 A | 4/2017 |
| CN | 106610993 A | 5/2017 |
| CN | 107045502 A | 8/2017 |
| CN | 107170456 A | 9/2017 |
| CN | 107423389 A | 12/2017 |
| CN | 107679742 A | 2/2018 |
| CN | 107909060 A | 4/2018 |
| CN | 107943291 A | 4/2018 |
| CN | 107968921 A | 4/2018 |
| CN | 108133739 A | 6/2018 |
| CN | 108537284 A | 9/2018 |
| CN | 108668123 A | 10/2018 |
| CN | 108853946 A | 11/2018 |
| CN | 108960002 A | 12/2018 |
| CN | 109068081 A | 12/2018 |
| CN | 109144247 A | 1/2019 |
| CN | 109168062 A | 1/2019 |
| CN | 109214231 A | 1/2019 |
| CN | 109284402 A | 1/2019 |
| CN | 109376705 A | 2/2019 |
| CN | 109741744 A | 5/2019 |
| CN | 109767786 A | 5/2019 |
| CN | 109886526 A | 6/2019 |
| CN | 107959881 A | 7/2019 |
| CN | 110012311 A | 7/2019 |
| CN | 110751026 A | 2/2020 |
| CN | 110753246 A | 2/2020 |
| CN | 110856042 A | 2/2020 |
| EP | 3226229 A1 | 10/2017 |
| JP | 2005185830 A | 7/2005 |
| WO | 2012161541 A2 | 11/2012 |

OTHER PUBLICATIONS

Chinese Office Action, dated Feb. 25, 2022, from CN Application No. 202010440465.4 filed May 22, 2020.
Chinese Office Action, dated Mar. 2, 2022, from CN Application No. 202010444212.4 filed May 22, 2020.
International Search Report, from PCT/CN2020/109859 filed Aug. 18, 2020, dated Nov. 2, 2020.
Chinese Office Action, from 202010386547.5 filed May 9, 2020, dated Jun. 28, 2021.
Chinese Office Action, dated Jun. 21, 2023, from CN Application No. 202010444296.1 filed May 22, 2020.
Jin, Xin et al., "Virtual Personal Trainer via the Kinect Sensor", 2015 IEEE 16th International Conference on Communication Technology (ICCT), Feb. 8, 2016, pp. 460-463.

* cited by examiner

DISPLAY APPARATUS AND METHOD FOR DISPLAY USER INTERFACE

The present application is a continuation application of International Application No. PCT/CN2020/109859 filed on Aug. 18, 2020, which claims priorities to Chinese patent application No. 201910761455.8, filed Aug. 18, 2019, Chinese patent application No. 202010386547.5, filed May 9, 2020, Chinese patent application No. 202010364203.4, filed on Apr. 30, 2020, Chinese patent application No. 202010412358.0, filed on May 15, 2020, Chinese patent application No. 202010429705.0, filed on May 20, 2020, Chinese patent application No. 202010459886.1, filed on May 27, 2020, Chinese patent application No. 202010440465.4, filed on May 22, 2020, Chinese patent application No. 202010444296.1, filed on May 22, 2020, Chinese patent application No. 202010444212.4, filed on May 22, 2020, Chinese patent application No. 202010479491.8, filed May 29, 2020, and Chinese patent application No. 202010673469.7, filed on Jul. 13, 2020, the entire contents of which are incorporated herein by reference.

FIELD

The present application relates to display apparatus, in particular to a display apparatus and a method for displaying a user interface.

BACKGROUND

With the continuous development of communication technologies, computers, smart phones, display apparatuses and other terminal devices become more and more popular. Also, users have increasing demands for the capabilities or services provided by the terminal devices. Display apparatuses, such as smart TVs, can provide the users with playback pictures, such as audios, videos and pictures, and are now attracting attention.

With the popularity of smart display apparatuses, the users have increasing demands leisure and entertainment activities through large screens of the display apparatuses. Based on the increasing time and money spent by families in interest cultivation and training on action activities, it can be seen that interest cultivation and training on the action activities, such as dance, gymnastics and fitness, are important for users.

Therefore, how to provide users with interest cultivation and training functions about the action activities through the display apparatuses to meet the needs of the users has become an urgent issue.

SUMMARY

In a first aspect, some embodiments of the present application provide a display apparatus, including: a display, configured to display a user interface, wherein at least one video window is displayed in the user interface, and at least one floating layer is displayed above the video window; an image collector, configured to collect local images to generate a local video stream; and a controller, configured to: control the image collector to collect the local images to generate the local video stream in response to an input preset instruction; play a local video picture in the video window, and display a graphic element for identifying a preset expected position in the floating layer above the local video picture; in response to no moving object existing in the local video picture, or at least one moving object existing in the local video picture and an offset of a target position of the moving object in the local video picture relative to the expected position being greater than a preset threshold value, present a prompt control for guiding the moving object to move to the expected position in the floating layer above the local video picture according to the offset of the target position relative to the expected position; and in response to the moving object existing in the local video picture and the offset of the target position of the moving object relative to the expected position being not greater than the preset threshold value, cancel displaying of the graphic element and the prompt control.

In a second aspect, some embodiments of the present application further provide a display apparatus, including: a display, configured to display a user interface, wherein the user interface includes a window for playing a video; and a controller, configured to: acquire an sample video in response to an input instruction for indicating playing the sample video, wherein the sample video includes a plurality of key clips, and key actions required to be practiced by a user are shown when the key clips are played; start playing the sample video in the window at a first speed; when the key clips start to be played, adjust a playing speed of the sample video from the first speed to a second speed; and when the key clips finish playing, adjust the playing speed of the sample video from the second speed to the first speed; wherein the second speed is different from the first speed.

In a third aspect, some embodiments of the present application provide a display apparatus, including: an image collector, configured to collect a local video stream; a display, configured to display a user interface, wherein the user interface includes a first playing window for playing an sample video and a second playing window for playing the local video stream; and a controller, configured to: acquire the sample video in response to an input instruction for indicating playing the sample video, wherein the sample video includes key clips and other clips different from the key clips, and key actions required to be practiced by a user are shown when the key clips are played; and play the sample video in the first playing window, and play the local video stream in the second playing window; wherein a speed of playing the other clips in the first playing window is a first speed, a speed of playing the key clips in the first playing window is a second speed, and the second speed is lower than the first speed; and a speed of playing the local video stream in the second playing window is a fixed preset speed.

In a fourth aspect, some embodiments of the present application provide a display apparatus, including: a display, configured to display a user interface, wherein the user interface includes a window for playing an sample video; and a controller, configured to: acquire the sample video in response to an input instruction indicating to play the sample video, wherein the sample video includes a plurality of key clips and other clips different from the key clips, and key actions required to be practiced by a user are shown when the key clips are played; start playing the sample video at a first speed in the window, and acquire an age of the user; when the age of the user is lower than a preset age, play the other clips in the sample video at the first speed and play the key clips in the sample video at a second speed, wherein the second speed is lower than the first speed; and when the age of the user is not lower than the preset age, play all the clips of the sample video at the first speed.

In a fifth aspect, some embodiments of the present application provide a display apparatus, including: a display, configured to play a video; and a controller, configured to:

acquire an sample video in response to an input instruction indicating to play the sample video, wherein the sample video is used for showing sample actions required to be practiced by a user when being played; when an age of the user is within a first age interval, play the sample video at a first speed; and when the age of the user is within a second age interval, play the sample video at a second speed; wherein the second speed is different from the first speed.

In a sixth aspect, some embodiments of the present application provide a display apparatus, including: an image collector, configured to collect local images to acquire a local video stream; a display, configured to display an sample video, the local video stream and/or a follow-up result interface; and a controller, configured to: acquire the sample video in response to an input instruction for indicating following the sample video, and acquire the local video stream, wherein sample actions required to be followed by a user are shown when the sample video is played; perform action matching on the sample video and the local video stream to generate a score corresponding to this follow-up process according to a matching degree of the local video stream and the sample video; and generate the follow-up result interface according to the score after the sample video finishes playing, wherein an experience score control for showing experience scores is disposed in the follow-up result interface, when the score is higher than a highest historical score of the sample video followed by the user, an experience score updated according to the score is showed in the experience score control, and when the score is not higher than the highest historical score, an experience score acquired before the follow-up process is shown in the experience score control.

In a seventh aspect, some embodiments of the present application provide a display apparatus, including: an image collector, configured to collect local images to acquire a local video stream; a display; and a controller, configured to: acquire an sample video in response to an input instruction for indicating playing the sample video, and acquire the local video stream, wherein the sample video includes a first video frame for showing sample actions required to be followed by a user, and the local video stream includes a second video frame for showing user actions; match the first video frame and the second video frame corresponding to each other, and generate a score corresponding to this follow-up process according to a matching result; and in response to the end of playing of the sample video, generate a follow-up result interface according to the score, wherein an experience score control for showing experience scores is disposed in the follow-up result interface, when the score is higher than a highest historical score of the sample video followed by the user, an experience score updated according to the score is showed in the experience score control, and when the score is not higher than the highest historical score, an experience score acquired before this follow-up process is shown in the experience score control.

In an eighth aspect, some embodiments of the present application provide a display apparatus, including: a display, configured to display a user interface, wherein the user interface includes a window for playing a video; an image collector, configured to collect local images; and a controller, configured to: pause an sample video in response to an instruction for indicating pausing the sample video played in the window, and display a target key frame, wherein the target key frame is a video frame for showing a key action in the sample video; after the sample video is paused, collect the local images through the image collector; determine whether a user action in the local images match the key action shown in the target key frame; when the user action in the local images match the key action shown in the target key frame, resume playing the sample video; and when the user action in the local images do not match the key actions shown in the target key frame, continue to pause the sample video.

In a ninth aspect, some embodiments of the present application provide a display apparatus, including: a display, configured to display a historical record page; and a controller, configured to: in response to an instruction for displaying a follow-up record page from a user, send a request for acquiring data to a server, wherein the request comprises a user identifier and is used for causing the server return at least one piece of historical follow-up record data according to the user identifier, and the historical follow-up record data includes data of a specified picture or specified identifier data for indicating that the picture does not exist; receive the at least one piece of historical follow-up record data; and generate the follow-up record page according to the received historical follow-up record data, wherein when the historical follow-up record data contains the data of the specified picture, a follow-up record including a first picture control is generated in the follow-up record page, and the first picture control is used for showing the specified picture; and when the historical follow-up record data contains the specified identifier data, a follow-up record including a first identifier control is generated in the follow-up record page, the first identifier control is used for showing a preset identifier element, and the preset identifier element is used for indicating that the specified picture does not exist.

In a tenth aspect, some embodiments of the present application provide a display apparatus, including: an image collector, configured to collect local images to acquire a local video stream; a display, configured to display a user interface, wherein the user interface includes a first video playing window for playing an sample video and a second video playing window for playing the local video stream; and a controller, configured to: acquire the sample video in response to an input instruction indicating to play the sample video, wherein the sample video includes a preset number of key frames, and each key frame shows a key action required to be followed up; play the sample video, and acquire local video frames corresponding to the key frames from the local video stream according to playing time of the key frames; perform action matching on the local video frames and the corresponding key frames, and acquire matching scores corresponding to the local video frames according to action matching degrees; and show a follow-up result interface in response to the end of playing the sample video, wherein the matching scores of the local video frames shown in the follow-up result interface are higher when a total score is higher than a preset value, the matching scores of the local video frames shown in the follow-up result interface are lower when the total score is not higher than the preset value, and the total score is acquired by calculating according to the matching scores of the local video frames.

In an eleventh aspect, some embodiments of the present application provide a display apparatus, including: a display, configured to display a page of an application; and a controller, configured to: acquire a first experience score and a second experience score, wherein the first experience score is an experience score acquired by a login user of the application in a current statistical period, and the second experience score is a sum of experience scores acquired by the login user in all statistical periods before the current statistical period; and display an application homepage according to the first experience score and the second experience score, wherein the application homepage includes controls for showing the first experience score and the second experience score.

In a twelfth aspect, some embodiments of the present application provide a display apparatus, including: a display, configured to display a page of an application; and a controller, configured to: acquire an experience score acquired by a login user of the application in the current statistical period and a total experience score acquired by the login user; and display an application homepage according to the experience score acquired in the current statistical period and the total experience score, wherein the application homepage includes controls for showing the experience score acquired in the current statistical period and the total experience score.

In a thirteenth aspect, some embodiments of the present application provide a method for displaying a user interface, wherein at least one video window is displayed in the user interface, and at least one floating layer is displayed above the video window; wherein the method includes: controlling an image collector to collect local images to generate a local video stream in response to a preset instruction; playing a local video picture in the video window, and displaying a graphic element for identifying a preset expected position in the floating layer above the local video picture; in response to at least one moving object existing in the local video picture and an offset of a target position of the moving object in the local video picture relative to the expected position being greater than a preset threshold value, presenting a prompt control for guiding the moving object to move to the expected position in the floating layer above the local video picture according to the offset of the target position relative to the expected position; and in response to the moving object existing in the local video picture and the offset of the target position of the moving object relative to the expected position being not greater than the preset threshold value, cancelling displaying of the graphic element and the prompt control.

DETAILED DESCRIPTION OF THE EMBODIMENTS

In order to enable those skilled in the art to better understand the present application, the embodiments of the present application will be clearly and fully described in combination with the accompanying drawings of the embodiments of the present application. It is apparent that the described embodiments are some, but not all, embodiments of the present application. Based on the embodiments of the present application, all other embodiments attained by one of ordinary skilled in the art without involving any inventive effort are within the scope of the present application.

Based on the exemplary embodiments illustrated in the present application, all other embodiments obtained by one of ordinary skilled in the art without involving any inventive effort are within the scope of the present application. Moreover, while the disclosure herein has been described in terms of one or more exemplary embodiments, it is understood that aspects of the disclosure may be individually incorporated into a single, complete embodiment.

The term "remote control", as used in the present application, refers to a component of an electronic device (such as a display apparatus disclosed in the present application), and may generally wirelessly control the electronic device within a short range of distance. The remote control is connected with the electronic device typically using infrared and/or radio frequency (RF) signals and/or Bluetooth, and may also include WiFi, wireless USB, Bluetooth, motion sensors, and other functional modules. For example, in a handheld touch remote control, a user interface in a touch screen replaces most of physical built-in hard keys in a general remote control.

The term "gesture", as used in the present application, refers to a user behavior for expressing an expected idea, action, purpose, or result through a change in hand shape or motion of the hand, etc.

Figure 1:
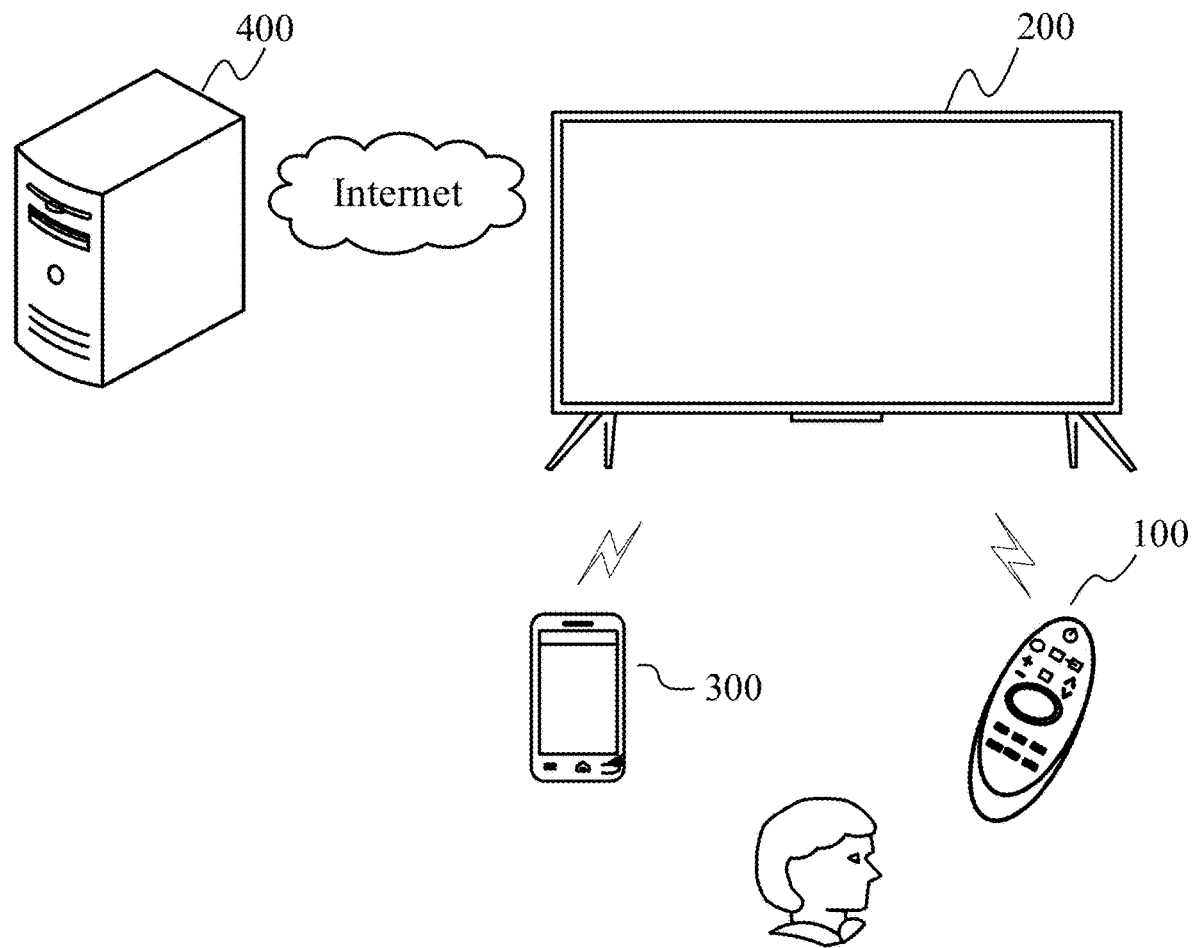
FIG. 1 illustrates a schematic diagram of an operation scenario between a display apparatus and a control device according to an embodiment.

FIG. 1 illustrates a schematic diagram of an operation scenario between a display apparatus and a control device according to embodiments. As shown in FIG. 1, a user can operate the display apparatus 200 through a mobile terminal 300 and the control device 100.

The control device 100 may be a remote control, including infrared protocol communication or bluetooth protocol communication, and other short-range communication means, so as to control the display apparatus 200 by wireless or other wired means. The user may control the display apparatus 200 by inputting user instructions through keys, a speech, a control panel, etc. on the remote control. For example, the user may input commands through a volume up/down key, a channel control key, an up/down/left/right direction key, a speech input key, a menu key, a power key and the like on the remote control to realize the function of controlling the display apparatus 200.

In some embodiments, mobile terminals, tablet computers, computers, notebook computers, and other smart devices may also be used to control the display apparatus 200. For example, the display apparatus 200 is controlled by using an application running on a smart device. The application may be configured to provide various controls to the user on a screen associated with the smart device and in an intuitive user interface (UI).

In some embodiments, the mobile terminal 300 may realize connection communication with software applications of the display apparatus 200 via a network communication protocol for one-to-one control operation and data communication purposes. For example, the mobile terminal 300 and the display apparatus 200 may establish an instruction protocol, a remote control keyboard may be synchronized to the mobile terminal 300, and the function of controlling the display apparatus 200 may be realized by controlling the user interface on the mobile terminal 300; or, audio and video content displayed on the mobile terminal 300 may be transmitted to the display apparatus 200 to realize the synchronous display function.

As also shown in FIG. 1, the display apparatus 200 also performs data communication with a server 400 in various communication manners. The display apparatus 200 may be allowed to communicate through a local area network (LAN), a wireless local area network (WLAN), and other networks. The server 400 may provide various contents and interactions to the display apparatus 200.

The display apparatus 200 may be a liquid crystal display, an organic light-emitting diode (OLED) display, or a projection display apparatus.

The display apparatus 200 may additionally provide a computer-supported smart network TV function in addition to a broadcast TV receiving function. In some embodiments, the display apparatus 200 includes a network TV, a smart TV, an internet protocol TV (IPTV), etc.

Figure 2:
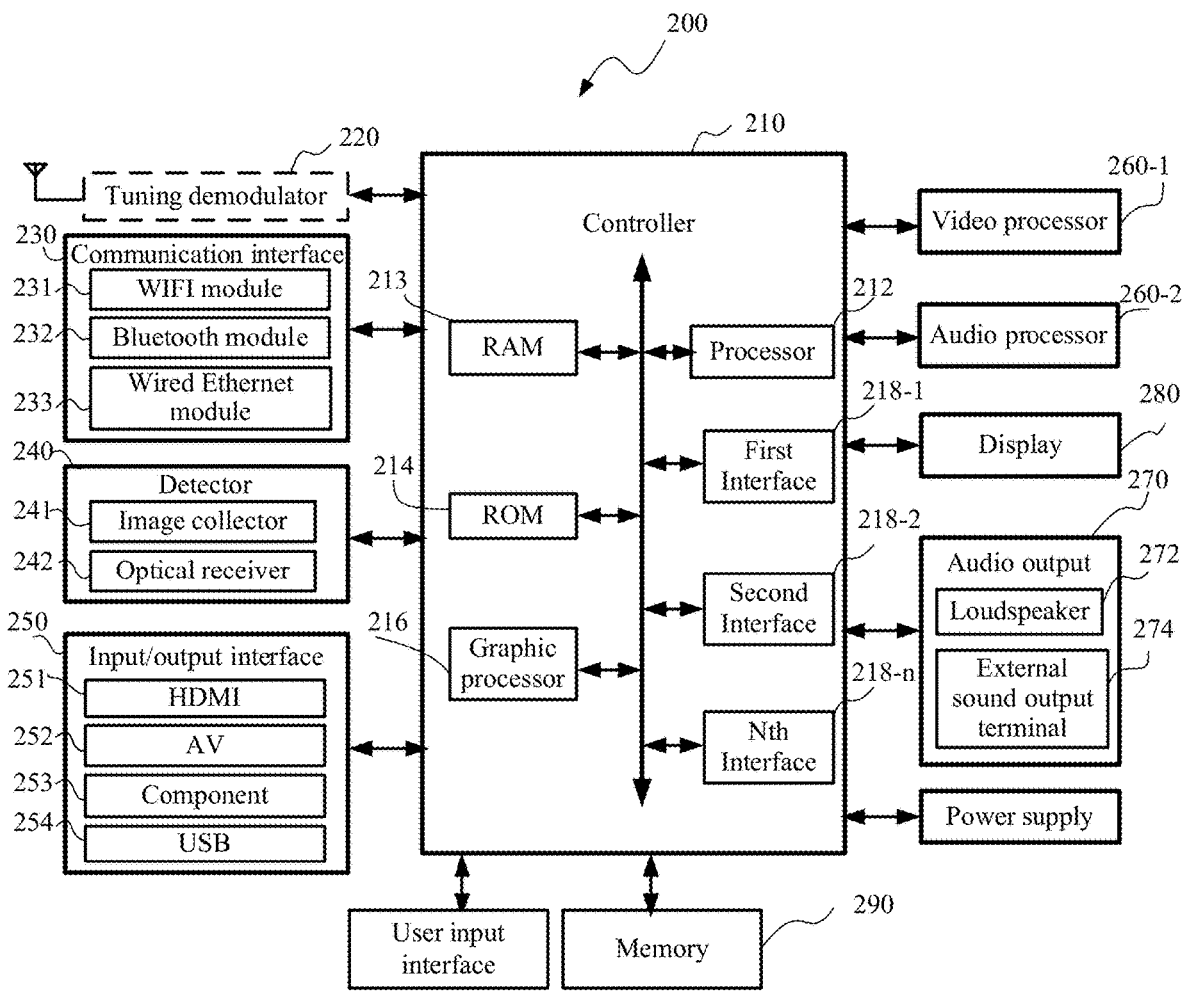
FIG. 2 illustrates a block diagram of hardware configuration of a display apparatus 200 according to an embodiment.

FIG. 2 illustrates a block diagram of hardware configuration of a display apparatus 200 according to the embodiment. As shown in FIG. 2, the display apparatus 200 includes at least one of a controller 210, a tuning demodulator 220, a communication interface 230, a detector 240, an input/output interface 250, a video processor 260-1, an audio processor 260-2, a display 280, an audio output 270, a memory 290, a power supply, and an infrared receiver.

The display 280 is a component configured to receive an image signal input from the video processor 260-1, so as to display video contents and images as well as a menu control interface. The display 280 includes a display screen component configured to present pictures, and a driving component configured to drive image display. The displayed video contents may come from broadcast TV contents, or be various broadcast signals that may be received through wired or wireless communication protocols. Or, various image contents received from a network server side through a network communication protocol may be displayed.

Meanwhile, the display 280 also displays a user interface (UI) generated in the display apparatus 200 and configured to control the display apparatus 200.

Based on different types of the display 280, the display 280 also includes a driving component configured to drive display. Or, if the display 280 is a projection display, the display 280 may also include a projection device and a projection screen.

The communication interface 230 is a component configured to communicate with external devices or external servers according to various communication protocol types. For example, the communication interface 230 may be a WiFi module 231, a bluetooth module 232, a wired ethernet module 233 or other network communication protocol chips or near field communication protocol chips, and an infrared receiver (not shown in the figure).

The display apparatus 200 may establish transmission and reception of control signal and data signal with an external control device or content providing device through the communication interface 230. The infrared receiver is an interface unit that may be configured to receive an infrared control signal of the control device 100 (such as an infrared remote control).

The detector 240 is configured to collect signals of the external environment or signals for interaction with the outside. The detector 240 includes a light receiver 242, that is a sensor configured to collect the intensity of ambient light and may adaptively display parameter changes and the like by collecting the ambient light.

The detector 240 also includes an image collector 241, such as a camera, that may be configured to collect external environment scenes, collect user attributes or interactive gestures with a user, and may adaptively change display parameters and recognize user gestures, so as to achieve the function of interacting with the user.

In other exemplary embodiments, the detector 240 may also include a temperature sensor or the like. For example, by sensing the ambient temperature, the display apparatus 200 may adaptively adjust the display color temperature of an image. For example, when the ambient temperature is relatively high, the image displayed by the display apparatus 200 may be adjusted to a cooler color temperature; or when the ambient temperature is relatively low, the image displayed by the display apparatus 200 may be adjusted to a warmer color temperature.

In other exemplary embodiments, the detector 240 may also include a sound collector or the like, such as a microphone, may be configured to receive voices of the user, including a speech signal of a command from the user to control the display apparatus 200, or to collect the ambient sound to recognize the ambient scene type. The display apparatus 200 may adapt to the ambient noise.

The input/output interface 250 is configured to transmit data between the display apparatus 200 and other external devices under control of the controller 210, for example, receive data such as video signals and audio signals from external devices, or commands and instructions, etc.

The input/output interface 250 may include, but is not limited to, any one or more of: a high-definition multimedia interface (HDMI) 251, an analog or data high-definition component input interface 253, a composite video input interface 252, a USB input interface 254, and an RGB port (not shown in the figure).

In other exemplary embodiments, the input/output interface 250 may also be a composite input/output interface formed by the multiple interfaces.

The tuning demodulator 220 receives broadcast TV signals through a wired or wireless manner, and may perform modulation and demodulation processing, and demodulate TV audio and video signals and EPG data signals carried by a frequency of a TV channel selected by the user from multiple wireless or wired broadcast TV signals.

The tuning demodulator 220 may be controlled by the controller 210 to respond to the TV signal frequency selected by a user and the TV signal carried by the frequency according to selection of the user.

The tuning demodulator 220 may receive signals in various ways, for example, terrestrial broadcasting, cable broadcasting, satellite broadcasting or internet broadcasting signals and the like based on different TV signal broadcast formats; or a digital modulation mode or an analog modulation mode based on different modulation types; or analog signals or digital signals based on different types of TV signals.

In other exemplary embodiments, the tuning demodulator 220 may also be disposed in an external device, such as an external set-top box. Thus, the set-top box outputs a TV audio/video signal through modulation and demodulation, and the TV audio/video signal is input into the display apparatus 200 through the input/output interface 250.

The video processor 260-1 is configured to receive an external video signal, and perform video processing such as decompression, decoding, scaling, noise reduction, frame rate conversion, resolution conversion, image synthesis and the like according to a standard encoding and decoding protocol of the input signal, thereby acquiring a signal that may be directly displayed or played on the display apparatus 200.

In some embodiments, the video processor 260-1 includes at least one of a demultiplexing module, a video decoding module, an image synthesis module, a frame rate conversion module, a display formatting module, etc.

The audio processor 260-2 is configured to receive an external audio signal, and perform decompression and decoding according to the standard coding and decoding protocol of the input signal, as well as processing such as noise reduction, digital-to-analog conversion, and amplification, thereby acquiring a sound signal that may be played in a loudspeaker.

In other exemplary embodiments, the video processor 260-1 may include one or more chips. The audio processor 260-2 may also include one or more chips.

In other exemplary embodiments, the video processor 260-1 and the audio processor 260-2 may be separate chips, or may be integrated with the controller 210 in one or more chips.

The audio output 270 receives the sound signal output from the audio processor 260-2 under the control of the controller 210, and includes a speaker 272, and an external sound output terminal 274 that may be output to an external sound-generating device other than the speaker 272 carried by the display apparatus 200 itself, such as: an external sound interface or headphone.

The power supply provides power supply support for the display apparatus 200 with power input from an external power supply under the control of the controller 210. The power supply may include a built-in power supply circuit installed inside the display apparatus 200, or a power supply installed outside the display apparatus 200, and provides a power interface for the external power supply in the display apparatus 200.

The user input interface is configured to receive a user input signal, and then send the received user input signal to the controller 210. The user input signal may be a remote control signal received through the infrared receiver, or various user control signals received through a network communication module.

In some embodiments, the user inputs a user command through the remote control 100 or the mobile terminal 300, the user input interface receives the user input, and the display apparatus 200 responds to the user input through the controller 210.

In some embodiments, the user may input the user command on a GUI displayed on the display 280, and the user input interface receives the command input from the user through the GUI. Or, the user may input the user command by inputting a specific sound or gesture, and the user input interface recognizes the sound or gesture through a sensor to receive the command input by the user.

The controller 210 controls the work of the display apparatus 200 and responds to user operations through various software control programs stored in the memory 290.

As shown in FIG. 2, the controller 210 includes a random access memory (RAM) 213 and a read-only memory (ROM) 214, a graphic processor 216, a central processing unit (CPU) 212, a communication interface 218, (such as a first interface 218-1 to an nth interface 218-*n*), and a communication bus. The RAM 213, the ROM 214, the graphic processor 216, the CPU 212, and the communication interface 218 are connected through the bus.

The controller 210 may control the overall operation of the display apparatus 100. For example, in response to receiving a user command to select a user interface (UI)

object to be displayed on the display 280, the controller 210 may perform an operation related to the object selected by the user command.

The object may be any one of the selectable objects, such as a hyperlink or an icon. Operations related to the selected object include displaying connection to hyperlink pages, documents, images, etc., or executing programs corresponding to the icon. The user command for selecting the UI object may be a command input through various input devices (for example, a mouse, a keyboard and a touch pad) connected to the display apparatus 200 or a speech command corresponding to the speech spoken by the user.

The memory 290 includes various software modules stored to drive the display apparatus 200. For example, the various software modules stored in the memory 290 include: a basic module, a detection module, a communication module, a display control module, a browser module, and various service modules.

For example, the speech recognition module includes a speech parsing module and a speech instruction database module. The display control module is configured to control the display 280 to display image contents, and may be configured to play information such as multimedia image contents and the UI. The communication module is configured to control and establish data communication with the external device. The browser module is configured to perform data communication between browsing servers. The service module is configured to provide various services and various applications.

At the same time, the memory 290 is also configured to store and receive external data and user data, images of various items in various user interfaces, and visual effect images of focus objects, etc.

Figure 3:
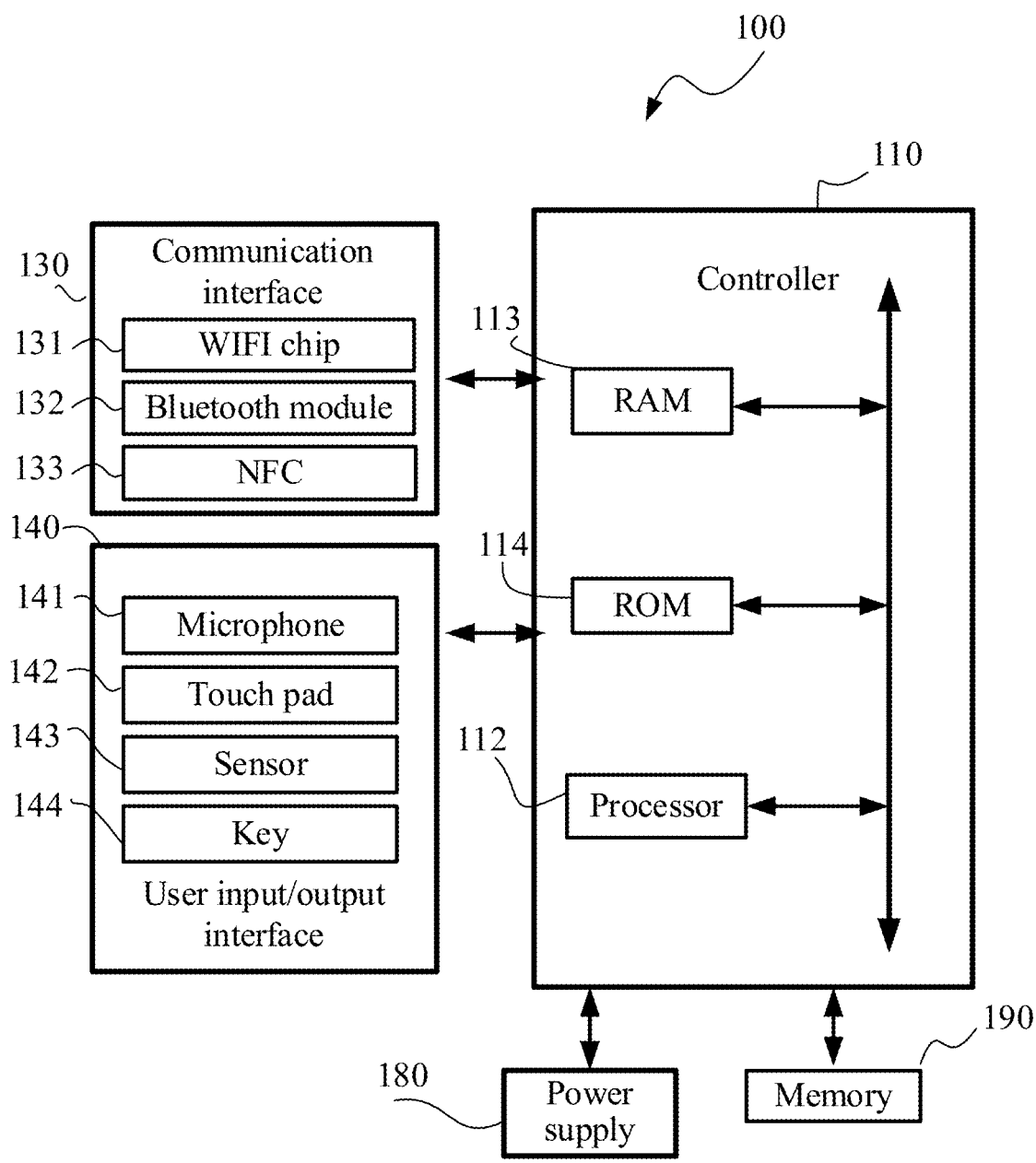
FIG. 3 illustrates a block diagram of hardware configuration of a control device 100 according to an embodiment.

FIG. 3 illustrates a block diagram of configuration of the control device 100 according to an embodiment. As shown in FIG. 3, the control device 100 includes a controller 110, a communication interface 130, a user input/output interface 140, a memory 190, and a power supply 180.

The control device 100 is configured to control the display apparatus 200, and may receive input operation commands from the user, and convert the operation commands into instructions that the display apparatus 200 may recognize and respond to, so as to serve as an intermediary between the user and the display apparatus 200. For example, the user operates a channel up/down key on the control device 100, and the display apparatus 200 responds to the channel up/down operation.

In some embodiments, the control device 100 may be a smart device. For example, various applications configured to control the display apparatus 200 may be installed on the control device 100 according to user requirements.

In some embodiments, as shown in FIG. 1, the mobile terminal 300 or other smart electronic devices may have a similar function to the control device 100 after applications that control the display apparatus 200 are installed. For example, the user may install various function keys or virtual buttons on the graphic user interface that may be provided on the mobile terminal 300 or other smart electronic devices by installing applications to realize the function of physical keys of the control device 100.

The controller 110 includes a processor 112, an RAM 113, an ROM 114, a communication interface 218, and a communication bus. The controller 110 is configured to control the running and operation of the control device 100, as well as communication and cooperation between internal components, and external and internal data processing functions.

The communication interface 130 realizes the communication of control signals and data signals with the display apparatus 200 under the control of the controller 110. For example, the received user input signal is sent to the display apparatus 200. The communication interface 130 may include at least one of a WiFi chip, a bluetooth module, a near field communication (NFC) module or other near field communication modules.

In the user input/output interface 140, the input interface includes at least one of a microphone 141, a touch pad 142, a sensor 143, a button 144 and other input interfaces. For example, the user may realize the user instruction input function through voices, touch, gestures, pressing and other actions. The input interface converts a received analog signal into a digital signal, converts the digital signal into a corresponding instruction signal, and sends the instruction signal to the display apparatus 200.

The output interface includes an interface for sending a user instruction to the display apparatus 200. In some embodiments, the output interface may be an infrared interface or a radio frequency interface. For example, when the output interface is the infrared signal interface, the user input instruction needs to be converted into an infrared control signal according to an infrared control protocol, and sent to the display apparatus 200 via an infrared sending module. For another example: when the output interface is the radio frequency signal interface, the user input instruction needs to be converted into a digital signal, and the digital signal is modulated according to a radio frequency control signal modulation protocol, and then sent to the display apparatus 200 by a radio frequency sending module.

In some embodiments, the control device 100 includes at least one of a communication interface 130 or an output interface. The communication interface 130, such as WiFi, bluetooth, NFC and other modules, is configured in the control device 100, and may encode the user input instruction through a WiFi protocol, or a bluetooth protocol, or an NFC protocol, and send the user input instruction to the display apparatus 200.

The power supply 180 is configured to provide power support for each element of the control device 100 under the control of the controller 110. The power supply 180 may be a battery and related control circuits.

Figure 4:
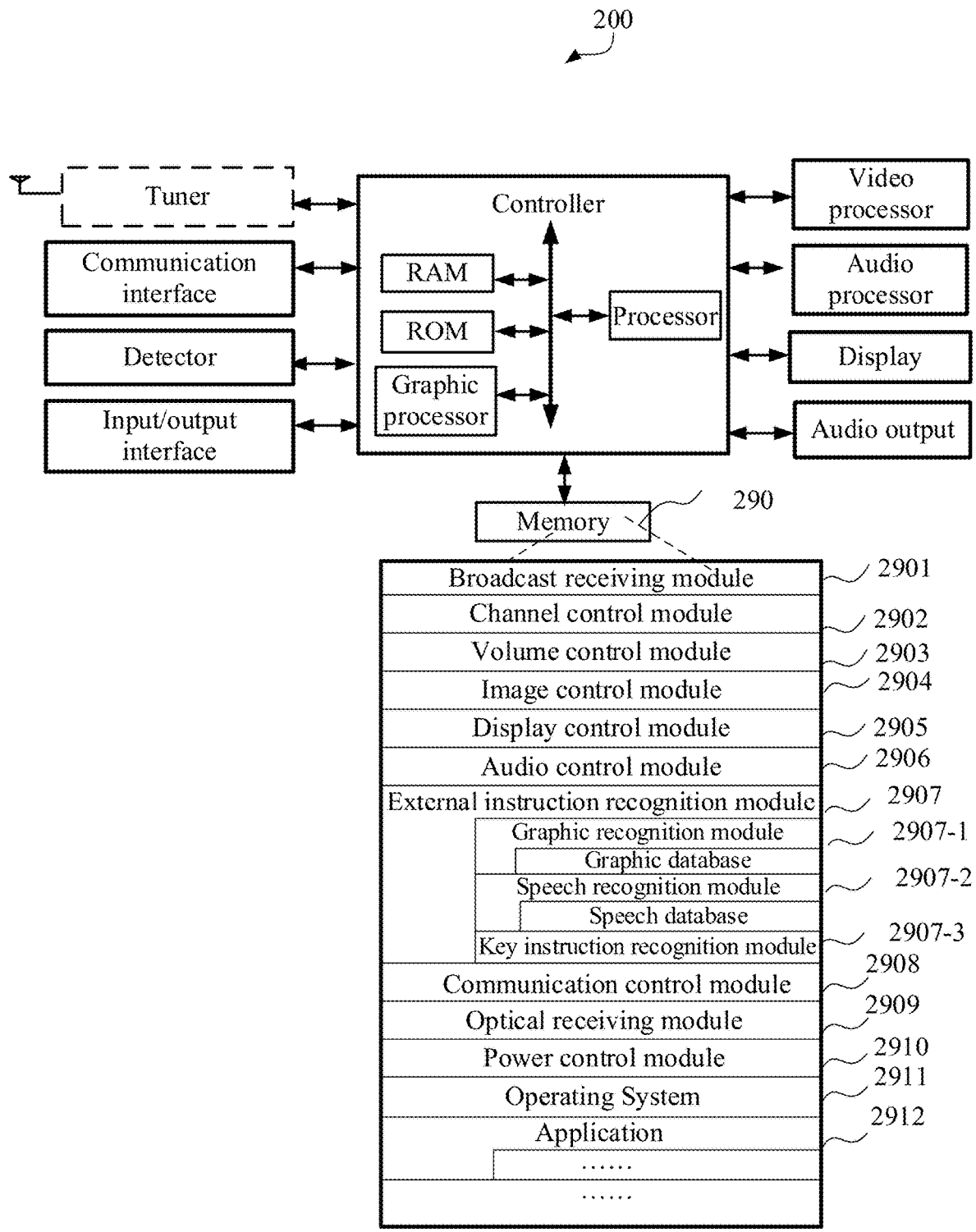
FIG. 4 illustrates a schematic diagram of functional configuration of a display apparatus 200 according to an embodiment.

FIG. 4 illustrates a schematic diagram of functional configuration of the display apparatus 200 according to an exemplary embodiment. As shown in FIG. 4, the memory 290 is configured to store the operating system, applications, contents, user data, etc., and drives the system running of the display apparatus 200 and responds to various operations of the user under the control of the controller 210. The memory 290 may include a volatile and/or nonvolatile memory.

The memory 290 is further configured to store the operating programs that drives the controller 210 in the display apparatus 200, various applications built in the display apparatus 200, various applications downloaded by the user from the external device, various graphic user interfaces related to the applications, various objects related to the graphics user interfaces, user data information, and various internal data of various supporting applications. The memory 290 is configured to store system software such as an operating system (OS) kernel, middleware, and applications, as well as to store input video data and audio data, and other user data.

The memory 290 is further configured to store driving programs and related data such as the video processor 260-1, the audio processor 260-2, the display 280, the communication interface 230, the tuning demodulator 220, the detector 240 and the input/output interface.

In some embodiments, the memory 290 includes at least one of a broadcast receiving module 2901, a channel control module 2902, a volume control module 2903, an image control module 2904, a display control module 2905, an audio control module 2906, an external instruction recognition module 2907, a communication control module 2908, an optical receiving module 2909, a power control module 2910, an operating system 2911, other applications 2912, a browser module, and so on. By running the various software and programs in the memory 290, the controller 210 executes the functions such as a receiving and demodulation function of the broadcast and TV signal, a TV channel selection control function, a volume selection control function, an image control function, a display control function, an audio control function, an external instruction recognition function, a communication control function, an optical signal receiving function, a power control function, a software control platform supporting various functions, a browser function and so on.

Figure 5:
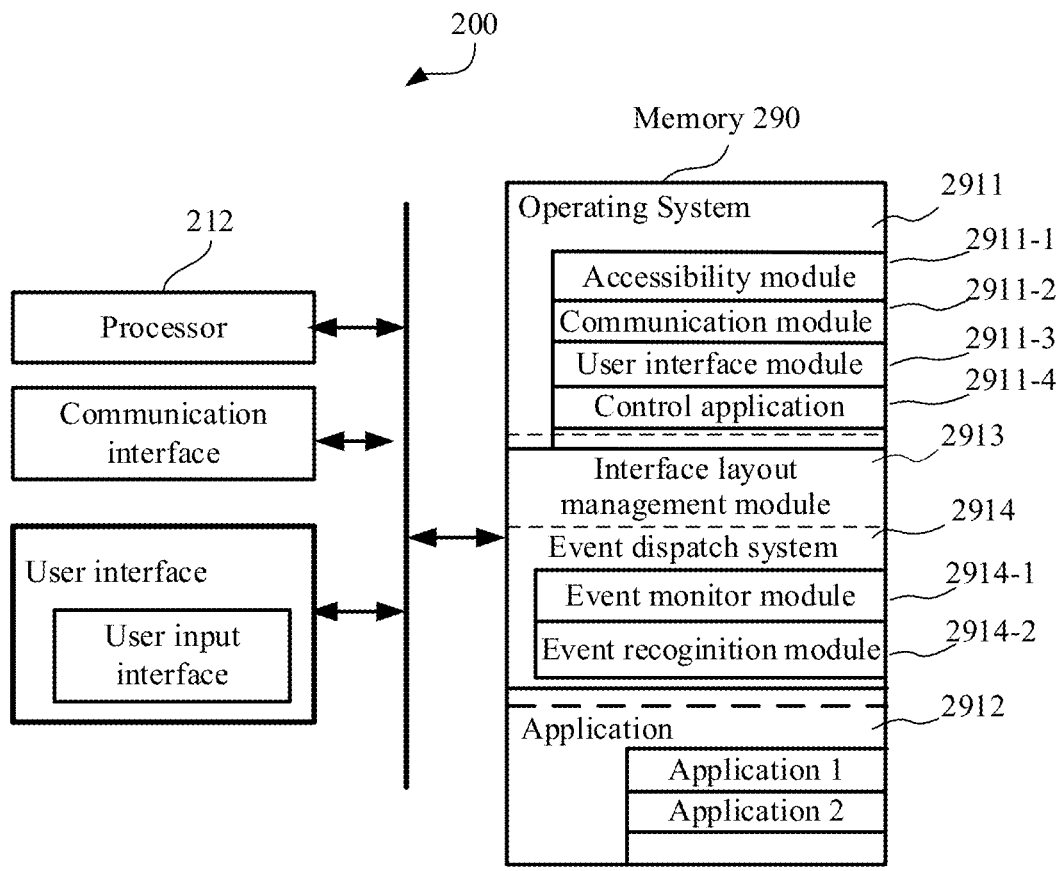
FIG. 5 illustrates a schematic diagram of software configuration in a display apparatus 200 according to an embodiment.

FIG. 5 illustrates a block diagram of configuration of a software system in the display apparatus 200 according to an exemplary embodiment.

As shown in FIG. 5, the operating system 2911 includes operating software configured to process various basic system services and execute hardware-related tasks, and serves as a medium configured to complete data processing between the applications and hardware components. In some embodiments, part of the operating system kernels may include a series of software to manage the hardware resources of the display apparatus and provide services for other programs or software codes.

In other embodiments, part of the operating system kernel may include one or more device drivers, and the device driver may be a set of software codes in the operating system to help operate or control a device or hardware associated with the display apparatus. The driver may contain codes to manipulate video, audio, and/or other multimedia components. In some embodiments, the drivers include drivers for the display screen, camera, Flash, WiFi, and audio.

An accessibility module 2911-1 is configured to modify or access an application to realize the accessibility of the application and the operability of display content of the application.

A communication module 2911-2 is configured to connect with other peripherals via related communication interfaces and communication networks.

A user interface module 2911-3 is configured to provide objects to display the user interface, so as to be accessed by various applications, thereby realizing user operations.

A control application 2911-4 is used for controlling process management, and includes a runtime application and the like.

An event dispatch system 2914 may be implemented in the operating system 2911 or the application 2912. In some embodiments, the event dispatch system 2914 is implemented in the operating system 2911 and the application 2912 at the same time.

An event monitor module 2914-1 is configured to monitor input events or sub-events from the user input interface.

An event recognition module 2914-2 is configured to input the definition of various events through the various user input interfaces, recognize various events or sub-events, and dispatch the events and sub-events to a processing program to process and execute the corresponding one or more groups of events or sub-events.

The events or sub-events refer to the input detected by one or more sensors in the display apparatus 200 and the input of an external control device (such as the control device 100), such as various sub-events of speech input, gesture input, and sub-events input through a remote control button instruction from the control device. In some embodiments, one or more sub-events in the remote control include multiple forms, including but not limited to one or a combination of up/down/left/right keys, an OK key; and operations of non-physical keys, such as moving, press, and release.

An interface layout manager 2913 directly or indirectly receives the user input events or sub-events monitored by the event dispatch system 2914, and is configured to update the layout of the user interface, including but not limited to the positions of controls or sub-controls on the interface, the size or position of the container, hierarchy, and other operations related to the interface layout.

Figure 6:
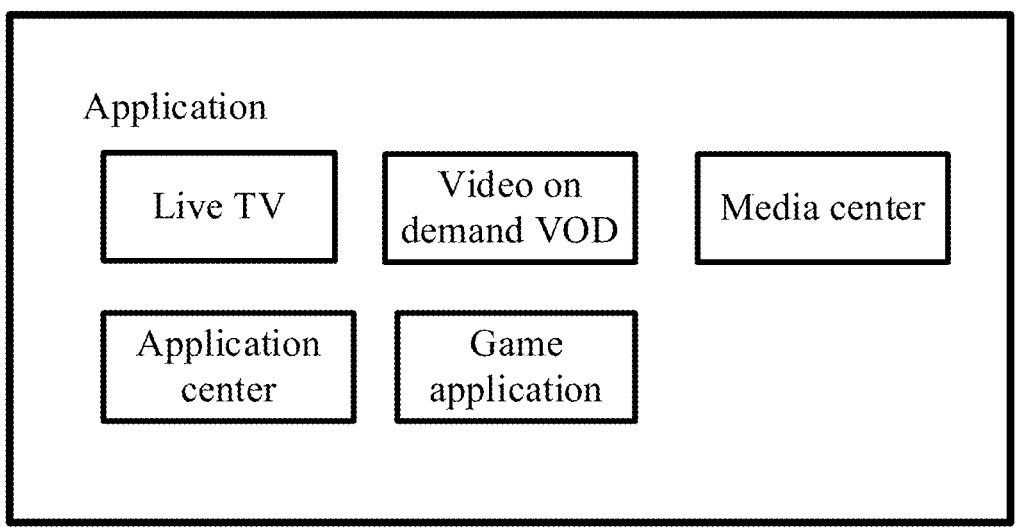
FIG. 6 illustrates a schematic diagram of configuration of an application in a display apparatus 200 according to an embodiment.

As shown in FIG. 6, the application layer 2912 contains various applications that may also be executed on the display apparatus 200. The applications may include, but are not limited to, one or more applications, such as at least one of a live TV application, a video-on-demand application, a media center application, an application center, and a game application.

Figure 7:
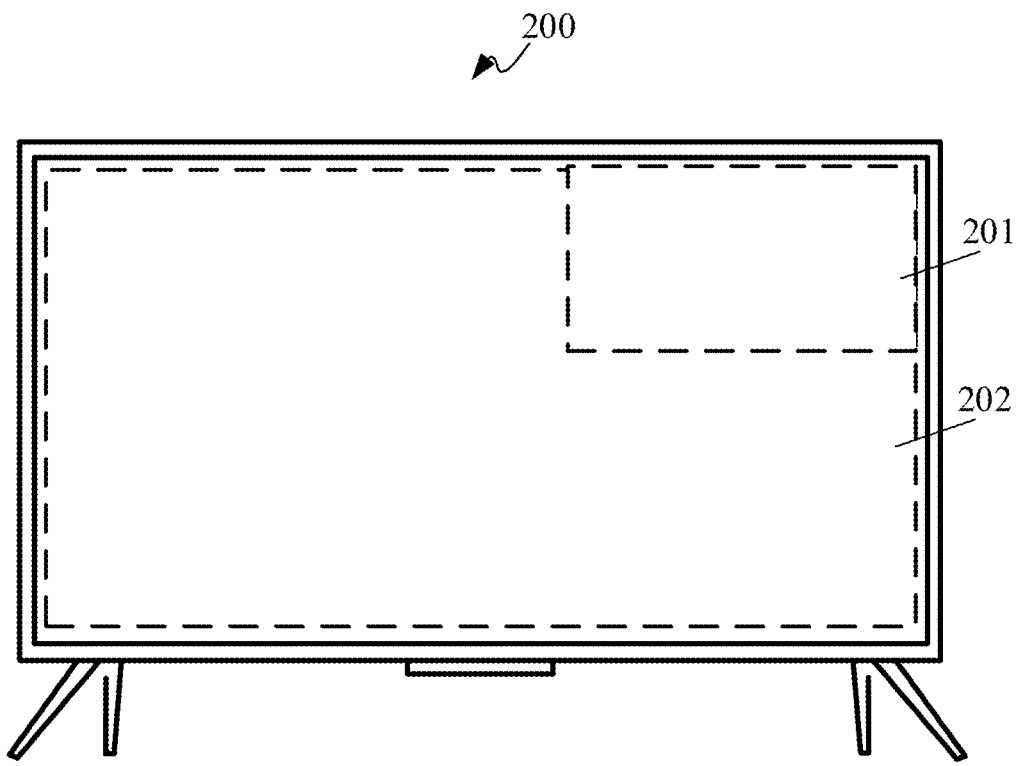
FIG. 7 illustrates a schematic diagram of a user interface in a display apparatus 200 according to an embodiment.

FIG. 7 illustrates a schematic diagram of a user interface in the display apparatus 200 according to an exemplary embodiment. As shown in FIG. 7, the user interface includes a plurality of view displaying regions. In some embodiments, the user interface includes a first view display region 201 and a playing image 202, and the playing image includes the layout of one or more different items. The user interface also includes a selector for indicating that an item is selected, and the different items may be selected by moving the position of the selector through user input.

It should be noted that the plurality of view display regions may present display images of different layers. For example, the first view displaying region may present the content of a video chat item, and the second view displaying region may present the content of an application layer item (such as, webpage videos, VOD display, application pictures, etc.).

Optionally, the presentation of different view displaying regions has different priorities, and the view displaying regions with different priorities are different in display priority. For example, the priority of a system layer is higher than the priority of an application layer. When the user acquires a selector and switches images in the application layer, image display in the view displaying region of the system layer is not blocked; and when the size and position of the view displaying region of the application layer are changed according to the user selection, the size and position of the view displaying region of the system layer will not be affected.

Images of the same layer may also be presented. In this case, the selector may be switched between the first view displaying region and the second view showing region; and when the size and position of the first view displaying region are changed, the size and position of the second view displaying region may be changed correspondingly.

In some embodiments, any region in FIG. 7 may display an image obtained by the camera.

In some embodiments, the controller 210 controls the work of the display apparatus 200 and responds to user operations related to the display 280 by running various software and control programs (such as the operating system and/or various applications) stored on the memory 290. For example, the display apparatus 200 is controlled to present the user interface on the display, and the user interface includes a number of UI objects; and in response to a user command for a UI object on the user interface, the controller 210 may perform operations related to the object selected by the user command.

In some embodiments, part or all of the steps in the embodiments of the present disclosure are implemented in the operating system and in the target application. In some embodiments, the target application for implementing part or all of the steps in the embodiments of the present application is called "kid Dancing", and is stored in the memory 290. The controller 210 runs the application in the operating system to control the work of the display apparatus 200 and respond to user operations related to the application.

In some embodiments, the display apparatus acquires a target application, various graphic user interfaces related to the target application, various objects related to the graphic user interface, user data information, and various internal data supporting the application from the server, and saves the data information in the memory.

In some embodiments, in response to the launch of the target application or a user operation on a UI object related to the target application, the display apparatus acquires media resources, such as image files and audio and video files, from the server.

It should be noted that the target application is not limited to running on the display apparatus shown in FIGS. 1-7, but other handheld devices that can provide speech and data connectivity and have wireless connectivity. Or, the target application may be connected to other processing devices of wireless modulator-demodulators, such as mobile phones (or "cellular" phones) and computers with mobile terminals. The target application may also be portable, pocket-sized, handheld, computer-built or vehicle-mounted mobile apparatuses that exchange data with a wireless access network.

Figure 8:
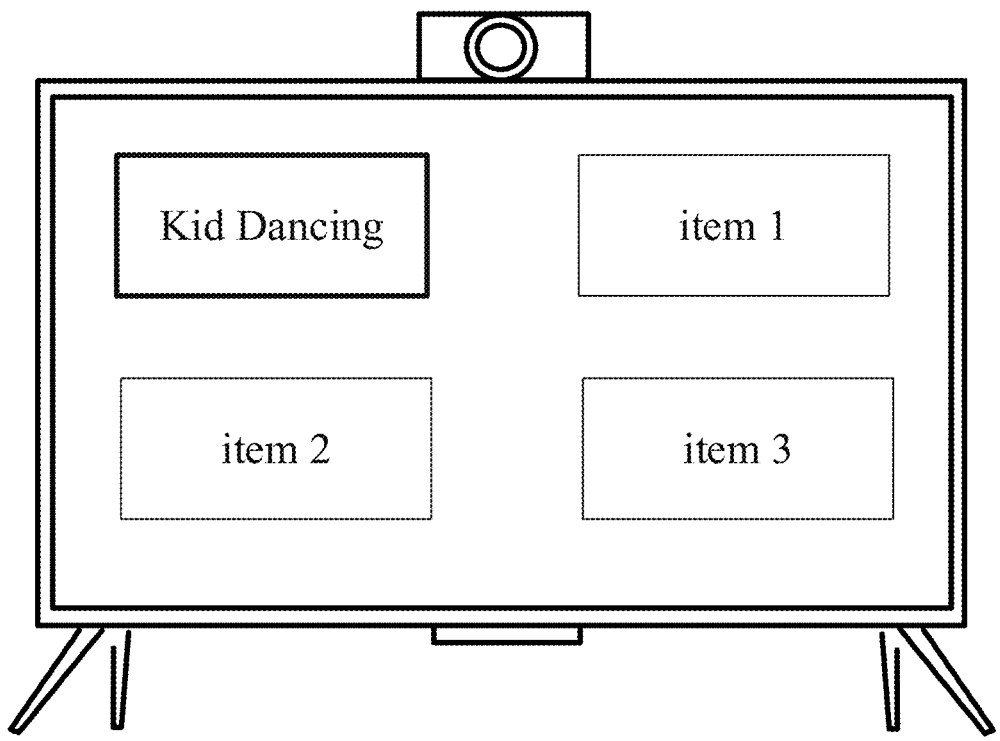
FIG. 8 illustrates a user interface according to an embodiment.

FIG. 8 illustrates a user interface according to the present disclosure, and the user interface is an implementation of a system homepage of the display apparatus. As shown in FIG. 8, the user interface displays a plurality of items (controls), including a target item for starting the target application. As shown in FIG. 8, the target item is the item "Kid Dancing". When the display displays the user interface as shown in FIG. 8, the user may operate the target item "Kid Dancing" by operating the control device (such as the remote control 100), and in response to the operation for the target item, the controller starts the target application.

In some embodiments, the target application refers to a functional module that plays a sample video in a first video window on the display screen. The sample video refers to a video showing sample actions and/or exemplary sounds. In some embodiments, the target application may also play a local video collected by the camera in a second video window on the display screen.

When the controller receives an input command for indicating starting a target application, the controller responds to the command to present a target application homepage on the display. An interface of the application homepage may display various interface elements such as icons, windows, and controls, including but not limited to a login account information showing region (a column box control), the user data (experience score/dancing performance score) showing region, a window control for playing a recommendation video, a related user list showing region and a media resource showing region.

In some embodiments, the login account information showing region may display at least one of a nickname, profile, member ID, and membership validity period of the user. The user data showing region may display user data related to the target application, such as the experience score/dancing performance score and/or corresponding star. The related user list showing region may display a ranking list of users (such as experience score ranking) within a predetermined geographic area within a predetermined time period, or may display a friend list of the user; and the ranking list or the friend list may display the experience score/dancing performance score and/or the corresponding star of each user. In the media resource showing region, media resources are displayed in categories. In some embodiments, a plurality of controls may be displayed in the media resource showing region, different controls correspond to different types of media resources, and the user may trigger the display of a corresponding type of media resource list by operating the control.

In some embodiments, the user data showing region and the login account information showing region may be the same showing region, for example, the user data related to the target application is displayed in the login account information showing region.

Figure 9:
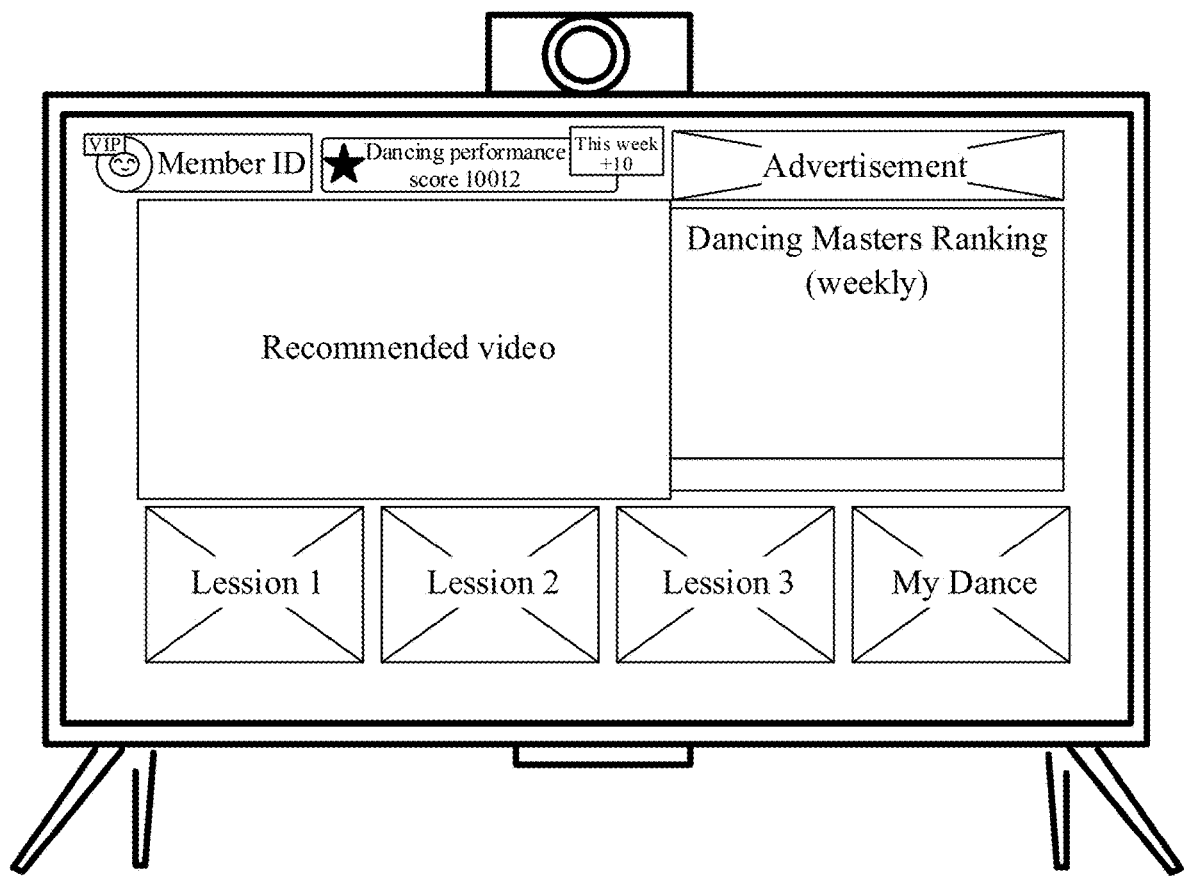
FIG. 9 illustrates a target application homepage according to an embodiment.

FIG. 9 illustrates an implementation of the above target application homepage. As shown in FIG. 9, member ID, etc., are shown in the login account information display region; the dancing performance score and the star of the user are shown in the user data display region; "Dancing Masters Ranking (weekly)" is shown in the related user list display region; and media resource type controls such as "Lesson 1", "Lesson 2", "Lesson 3" and "My Dance" are shown in the media resource display region; the user may check the media resource list of the corresponding type by operating the control device to operate the type controls; and the user may select a media resource video to follow from the media resource list of any type. Exemplarily, focusing on the "Lesson 1" control, a media resource list interface of "Lesson 1" is shown after receiving the confirmation operation of the user, and according to the media resource control selected by the user from the media resource list interface of "Lesson 1", a corresponding media resource file is loaded and played.

In addition, the interface shown in FIG. 9 also includes the window control for playing the recommended video, and an advertising space control. The recommended video may start to be played automatically in the window control as shown in FIG. 9, and may also be played in response to a playing instruction input from the user. For example, the user may move the position of the selector (focus) by operating the control device to make the selector fall into the window control for playing the recommended video. When the selector falls onto the window control, the user operates the "OK" key on the control device to input the instruction for indicating playing the recommended video.

In some embodiments, the controller acquires information to be displayed in the interface as shown in FIG. 9 from the server, such as the login account information, user data, related user list data and the recommended video, in response to the instruction for indicating starting the target application. The controller draws the interface as shown in FIG. 9 through the graphics processor according to the acquired information, and controls the interface to be presented on the display.

In some embodiments, the controller acquires the media resource (identifier) ID corresponding to the media resource control and/or a user identifier of the display apparatus according to the media resource control selected by the user, and sends a loading request to the server. The server queries the corresponding video data according to the media resource ID, and/or determines the authority of the display apparatus according to the user identifier, and feeds the acquired video data and/or authority information back to the display apparatus. The controller prompts the user for authority while playing the video data and/or video information according to the video data and/or the authority information.

In some embodiments, the above target application is not used as a separate application, but as a part of a JHK application as shown in FIG. 8, that is, as a functional module of the JHK application. In some embodiments, in addition to title controls such as "item 1", "item 2", "item 3", etc., TAB of an interactive interface includes a "Dancing" title control, and the user may move the focus to the different title controls to display corresponding title interfaces; for example, after the focus is moved to the "Dancing" title control, the interface shown in FIG. 9 is presented.

With the popularization of smart display apparatuses, users' demands for entertainment through large screens have become higher and higher, and more and more time and money need to be invested in interest cultivation. The present disclosure provides the users with a follow-up experience such as actions and/or sound (such as actions of dance, gymnastics, fitness and karaoke scenes) through the target application, so that the users may learn the actions and/or sound skills at home at any time.

In some embodiments, the media resource video displayed in the media resource list interface (such as the "Lesson 1" media resource list interface and the "Lesson 2" media resource list interface in the example) includes a sample video, including but not limited to videos for showing dancing actions, videos for showing fitness actions, videos for showing gymnastics actions, music videos (MVs) of songs played by the display apparatus or videos for showing virtual actions in the karaoke scene. In the embodiment of the present application, a teaching video is also referred to as the sample video. The user may make the same actions as the actions shown in the video while watching the sample video, thereby achieving the function of practicing dancing at home or keeping fit at home by using the display apparatus. To put it in a vivid perspective, this function may be referred to as "practicing while watching".

In some embodiments, "practicing while watching" scenarios include: a user (for example, a kid or adolescent) may practice dance steps while watching a dance teaching video, or the user (for example, an adult) may practice fitness actions while watching a fitness teaching video, or the user may communicate with a friend using a video connection to sing songs, and follow the MV videos or virtual images to do exercises while singing, and so on. For ease of explanation and distinction, in the "practicing while watching" scenes, the actions made by the user are referred to as user actions or follow-up actions, the actions shown in the video are referred to as sample actions, the video showing the sample actions is the sample video, and the local video acquired by the camera shows the user actions.

In some embodiments, if the display apparatus has an image collector (or referred to as the camera), the image collector may collect images or video streams of the user's follow-up actions, thereby recording the user's follow-up actions using pictures or videos as a carrier. Further, the user's follow-up actions are recognized based on these pictures or videos, the user's follow-up actions are compared with the corresponding sample actions, and the user's follow-up actions are evaluated based on the comparison.

In some embodiments, a time tag corresponding to a standard action frame may be preset in the sample video, action matching comparison is performed on an image frame at the time tag position and/or an adjacent position in the local video and the standard action frame, and then assessment is made based on the action matching degree.

In some embodiments, a time tag corresponding to a standard audio clip may be preset in the sample video, action matching comparison is performed on an audio clip at the time tag position and/or an adjacent position in the local video and the standard audio clip, and then assessment is made based on the action matching degree.

In some embodiments, the display interface of the display synchronously presents the local video stream (or local photos) collected by the camera and the sample video followed by the user on the display. The display interface has a first video window and a second video window, the first video window is used for playing the sample video, and the second video window is used for playing the local video. In this way, the user may directly watch their own follow-up actions, and intuitively find the shortcomings of the follow-up actions, so as to correct the follow-up actions in time.

When the display displays the interface shown in FIG. 9 or the media resource list interface after the interface shown in FIG. 9 receives an operation, the user may select and play the media resource videos to be practiced by operating a control device. For ease of explanation and distinction, a media resource video selected by the user to follow is collectively referred as a target video (that is, the sample video corresponding to the selected control) in the present disclosure.

In some embodiments, in response to an instruction for following the target video input from the user, the controller of the display apparatus acquires the target video from the server according to the media resource ID corresponding to the selected control, and detects whether the camera is connected. If the camera is found, the camera is controlled to raise and start to collect the local video stream, and display the loaded target video and the local video stream on the display at the same time. If no camera is found, only the target video will be played on the display.

In some embodiments, a display interface (i.e. a follow-up interface) in the follow-up process includes a first playing window and a second playing window. After the target video is loaded, in response to the camera not being found, the target video is displayed in the first playing window, and a preset prompt or blackout is displayed in the second playing window. In some embodiments, when no camera is found, a reminder for indicating no camera is displayed on a floating layer above the follow-up interface; the target video is played in the follow-up interface after the user makes a confirmation; and when the user enters an instruction for denying, the target application exits or the follow-up interface returns to a previous interface.

In the case where the camera is found, the controller sets the first playing window on a first image layer of the user interface, and sets the second playing window on a second image layer of the user interface. The acquired target video is played in the first playing window, and pictures of the local video stream are played in the second playing window. The first playing window and the second playing window may be presented in tiles, and presenting in titles means that a plurality of windows divide the screen into several areas and there is no overlap between the windows.

In some embodiments, the first playing window and the second playing window are formed by window components that are tiled on the same image layer and occupy different areas.

Figure 10A:
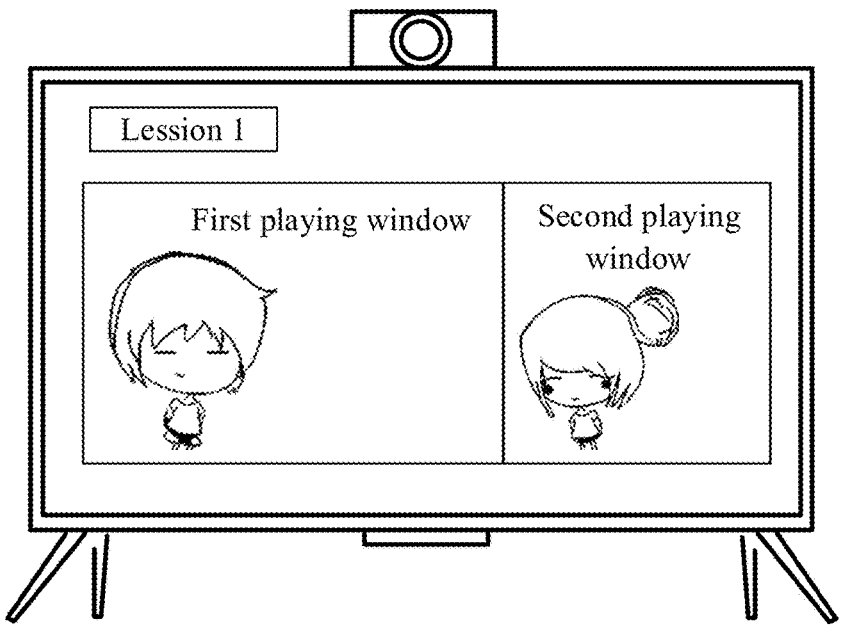
FIG. 10A illustrates a user interface according to an embodiment.

FIG. 10A illustrates a user interface. The user interface illustrates an implementation of the first playing window and the second playing window. As shown in FIG. 10A, a target video picture is displayed in the first playing window, a local video stream picture is displayed in the second playing window, and the first playing window and the second playing window are presented in tiles in a display region of the display. In some embodiments, the first playing window and the second playing window have different window sizes.

In a case where no camera is found, the controller plays the acquired target video in the first playing window, and displays a shield layer or a preset picture in the second playing window. The first playing window and the second playing window may be displayed in tiles.

Figure 10B:
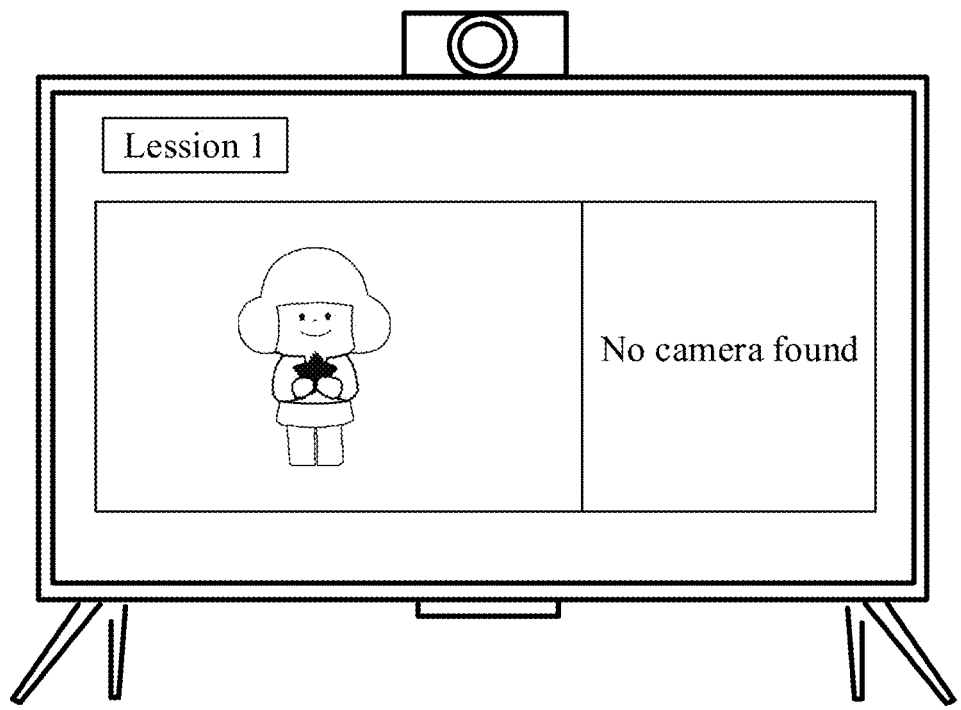
FIG. 10B illustrates another user interface according to an embodiment.

FIG. 10B illustrates another user interface, and the user interface illustrates another implementation of the first playing window and the second playing window. Different from FIG. 10A, in FIG. 10B, the first playing window displays the target video picture, the second playing window displays a shield layer, and the shield layer displays a preset text element of "No camera is found".

In other embodiments, in a case where no camera is found, the controller sets the first playing window in the first image layer of the user interface, and the first playing window is displayed in the display region of the display in a full-screen mode.

In some embodiments, in a case where the display apparatus has the camera, the controller, upon receiving the instruction for following a sample video from a user, enters the follow-up interface to directly play the sample video and the local video stream.

In other embodiments, the controller, upon receiving the instruction for indicating following the sample video, first enters a guidance interface in which only the pictures of the local video are displayed without playing the pictures of the sample video.

In some embodiments, since the camera is a camera which can be operated to hide within the display or behind the display when not in use, the controller is controlled to raise and turn on the camera when the camera is invoked, and "raise" means to cause the camera to expose out from a frame of the display, and "turn on" means to cause the camera to start image collection.

In some embodiments, in order to improve the shooting angle of the camera, the camera may move in a lateral or longitudinal direction, the lateral direction refers to a horizontal direction when the video is normally viewed, and the longitudinal direction refers to a vertical direction when the video is normally viewed. The acquired images may be adjusted by adjusting the focal length of the camera in the depth direction perpendicular to the display screen.

In some embodiments, when no moving object (i.e., a human body) exists in a local video picture, or when a moving object exists in the local video picture and an offset of a target position where the moving object is located relative to a preset expected position is greater than a preset threshold value, a graphic element for identifying the preset expected position is presented above the local video picture; and according to the offset of the target position relative to the expected position, a prompt control for guiding the moving object to move to the expected position is shown above the local video picture.

The moving object (a human body) is a local user, and in different scenarios, the moving object in the local video picture may be one or multiple. The expected position is a position set according to a collection region of the image collector, and when the moving object (i.e., the user) is at the expected position, the local images collected by the image collector are the most favorable for analyzing and comparing the user actions in the images.

In some embodiments, a graphic of the prompt control for guiding the moving object to move to the expected position includes an arrow graphic for indicating a direction, and an arrow of the arrow graphic points to the expected position.

In some embodiments, the expected position refers to a graphic box displayed on the display, and the controller sets the graphic box in a floating layer above the local video picture according to the position and angle of the camera as well as a preset mapping relationship, so that the user may intuitively see where he or she needs to move.

In the use process, the images collected by the camera may be different due to the difference of the lifting height and/or the rotation angle, and therefore the preset position of the graphic box needs to be adjusted accordingly, so that the user can be guided to stand at the preset position in front of the display apparatus, namely a desirable position.

In some embodiments, the position mapping relationship of the graphic box is as follows.

| raising height | Transversely left | Transversely right | Longitudinally upper | Longitudinally lower | position of the graphic box |
|---|---|---|---|---|---|
| 36.3 mm | 3° | — | — | — | upper left $(X_1, Y_1)$; lower right $(X_2, Y_2)$ |
| 36.3 mm | — | 3° | — | — | upper left $(X_1 - 3, Y_1)$; lower right $(X_2 - 3, Y_2)$ |
| 36.3 mm | — | — | 3° | — | upper left $(X_1, Y_1 + 3)$; lower right $(X_2, Y_2 + 3)$ |
| 36.3 mm | — | — | — | 3° | upper left $(X_1, Y_1 - 3)$; lower right $(X_2, Y_2 - 3)$ |
| 36.8 mm | 3° | — | — | — | upper left $(X_1, Y_1 + 3)$; lower right $(X_2, Y_2 + 3)$ |
| 36.8 mm | — | 3° | — | — | upper left $(X_1 - 3, Y_1 + 3)$; lower right $(X_2 - 3, Y_2 + 3)$ |

-continued

| raising height | Transversely left | Transversely right | Longitudinally upper | Longitudinally lower | position of the graphic box |
|---|---|---|---|---|---|
| 36.8 mm | — | — | 3° | — | upper left $(X_1, Y_1 + 6)$; lower right $(X_2, Y_2 + 6)$ |
| 36.8 mm | — | — | — | 3° | upper left $(X_1, Y_1)$; lower right $(X_2, Y_2)$ |

In some embodiments, the video window for playing the local video picture is in the first image layer, the prompt control and/or the graphic box is in the second image layer, and the second image layer is above the first image layer.

In some embodiments, the controller may display the video window for playing the local video picture in the second image layer on the display interface without loading the follow-up interface or placing the follow-up interface in a background page stack.

In some embodiments, the prompt control for guiding the moving object to move to the expected position may indicate an interface prompt of a target moving direction, and/or play a speech prompt of the target moving direction.

The target moving direction is acquired according to the offset of the target position relative to the expected position. It should be noted that when a moving object exists in the local video picture, the target moving direction is acquired according to the offset of the target position of the moving object relative to the expected position; and when there are a plurality of moving objects in the local video picture, the target moving direction is acquired according to the minimum offset of a plurality of offsets corresponding to the plurality of moving objects.

In some embodiments, the prompt control may be an arrow prompt, and the arrow direction of the arrow prompt may be determined based on the target moving direction, to point to the graphic element 112.

In some embodiments, the floating layer having a transparency greater than a preset transparency (e.g., 50%) is presented above the local video picture, such as a semi-transparent floating layer; and the graphic element for indicating the expected position is displayed in the floating layer so that the user may see the local video picture of the local video through the floating layer.

In some embodiments, another floating layer having a transparency greater than the preset transparency (e.g., 50%) is presented above the local video picture, and the graphic element for indicating the target moving direction is displayed in the floating layer as the prompt control for guiding the user moving position.

In some embodiments, the graphic element for indicating the expected position and the prompt control for indicating the target moving direction are displayed in the same floating layer.

Figure 11:
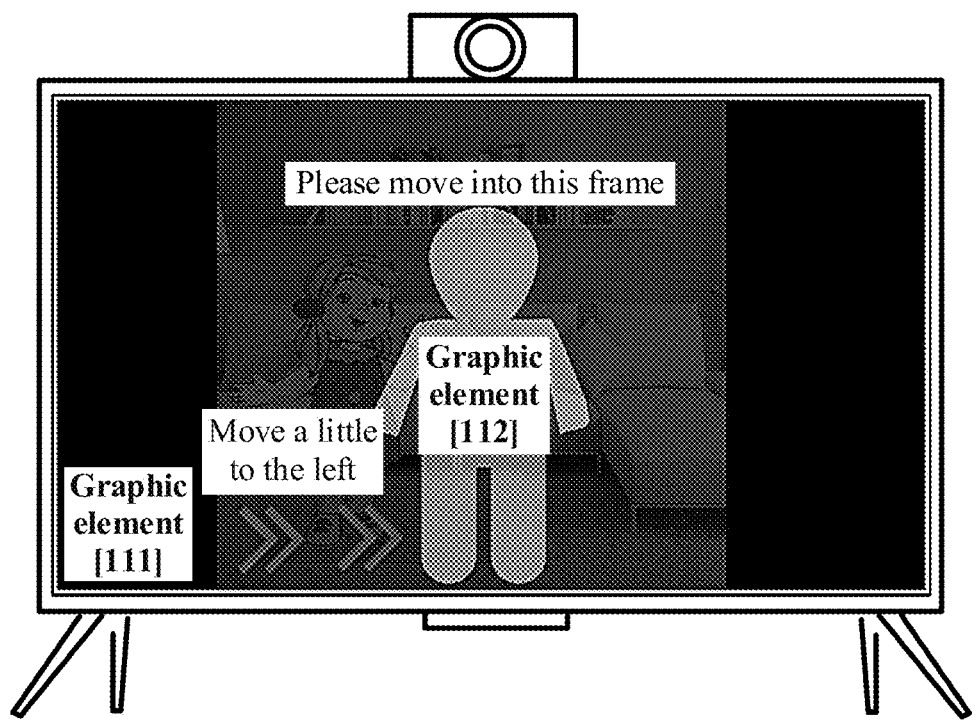
FIG. 11 illustrates a user interface according to an embodiment.

FIG. 11 illustrates a user interface. As shown in FIG. 11, the local video picture is displayed in the user interface substantially in a full-screen mode. A semi-transparent floating layer is displayed above the local video picture; in the semi-transparent floating layer, the target moving direction is identified by the graphic element 111; and the expected position is identified by the graphic element 112. The position of the graphic element 111 does not coincide with the position of the graphic element 112. The moving object (the user) may gradually move to the expected position according to the target moving direction indicated by the graphic element 111. When the moving object in the local video picture moves to the expected position, the contour of the moving object in the local video picture coincides with the graphic element 112 to the greatest extent. In some embodiments, the graphic element 112 is the graphic box.

In some embodiments, the target moving direction may also be identified by an interface text element, e.g., "move a little bit to the left" as illustrated in FIG. 11.

In some embodiments, the controller of the display apparatus receives a preset instruction, such as an instruction for indicating following the sample video; controls the image collector to collect the local images to generate the local video stream in response to the instruction; presents the local video picture in the user interface; and detects whether a moving object exists in the local video picture. When a moving object exists in the local video picture, the controller respectively acquires position coordinates of the moving object and the expected position in a preset coordinate system; the position coordinates of the moving object in the preset coordinate system are quantitative representations of the target position where the moving object is located; and the position coordinates of the expected position in the preset coordinate system are quantitative representations of the expected position. Furthermore, the controller calculates the offset of the target position relative to the expected position according to the position coordinates of the moving object and the expected position in the preset coordinate system.

The controller of the display apparatus receives the instruction for indicating following the target video, starts the image collector to collect the local video stream in response to the instruction, presents a preview picture of the local video stream in the user interface, and detects whether the moving object exists in the preview picture. When the moving object exists in the preview picture, the controller acquires position coordinates of the moving object in the preset coordinate system, and the position coordinates of the moving object in the preset coordinate system are quantitative representations of the target position where the moving object is located. Furthermore, the controller calculates the offset of the target position relative to the expected position according to the position coordinates of the moving object and the expected position in the preset coordinate system, and the position coordinates of the expected position in the preset coordinate system are quantitative representations of the expected position.

Figure 12:
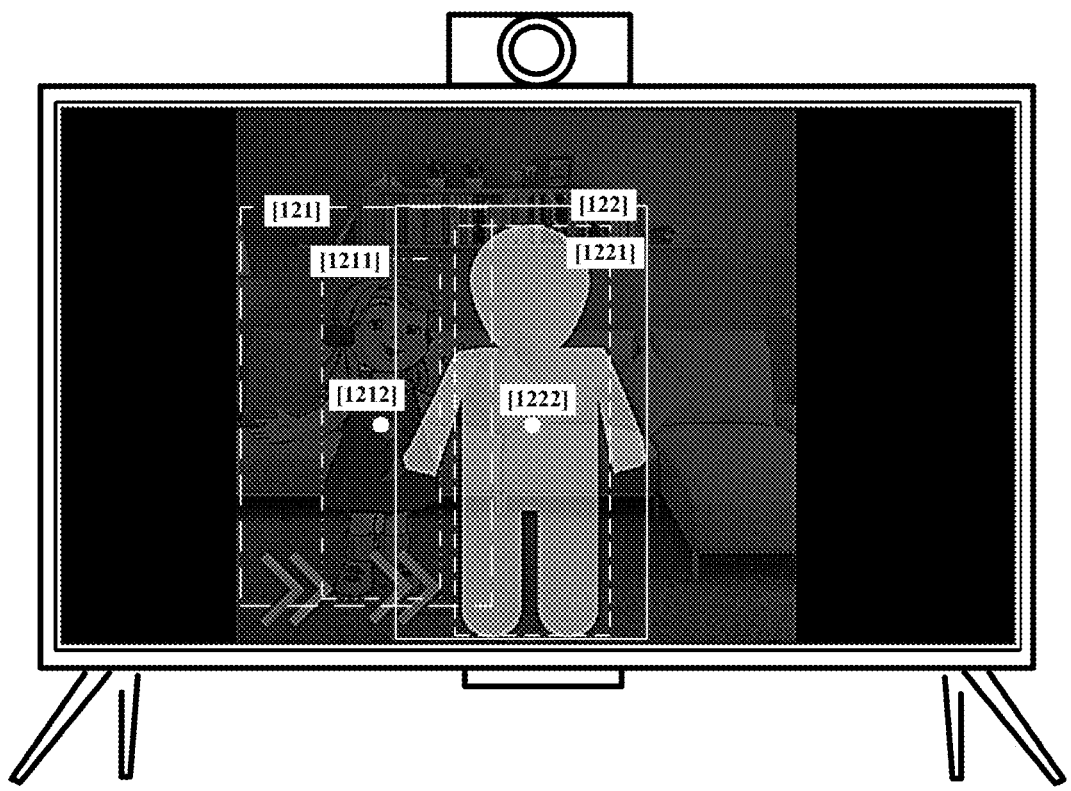
FIG. 12 illustrates a user interface according to an embodiment.

In some embodiments, the position coordinates of the moving object in the preset coordinate system may be a set of position coordinate points of the contour of the moving object (i.e., a target contour) in the preset coordinate system. FIG. 12 illustrates a target contour 121.

In some embodiments, the target contour includes a target trunk part and/or a target reference point, and the target reference point may be a midpoint of the trunk part or a center point of the target contour. FIG. 12 illustrates the truck part 1211 and the target reference point 1212. In the embodiments, acquiring the position coordinates of the moving object in the preset coordinate system includes: identifying the target contour from the preview picture, wherein the target contour includes a trunk part and/or a target reference point; and acquiring the position coordinates of the trunk part and/or the target reference point in the preset coordinate system.

In some embodiments, the graphic element for identifying the expected position includes a graphic truck part and/or a graphic reference point. The graphic reference point corresponds to the target reference point in the above embodiments; i.e., the graphic reference point is a midpoint of the graphic truck part if the target reference point is the midpoint of the truck part, and the graphic reference point is the center point of the graphic element if the target reference point is the center point of the target contour. FIG. 12 illustrates the graphic truck part 1221 and the graphic reference point 1222. In the embodiments, acquiring the position coordinates of the expected position in the preset coordinate system is to acquire the position coordinates of the graphic truck part and/or the graphic reference point in the preset coordinate system.

In some embodiments, the offset of the target position relative to the expected position is calculated based on the position coordinates of the target truck part in the preset coordinate system and the position coordinates of the graphic truck part in the preset coordinate system.

In some embodiments, the origin of the preset coordinate system may be any preset point. The following takes the origin being a pixel point at the lower left corner of the display screen as an example, and the truck part may be identified by using coordinates of two focus points or coordinates of at least two other points. The coordinates of the target truck part are (X1, Y1; X2, Y2), the coordinates of the graphic trunk part are (X3, Y3; X4, Y4), and thus the positional shift between the target truck part and the graphic trunk part is (X3-X1, Y3-Y1; X4-X2, Y4-Y2). The user may be altered according to the corresponding relationship between the offset and the prompt so as to enable the overlapping of the target truck part and the graphic truck part to meet the preset requirement.

In some embodiments, the offset of the target truck part and the graphic truck part may be calculated by the overlapping area of graphics. The user is reminded of successful position adjustment when the overlapping area reaches a preset threshold value or the ratio of the overlapping area reaches a preset threshold value.

In some embodiments, when the user moves left, the user is reminded of the successful position adjustment upon accomplishing the overlap of right borders of the target truck part and the graphic truck part, thereby ensuring the user fully falling into a recognition region.

In some embodiments, when the user moves right, the user is reminded of the successful position adjustment upon accomplishing the overlap of left borders of the target truck part and the graphic truck part, thereby ensuring the user fully falling into a recognition region by the user.

In other embodiments, the offset of the target position relative to the expected position is calculated based on the position coordinate of the target reference point in the preset coordinate system and the position coordinate of the graphic reference point in the preset coordinate system.

In some embodiments, the origin of the preset coordinate system may be any preset point. The following takes the origin being a pixel point at the lower left corner of the display screen as an example, the coordinate of the target reference point 1212 is $(X_1, Y_1)$, the coordinate of the graphic reference point 1222 is $(X_2, Y_2)$, and the position offset between the target reference point and the graphic reference point is $(X_2-X_1, Y_2-Y_1)$. When $X_2-X_1$ is positive, a prompt and/or "moving a little bit to the right" is given on the left side of the graphic element 112. When $X_2-X_1$ is negative, a prompt and/or "moving a little bit to the left" is given on the right side of the graphic element 112.

In some embodiments, the controller also acquires the focal distance of the position where the human body is located, and gives the user a prompt "moving front a little bit" or "moving right a little bit" according to the comparison between a preset focal distance and the focal distance of the position where the human body is located.

In some embodiments, according to a proportional relationship between the focal distance of the position where the human body is located and a preset focal distance, the controller further provides a specific distance for the user to move left or right according to an offset value of the user in the X direction. Exemplarily, when the proportional relationship is 0.8 and the offset value in the X direction is +800 pix, the user is prompted to move right 10 centimeters; and when the proportional relationship is 1.2 and the offset value in the X direction is +800 pix, the user is prompted to move right 15 centimeters. When the proportional relation is 0.8 and the offset value in the X direction is −800 pix, the user is prompted to move left 10 centimeters; and when the proportional relation is 1.2 and the offset value in the X direction is −800 pix, the user is prompted to move left 15 centimeters.

In some embodiments, the user is prompted of successful position adjustment when the offset value is smaller than a preset threshold value.

In some embodiments, the preset coordinate system is a three-dimensional coordinate system, therefore the position coordinates of the moving object and the expected position in the preset coordinate system are three-dimensional coordinates, and the offset of the target position relative to the expected position is a three-dimensional offset vector.

In some embodiments, assuming that the position coordinate of the target reference point in the preset coordinate system is (x, y, z) and the position coordinate of the graphic reference point in the preset coordinate system is (X, Y, Z), the offset vector of the target position relative to the expected position is calculated as (x-X, y-Y, z-Z).

In some embodiments, when the offset of the target position relative to the expected position is not greater than the preset threshold value, the display of the graphic element for identifying the expected position or the interface prompt for identifying the target moving direction is undone, and the first video window for playing the sample video and the second video window for playing the local video picture are set in the user interface. The second video window and the first video window are presented in tiles on the user interface. The local video picture is played in the second video window while the sample video is played in the first video window, such as the user interface shown in FIG. 10.

It should be noted that in the examples, the case where the target position has an offset relative to the expected position may be a case where the offset between the two is larger than a preset offset, and correspondingly, the case where the target position has no offset relative to the expected position may be a case where the offset between the two is smaller than the preset offset.

In the embodiments, the controller does not directly play the sample video to start the follow-up process after receiving the instruction for indicating following the sample video, but only shows the local video picture, and presents the graphic element for identifying the preset expected position and the prompt for guiding the moving object to move to the expected position above the local video picture, so that the moving object (the user) may move to the expected position. In this way, in the later follow-up process, the image collector may collect the images which are the most favorable for analyzing and comparing the user actions.

In some embodiments, the display apparatus may control the rotation of the camera in a transverse or longitudinal direction based on whether the display apparatus is placed in a horizontal or wall-mounted state. The rotation angles of the camera are different in different placement states under the same requirement. Exemplarily, under the same requirement, the longitudinally downward rotation angle when the display apparatus is placed in the horizontal state is greater than the longitudinally downward rotation angle when the display apparatus is placed in the wall-mounted state, so as to compensate for the impact of the lowered placement position.

The human body is continuously detected. In some embodiments, when the offset between the position coordinate of the target reference point in the preset coordinate system and the position coordinate of the graphic reference point in the preset coordinate system meets the preset requirement, and/or, the offset between the target truck part and the graphic truck part reaches the preset requirement, the controller controls to cancel the guidance interface and display the follow-up interface.

Part of Interface Changes.

Figure 13:
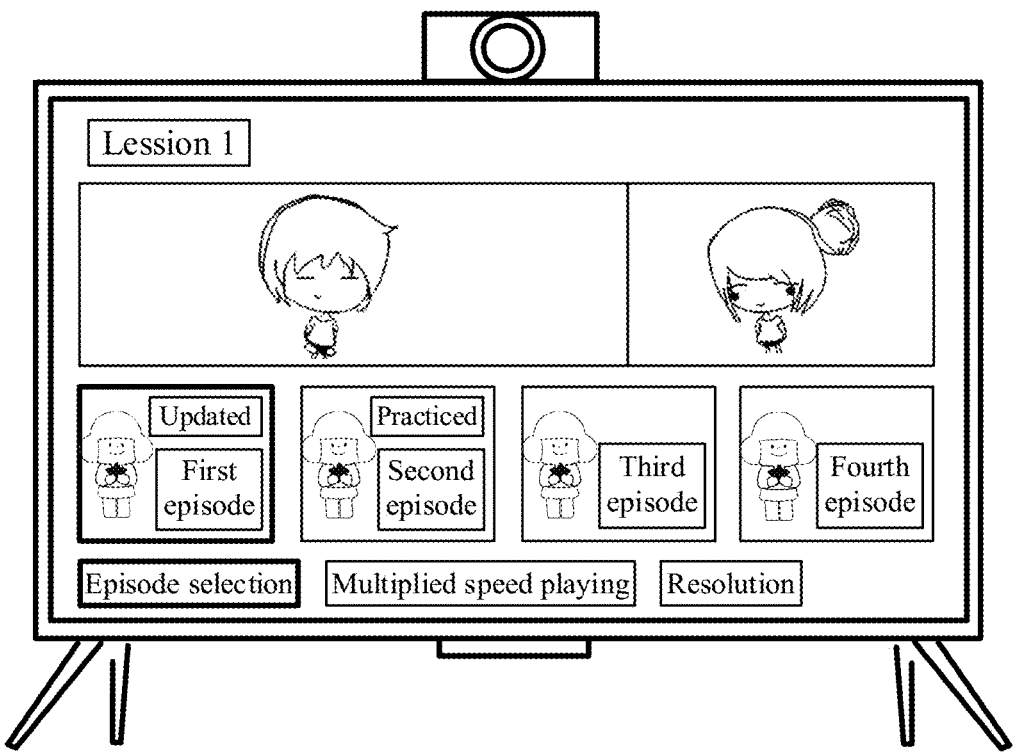
FIG. 13 illustrates a user interface according to an embodiment.
Figure 14:
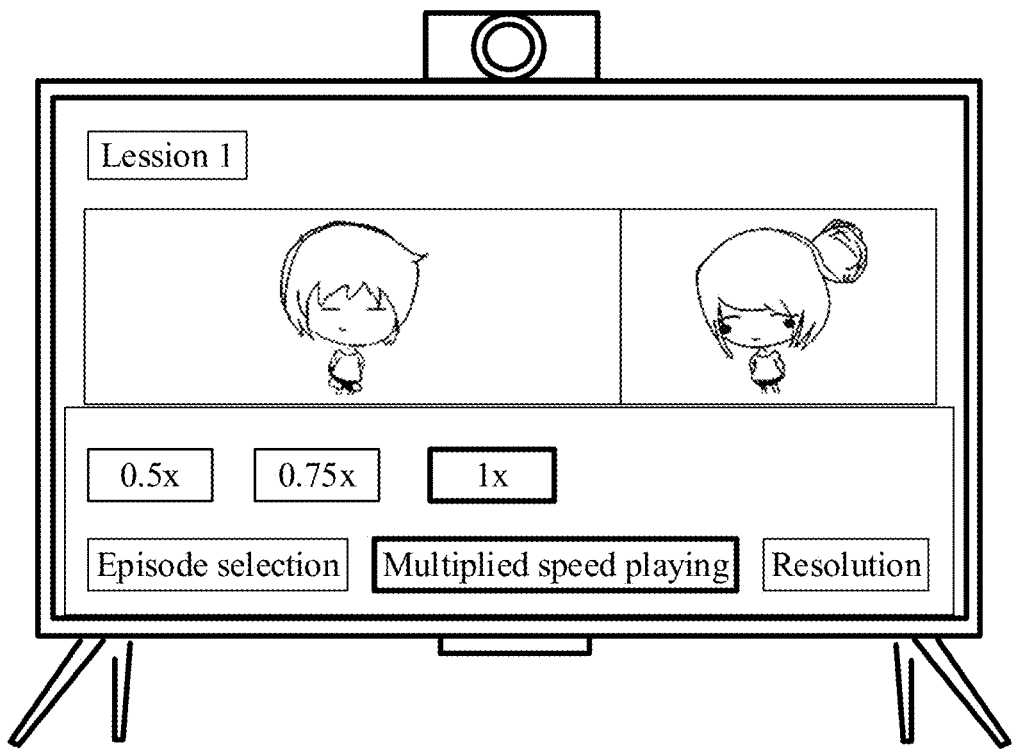
FIG. 14 illustrates a user interface according to an embodiment.

In some embodiments, a display displays an interface as shown in FIG. 10A while a user follows a certain media resource video. When the display displays the interface as shown in FIG. 10A, the user may operate a designated key on a control device (which may be a down key in some embodiments) to display a floating layer including controls. In response to the user operation, as shown in FIG. 13 or FIG. 14, the control floating layer is presented above a follow-up interface, and the control floating layer includes at least one of a control for selecting a media resource video, a control for adjusting the playing speed and a control for adjusting the display resolution. The user may move the focus by operating the control device to select the controls in the control floating layer. When the focus falls on a certain control, a sub-floating layer corresponding to the control is presented; and at least one sub-control is displayed in the sub-floating layer. For example, when the focus falls on a control for selecting the media resource video, the sub-floating layer corresponding to the control is presented, and a plurality of different media resource video controls are presented in the sub-floating layer. The sub-floating layer refers to the floating layer above the control floating layer. In some embodiments, the controls in the sub-floating layers may also be implemented by adding controls to the control floating layer.

FIG. 13 illustrates an application interface (a playing control interface), in the application interface, the control floating layer is displayed above an image layer in which a first playing window and a second playing window are located. The control floating layer includes an episode selection control, a multiplied speed playing control and a resolution control. Since the focus is located on the episode selection control, the sub-floating layer corresponding to the episode selection control is also presented in the interface, and controls of a plurality of other media resource videos are displayed in the sub-floating layer. In the interface shown as FIG. 13, the user may select other media videos to play and follow by moving the focus position.

In some embodiments, when the display displays the interface as shown in FIG. 13, the user may move the focus to select the multiplied speed playing control; and in response to the focus falling on the multiplied speed playing control, the sub-floating layer corresponding to the multiplied speed playing control is presented, as shown in FIG. 14. A plurality of sub-controls are displayed in the sub-floating layer corresponding to the multiplied speed playing control and used for adjusting the playing speed of a target video. When a certain sub-control is operated, the playing speed is adjusted to a speed corresponding to the operated control in response to the user operation. For example, "0.5×", "0.75×", and "1×" are displayed in the interface shown in FIG. 14.

Figure 15:
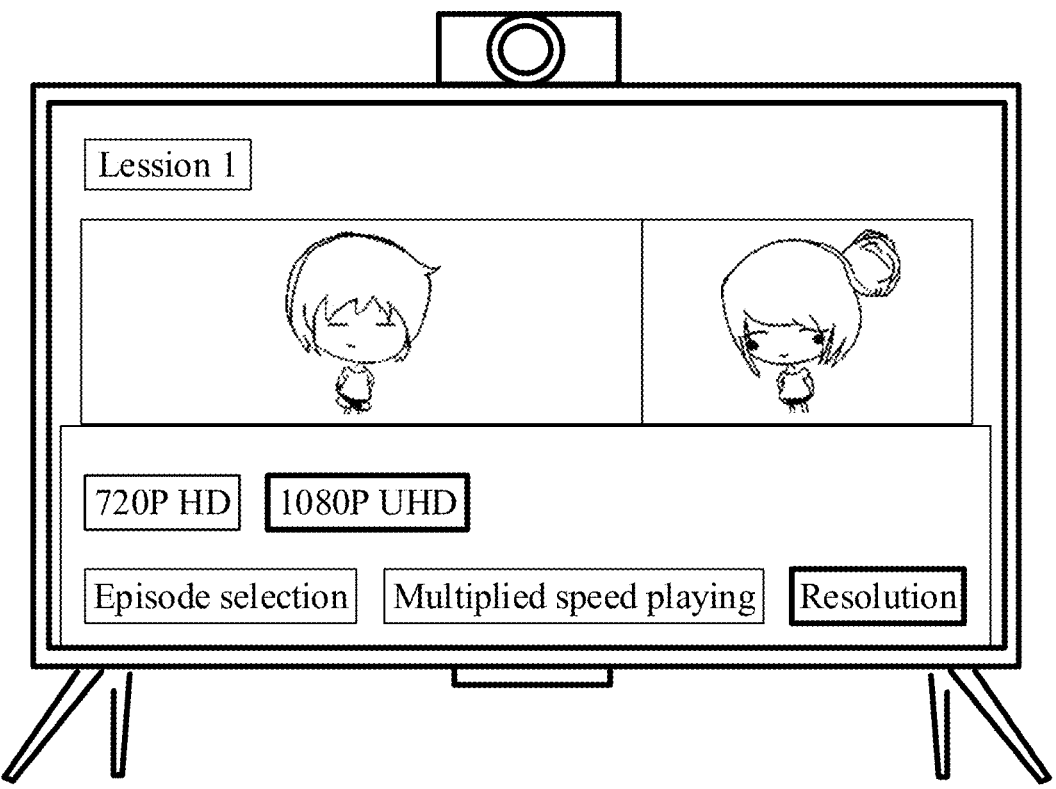
FIG. 15 illustrates a user interface according to an embodiment.

In other embodiments, when the display displays the interface as shown in FIG. 13 or FIG. 14, the user may move the focus to select the resolution control; and in response to the focus falling on the resolution control, the sub-floating layer corresponding to the resolution control is presented, as shown in FIG. 15. A plurality of controls are displayed in the sub-floating layer corresponding to the resolution control and used for adjusting the resolution of the target video. When a certain control is operated, the resolution is adjusted to a resolution corresponding to the operated control in response to the user operation. For example, "720P HD" and "1080P UHD" are displayed in the interface shown in FIG. 15.

In some embodiments, when the control floating layer is presented in response to the user operation, the focus is displayed on a preset default control which may be any one of the plurality of controls in the control floating layer. For example, as shown in FIG. 13, the preset default control is the episode selection control.

In some embodiments, other media resource videos displayed in the sub-floating layer corresponding to the episode selection control are issued by a server to a display apparatus. For example, in response to a user's selection for the episode selection control, the display apparatus requests media resource information, such as a resource name or a resource cover page, that needs to be displayed in an episode selection list from the server. After receiving media resource information returned by the server, the display apparatus controls the media resource information to be displayed in the episode selection list.

In some embodiments, to facilitate the user to distinguish media resources in the episode selection list, after receiving the request from the display apparatus, the server queries the user's historical follow-up records based on a user ID to acquire a media resource video that the user has practiced. If the media resource information issued to the display apparatus includes the media resource video that the user has practiced, an identifier indicating that the user has practiced the video is added to the media resource information corresponding to the media resource video. Correspondingly, when the display apparatus displays the episode selection list, the media resource video that the user has practiced is identified. For example, a "Practiced" logo is displayed in an interface shown in FIG. 13.

In some embodiments, to facilitate the user to distinguish the media resources in the episode selection list, after receiving the request from the display apparatus, the server determines whether there are newly added resources in the episode selection list resources requested by the display apparatus. For example, the server may determine whether there are newly added resources by comparing episode selection list resources issued to the display apparatus last time with the current episode selection list resources, and if yes, an identifier indicating that the video is a newly added video is added into the resource information corresponding to the newly added media resources. Correspondingly, when the display apparatus displays the episode selection list, the newly added media resource video is identified. For example, "Updated" is displayed in the interface shown in FIG. 13.

Low Multiplied Speed Playing Embodiments ×3.

In some embodiments, a controller is configured to, in response to an instruction for following an sample video from a user, acquire the sample video from a service end or acquire a pre-downloaded sample video from a local storage based on a resource identifier of the sample video.

In some embodiments, the sample video includes the image data and audio data. The image data include a video frame sequence which shows a plurality of actions required to be followed by the user, such as a leg lifting action and a squatting action. The audio data may then be audio with comments and/or background sound audio (e.g., background music) of sample actions.

In some embodiments, the controller controls a video processor to process the sample video, so as to parse a displayable image signal and audio signal therefrom. The audio signal is played synchronously with the image signal after being processed by an audio processor.

In some embodiments, the sample video includes the image data, the audio data, and subtitle data corresponding to the audio data; and the controller synchronously plays the images, the audio, and subtitles while playing the sample video.

As previously described, the sample video includes the video frame sequence, and frames in the video frame sequence are displayed in time order under the control of the controller, thereby showing the user with a body shape change to make each action. The user needs to undergo a body shape change when completing each action, and the embodiment of the disclosure analyzes and evaluates the performance that the user completes the actions according to the recorded body shapes. In some embodiments, a movement model of joint points is acquired in advance according to the video frame sequence in the sample video; and continuous joint point data is extracted from a local video in a follow-up process, and compared with the movement model of the joint points acquired in advance, to determine a matching degree of the actions.

In some embodiments, a body shape change process (i.e., a movement trajectory of the body) that needs to be done to complete a key action is described as a completion process from an uncompleted state action to a completed state action and then to a release action; that is, the uncompleted state action comes before the completed state action, and the release action comes after the completed state action. The completed state action is the key action to be completed. In some embodiments, the completed state action may also be referred to as a key sample action or the key action. In some embodiments, tags may be added to identify the body change process, and different tags are preset at action frames of actions for different points.

In view of the above, in some embodiments, frames showing the key actions in the video frame sequence included in a media resource video are referred to as key frames, and key tags corresponding to the key frames are labeled on a time axis of the media resource video; that is, time indicated by the key tags is time at which the key frames corresponding to the key tags are played. In addition, the key frames in the video frame sequence establish a key frame sequence.

Further, the sample video may include the key frame sequence. The key frame sequence includes a plurality of key frames, one key frame corresponds to one key tag on the time axis, and one key frame shows one key action. In some embodiments, the key frame sequence is also referred to as a first key frame sequence.

In some embodiments, N groups of start-end tags are preset on the time axis of the media resource video (including the sample video), and correspond to N video clips, respectively. Each video clip shows one action (or the completed state action or key action). Each group of start-end tag includes a start tag and an end tag. In the process of playing the media resource video (including the sample video), when a progress identifier on the time axis moves to a certain start tag, it means that an exemplary process corresponding to a certain action starts to be played; and when the progress identifier on the time axis moves to the end tag, it means that the exemplary process of the certain action finishes playing.

Due to different personal factors such as learning ability and physical coordination of different users, some users (for example, children) are slow to move, so that it is difficult to achieve synchronization with the playing speed of the sample video.

In view of the above issue, in some embodiments, in the process of playing the sample video, when the exemplary process of a certain action starts to play, the playing speed of the sample video is automatically reduced so that the user may better learn and practice the key actions, so as to avoid missing the key actions and improve his own actions in time. When the exemplary process of the action (i.e., the video clip showing the action) finishes playing, the playing speed automatically restores to an original playing speed.

In some embodiments, the video clips showing the key actions are referred to as key clips, and one sample video generally includes a plurality of key clips and at least one non-key clip (also called other clips). The non-key clips refer to video clips contained in the sample video that are not used for showing the key actions, for example, chips in which an action demonstrator stands to teach actions to a viewer.

In some embodiments, the controller controls to display a user interface on a display, and the user interface includes a window for playing a video. The controller acquires the sample video in response to an input instruction for indicating playing the sample video, the sample video includes a plurality of key clips, and the key actions required to be practiced by the user are shown when the key clips are played. In some embodiments, the sample video to be played is also referred to as a target video. The controller controls to play the sample video at a first speed in a window; adjusts the playing speed of the sample video from the first speed to a second speed when starting playing the key clips; and adjusts the playing speed of the sample video from the second speed to the first speed when the key clips finish playing; where the second speed is different from the first speed.

In some embodiments, the controller starts to play the sample video, detects the start tag and the end tag on the time axis of the sample video, adjusts the playing speed of the sample video from the first speed to the second speed when a start tag is detected, and adjusts the playing speed of the sample video from a second speed to a first speed when an end tag is detected. The start tag represents the beginning of the key clip, and the end tag represents the completion of the key clip.

In some embodiments, the second speed is lower than the first speed.

In the examples, since the second speed is lower than the first speed, when the start tag is detected (that is, the progress identifier on the time axis reaches the moment identified by the start tag), the playing is performed at a low speed automatically, so that the playing speed of the sample video adapts to the speed of user actions. When the end tag is detected, the playing speed automatically restores to the first speed.

In some embodiments, the first speed is a normal playing speed, i.e., 1x speed, and the second speed may be a preset 0.75× speed or 0.5× speed.

In some embodiments, a sample video file includes video data and audio data. When the sample video is played, reading and processing of the video data and the audio data are performed by using the same sampling rate. Thus, when the playing speed of the sample video needs to be adjusted, not only is the playing speed of the video picture adjusted, but also the playing speed of the audio signal is adjusted, that is, simultaneous audio and video playing is achieved.

In other embodiments, the sample video file includes video data and audio data, and the sampling rate of the video frame data and the sampling rate of the audio data are independently adjusted and controlled when the sample video is played. Thus, when the playing speed of the sample video needs to be adjusted, only the sampling rate of the video data may be changed to adjust the playing speed of the video picture without changing the sampling rate of the audio data, so as to keep the playing speed of the audio signal unchanged. For example, when the playing speed needs to be reduced, the playing speed of the audio is not reduced so that the user can normally receive a description of the audio and view a slower action presentation.

In some embodiments, a key clip includes video data and audio data thereof. When the key clip starts to be played, the playing speed of the video data of the key clip is adjusted to the second speed, and the playing speed of the audio data of the key clip is maintained at the first speed. When the key clip finishes playing, the speed of playing the video data of the next clip is adjusted to the first speed, and the audio data of the next clip is synchronously played at the first speed; where the next clip is a file clip located after the key clip and adjacent to the key clip in the sample video, for example, other clips adjacent to the key clip.

In some embodiments, in the process of playing a video picture at a low multiplied speed, whether end playing of a key clip is detected (for example, the end tag is detected). If no end tag of the key clip is detected, when the audio data of a corresponding time period finishes playing, the audio data of the corresponding time period may be played repeatedly. For example, when the video picture is played at a 0.5× speed, the audio data corresponding to the time period may be repeatedly played twice until the video frame data of this time period finishes playing, that is, after the end tag is detected, so that audio data and video frame data corresponding to a next time period may be synchronously played.

In other embodiments, in the process of playing the video picture at the low multiplied speed, whether end playing of a key clip is detected (for example, the end tag is detected). If no end tag of the key clip is detected, when the audio data of the corresponding time period finishes playing, the audio data is paused until the video frame data of this time period finishes playing, that is, after the end tag is detected, so that the audio data and video frame data corresponding to the next time period may be synchronously played. For example, when the start tag is located at 0:05 and the end tag is located at 0:15 on the time axis, in the case where the video picture is played at a 0.5× speed, the video frame data corresponding to the time period of 0:05-0:15 need to be played for 20S, and the audio data corresponding to the time period need to be played for 10S. In order to synchronously play the audio and video of the time period after 0:15, when the progress identifier on the time axis reaches 0:10, the audio data is paused, and when the progress identifier on the time axis reaches 0:15, the audio continues to be played.

In some embodiments, in the follow-up process of the user, the playing speed of the sample video is automatically adjusted only, without adjusting the playing speed of a local video stream.

In some embodiments, the controller controls to display the user interface on the display. The user interface includes a first playing window for playing the sample video and a second playing window for playing the local video stream. The controller acquires the sample video in response to an input instruction for indicating to play the sample video. The sample video is played in the first playing window, and the local video stream is played in the second playing window. The playing speed of other clips of the sample video in the first playing window is the first speed, the playing speed of the key clips of the sample video is the second speed, and the second speed is lower than the first speed. The playing speed of the local video stream in the second playing window is a fixed preset speed.

In some embodiments, the fixed preset speed may be the first speed.

In some embodiments, in view of the limited learning ability and physical coordination of young users, if an age of the user falls within a preset age range, the speed is automatically reduced at the beginning of playing the exemplary process of the key actions.

In some embodiments, if the age of the user is within a first age interval, the sample video is played at the first speed; and if the age of the user is within a second age interval, the sample video is played at the second speed; where the second speed is different from the first speed.

In some embodiments, the first age interval and the second age interval are age intervals divided by a preset age. For example, an age interval above the preset age is defined as the first age interval, and an age interval below the preset age (including the preset age) is defined as the second age interval. Exemplarily, the first age interval or the second age interval may be an age interval of a preschool child (e.g., 1-7 years old), an age interval of a school-age child, an age interval of a young person, an age interval of a middle-aged person, or an age interval of an old person.

It should be noted that the skilled in the art may set the first speed and the second speed according to specific value ranges of the first age interval and the second age interval, to maximize the adaptation of the playing speed of the sample video to the learning ability and action ability of the user.

It should also be noted that the first and second age intervals are merely examples and in other embodiments, it is also possible to set corresponding playing speeds for more age intervals as desired, and to play the sample video at the corresponding playing speeds when the age of the user is within the corresponding age interval. For example, when the age of the user is within the third age interval, the sample video is played at a third speed; when the age of the user is within the fourth age interval, the sample video is played at a fourth speed, and so on.

In some embodiments, the age of the user is within the first age interval when being greater than a first start age and smaller than a first end age, and the age of the user is within the second age interval when being greater than a second start age and smaller than a second end age.

In some embodiments, there may be two age intervals, divided by a preset age.

In some embodiments, the display is controlled to play the sample video at the first speed when the age of the user is greater than the preset age, and the display is controlled to play the sample video at the second speed when the age of the user is not greater than the preset age; where the second speed is lower than the first speed.

In some embodiments, if the age of the user is not greater than the preset age or within the second age interval, the playing speed of the sample video is adjusted to the second speed when the key clips start to be played; and the playing speed of the sample video is adjusted from the second speed to the first speed when the key clips finish playing.

In some embodiments, when a key clip starts to be played, the speed at which the display plays the video data of the key clip is adjusted from the first speed to the second speed, and the speed at which an audio output unit plays the audio data of the key clip is maintained at the first speed. After the audio data of the key clip finishes playing, the audio output unit is controlled to pause the audio data of the key clip, or to play the audio data of the key clip in a looped mode. The audio output unit is display apparatus hardware for playing the audio data, such as a speaker.

In some embodiments, when a key clip finishes playing, the display is controlled to play the video data of the next clip at the first speed; and the audio output unit is controlled to synchronously play the audio data of the next clip at the first speed, where the next clip is a clip located after the key clip in the sample video.

In some embodiments, if the age of the user is not greater than the preset age, the display is controlled to play the video data of the sample video at the second speed, and the audio output unit is controlled to play the audio data of the sample video at the first speed.

In specific implementations, the controller acquires the age of the user, determines whether the age of the user is lower than the preset age, detects the start-end tag on the time axis in the process of playing the sample video when the age of the user is lower than the preset age, adjusts the playing speed of the sample video from the first speed to the second speed when the start tag is detected, and adjusts the playing speed of the sample video from the second speed to the first speed when the end tag is detected.

In some embodiments, the controller acquires user information based on a user ID and acquires age information of the user from the user information.

In other embodiments, the controller starts an image collector in response to the instruction for playing the sample video from the user, recognizes a figure image in local images collected by the image collector, and determines the age of the user according to the recognized figure image and a preset age identification model.

In some embodiments, different low multiplied speed parameters may be set for different age ranges, for example, if the user is "3-5 years old", the second speed is a 0.5× speed; and if the user is "6-7 years old", the second speed is a 0.75× speed.

As previously described, the sample video has a specific type, such as "Lesson 1" and "Lesson 2", and the type may be represented by a type identifier. In view of the differences in audience and practice difficulty for different types of videos, in some embodiments, if the type of the sample video is a preset type, the speed is automatically reduced at the beginning of playing the exemplary process of the key actions. If not, the exemplary process is played at a normal speed the whole course until the user manually adjusts the playing speed.

In some embodiments, the controller acquires the type identifier of the sample video. If the sample video is determined to be the preset type according to the type identifier, the start-end tag on the time axis is detected in the process of playing the sample video. The playing speed of the sample video is adjusted from the first speed to the second speed when the start tag is detected, and the playing speed of the sample video is adjusted from the second speed to the first speed when the end tag is detected.

In some embodiments, resource information issued by a server to the display apparatus includes resource type identifiers, so that the display apparatus may determine whether the sample video is the preset type based on the type identifier of the sample video. The preset type includes, but is not limited to, types of some or all of the resources provided by a channel for kids and teenagers, such as resources for kids or teenagers provided by other channels.

In some embodiments, different low multiplied speed parameters may be set for different types, for example, if the sample video belongs to the "Lesson 1", the second speed is the 0.5× speed; and if the sample video belongs to the "Lesson 2", the second speed is the 0.75× speed.

In some embodiments, the playing speed may be automatically adjusted according to the follow-up situation of the user, to enable a low multiplied speed playing mechanism to adapt to different users. A part which may be easily followed by the user in the sample video is played at the normal speed, and a part which is difficult for the user to smoothly follow in the sample video is played at the low multiplied speed.

For ease of explanation and distinction, in the present application, a sequence of video frames included in the sample video refers to a first sequence of video frames. The first sequence of video frames includes first key frames for showing the completed state actions, and N first key frames corresponding to N completed state actions form a first sequence of key frames. Of course, the first sequence of video frames also includes non-key frames for showing the uncompleted state actions and the release actions.

In some embodiments, in response to an instruction for indicating to follow the sample video, the controller starts the image collector and acquires a follow-up video stream of the user from the local video stream collected by the image collector. The follow-up video stream includes part or all of video frames in the local video stream. Differently, in the present application, a sequence of video frames in the follow-up video stream refers to a sequence of second video frames, and the sequence of second video frames includes second video frames for showing (recording) the user actions.

In some embodiments, the user actions are analyzed according to the follow-up video stream. If it is detected that the user has not made the corresponding completed state actions at one or more consecutive time (or time periods) where the completed actions are required, that is, the user actions are the uncompleted actions; it means that these actions are difficult for the user to follow; and at this moment, the display apparatus may reduce the playing speed of the sample video. If it is detected that the user has completed the corresponding completed state actions at one or more consecutive time (or time periods) where the completed actions are required, that is, the user actions are the release actions; it means that these actions are less difficult for the user to follow; and at this moment, the display apparatus may increase the playing speed of the sample video.

In some embodiments, in response to an input instruction for indicating to follow the sample video, the controller acquires the sample video, and acquires the follow-up video stream of the user from the local video stream collected by the image collector. The sample video includes a first sequence of key frames for showing the completed state actions, and the follow-up video stream includes a sequence of second video frames for showing the user actions. The controller plays the sample video on the display, and adjusts the playing speed of the sample video when the user actions in the sequence of second video frames corresponding to the first sequence of key frames does not match the completed state actions shown in the first sequence of key frames.

The second video frames corresponding to the first key frames are extracted from the second sequence of video frames according to time information of the first key frames that have been played.

In some embodiments, the time information of the first key frames may be the time when the display apparatus plays the first key frames. According to the time when the display apparatus plays the first key frames, second video frames corresponding to the time extracted from the second sequence of video frames are the second video frames corresponding to the first key frames. It should be noted that the second video frame corresponding to a certain moment may be a second video frame with a time stamp being the moment, or a second video frame with the time indicated by a time stamp being closest to the moment.

In some embodiments, the same position may be passed during the preparation process and the release process, so that the second video frames and other adjacent video frames may be extracted. After joint point data of consecutive frames are extracted, whether an action belongs to the preparation process or the release process may be determined.

In some embodiments, the controller extracts the corresponding second video frames from the second sequence of video frames according to the first key frames that have been played, and sends the extracted second video frames (and the corresponding first key frames) to the server. The server determines whether the user actions in the second video frames match the completed state actions shown in the first key frames by comparing the first key frames with the second video frames corresponding to the first key frames. When the server determines that the user actions in the second video frames do not match the completed state actions shown in the corresponding first key frames, a speed adjustment instruction is returned to the display apparatus.

In some embodiments, the controller controls the joint point recognition (i.e., user action recognition) of the second video frames and/or other video frames to be completed locally on the display apparatus, and uploads the joint point data and the corresponding time to the server. The server determines corresponding target sample video frames according to the received time, compares the joint point data received with joint point data of the target sample video frames, and returns a comparison result to the controller.

In some embodiments, the situation that the user actions in the second video frames do not match the completed state actions shown in the corresponding first key frames are as follows: the user actions in the second video frames are the uncompleted state actions before the completed state actions, or the user actions in the second video frames are the release actions after the completed state actions. Based on this, if the server determines that the user actions in the second video frames are the uncompleted state actions, an instruction for indicating reducing the speed is returned to the display apparatus, and thus the display apparatus reduces the playing speed of the target video; and if the server determines that the user actions in the second video frames are the release actions, an instruction for indicating increasing the speed is returned to the display apparatus, and thus the display apparatus increases the playing speed of the target video.

Obviously, in other implementations, the display apparatus independently determines whether the user actions in the second video frames match the completed state actions shown in the first key frames without interacting with the server, which will not be repeated here.

It should be noted that in the implementation of adjusting the playing speed in real time according to the practice performance of the user, if the playing speed is adjusted to the preset maximum value or minimum value, the playing speed cannot be adjusted any longer.

Embodiments of Pause and Resume Schemes.

In some embodiments, a user may operate keys or input a speech to control a video to pause, and then operate keys or input a speech to control the video to resume. For example, in the process of following a target video, the user may operate keys on a control device or input a speech to control the target video to pause. For example, when a display displays an interface as shown in FIG. 10, the user may press an "OK" key for pause; and a controller pauses the target video in response to the key input from the user, and presents a pause state identifier as shown in FIG. 16 above a playing picture.

In the process of following the target video, the controller collects local images through an image collector and detects whether there is a user object, namely a figure (an user), in the local images. When the controller (or a server) of a display apparatus does not detect the moving object from the local images, the display apparatus automatically controls to pause the target video, or the server instructs the display apparatus to pause the target video and present the pause state identifier as shown in FIG. 16 above the playing picture.

In the embodiments, pause control executed by the controller does not affect the display of a local video picture.

Figure 16:
FIG. 16 illustrates a pause interface according to an embodiment.

In the pause state as shown in FIG. 16, the user may operate the keys on the control device or input a speech to resume the target video. For example, the user may press the "OK" key to resume the target video; and the controller resumes the target video in response to the key input from the user, and cancels the display of the pause state identifier in FIG. 16.

It can be seen that in the above examples, the user needs to operate the control device to control the display apparatus to resume the target video, which makes the user experience of a follow-up process unfriendly.

In view of the above issue, in some embodiments, in response to the pause control of the target video, the controller presents a pause interface on the display, and displays a target key frame in the pause interface. The target video includes a plurality of key frames, each key frame shows a key action required to be followed, and the target key frame is a designated one of the plurality of key frames. After the target video is paused, the image collector is controlled to continue working and determine whether a user action in the local image collected by the image collector after pausing the target video match the key action shown in the target key frame. When the user action in the local image matches the key action shown in the target key frame, the target video resumes. When the user action in the local image does not match the key action shown in a previous key frame, the target video is kept paused.

In the embodiments, the target key frame may be a key frame showing the previous key action, namely, the last key action played before the target video is controlled to be paused, or the target key frame may be a representative frame among the plurality of key frames.

It should be noted that the target video involved in the examples refer to a video that is paused, including but not limited to an sample video of dancing actions, an sample video of fitness actions, an sample video of gymnastics actions, a played MV or a video showing the action of the avatar in the karaoke scene.

In some implementations, a plurality of key tags are pre-identified on a time axis of the target video, and one key tag corresponds to one key frame, that is, time indicated by the key tags is time when the corresponding key frames are played. In response to receiving the pause control of the target video, the controller detects a target key tag on the time axis according to the time point on the time axis at the moment of pause, acquires the target key frame according to the target key tag on the time axis, and displays the acquired target key frame in the pause interface; where the time corresponding to the tag of the target key frame is before the time on the time axis at the moment of pause. In this way, the user may use video frames that have been followed to close the pause, thereby enhancing user's interest.

In other implementations, in response to the pause control of the target video, the controller controls the target video to rewind to the moment where the target key tag is located and then executes the pause, so as to show the target key frame corresponding to the target key tag on the pause interface.

In some embodiments, the target key tag is a key tag that is before the current time and the closest to the current time on the time axis. Correspondingly, the target key frame is a key frame showing the last key action.

In the examples, when or after the pause control is executed on the target video, the target key frame showing the key action is presented in the pause interface as a prompt action for the user to resume the playing. Furthermore, in the pause state, the user may control to resume the target video by making the prompt action without operating the control device, thereby improving the follow-up experience of the user.

In some embodiments, displaying the acquired target key frame in the pause interface may be that the sample video stops playing and a pause control is added in an sample video playing window after the time axis is controlled to rewind to the time corresponding to the target key tag. The controller acquires the target key frame or the joint point of the target key frame, while a camera continuously acquires local video data and detects the human body in the video data. When the matching degree between the action of the human body in the video data and the action in the target key frame reaches a preset threshold value, the sample video is played.

In other implementations, in response to receiving the pause control of the target video, the controller controls the target video to rewind to the time where the target key tag is located and then execute the pause, so as to display the target key tag corresponding to the target key tag on the pause interface.

In some embodiments, in response to receiving the pause control of the target video, the controller stops playing the target video and adds a pause control in the video playing window after controlling the time axis to rewind to the time corresponding to the target key tag. The controller acquires the target key frame or the joint point data (i.e., action data) of the target key frame, while the camera continuously acquires the local video data and detects the human body in the video data. When the matching degree between the action of the human body in the video data and the action in the target key frame reaches the preset threshold value, the target video is controlled to be played.

In some embodiments, resuming the video includes continuing to play the target video starting from the time corresponding to the target key tag after rewinding.

In other embodiments, resuming the video includes continuing to play the target video starting from the time when the pause control instruction is received.

In some embodiments, showing the acquired target key frame in the pause interface may be that the time axis does not rewind, the target video stops playing, the pause control is added in the video playing window, and the acquired target key frame is shown in a floating layer above the video playing window. The controller acquires the target key frame or the joint point data of the target key frame, and meanwhile the camera continuously acquires the local video data and detects the human body in the video data. When the matching degree between the action of the human body in the video data and the action in the target key frame reaches a preset threshold value, the sample video is played, and the floating layer for displaying the target key frame is cancelled.

In some embodiments, the target key frame displayed during pause may be any video frame in the video being played.

In some embodiments, the display apparatus itself may perform the comparison between image frames and local video frames during the pause, or upload them to the server, so that the server performs the comparison between the image frames and the local video frames during the pause.

In some embodiments, playing the video may be that the sample video continues to be played from the time corresponding to the target key tag after the rewind.

In some embodiments, the sample video may continue to be played at the time when the pause control instruction is received.

In some embodiments, showing the acquired target key frame in the pause interface may be that the time axis does not rewind, the sample video stops playing, the pause control is added in the sample video playing window, and the acquired target key frame is shown in the floating layer above the sample video playing window. The controller acquires the target key frame or the joint point of the target key frame, and meanwhile the camera continuously acquires the local video data and detects the human body in the video data. When the matching degree between the action of the human body in the video data and the action in the target key frame reaches the preset threshold value, the sample video is played, and the floating layer for displaying the target key frame is cancelled.

In some embodiments, a working frame during pause may be any video frame in the sample video.

In some embodiments, the follow-up process automatically ends when the target video followed by the user finishes playing. In response to completion of the playing of the target video, the controller closes the image collector, closes a follow-up interface where a first playing window and a second playing window are located as shown in FIG. 10, and presents an interface including score information.

In some embodiments, before completing the follow-up process, the user may end the follow-up process by operating the key on the control device or inputting a speech. For example, the user may operate a "back" key on the control device to input a command to end the follow-up process. In response to the command, the controller pauses the target video, and presents an interface including retention information, such as a retention interface illustrated in FIG. 17.

Figure 17:
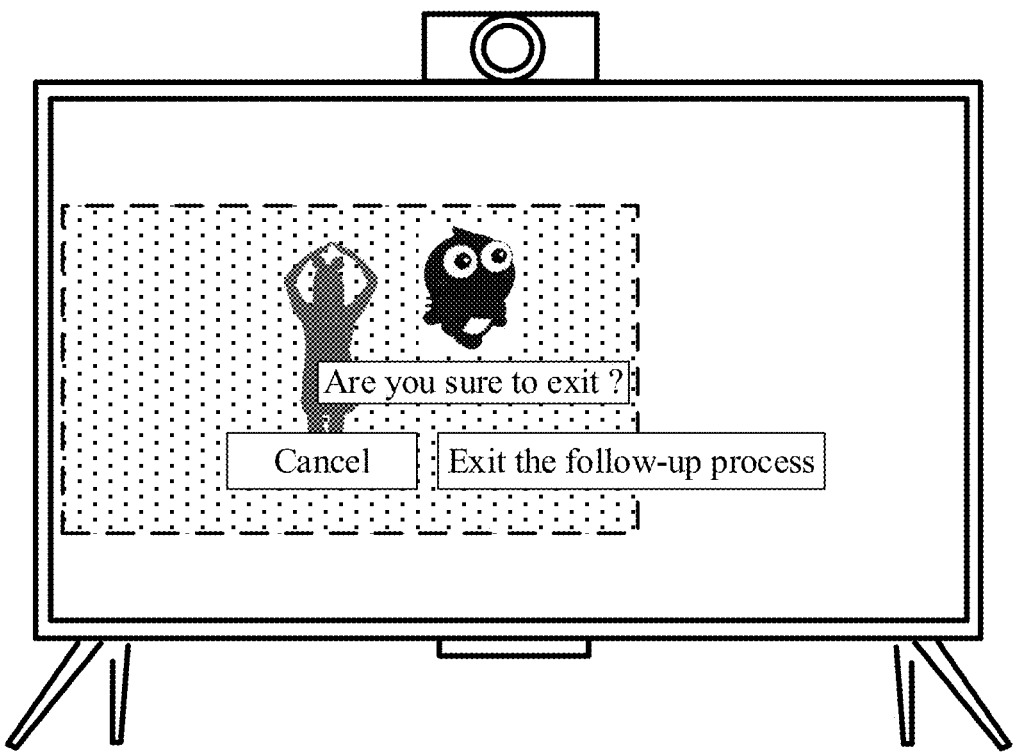
FIG. 17 illustrates a user interface presenting alert information for staying according to an embodiment.

When the display displays the retention interface as shown in FIG. 17, the user may operate a control for returning to the follow-up interface, and then the follow-up interface is re-shown for the user to continue to follow; or operate a control for exiting the follow-up process to end the follow-up process.

In some embodiments, in response to an instruction for exiting the follow-up process from a user, a playing duration of the target video will be determined, in order to resume playing.

In some embodiments, if the playing duration of the target video is not less than a preset duration (for example, 30 s), the playing duration of the target video is saved, and the target video continues to be played next time. If the playing duration of the target video is less than the preset duration (for example, 30 s), the playing duration of the target video is not saved, and the target video will be replayed next time.

In some embodiments, if the playing duration of the target video is not less than the preset duration (for example, 30 s), a local image frame corresponding to the target key frame is saved, so as to show in an evaluation interface or playing history later. If the playing duration of the target video is less than the preset duration (for example, 30 s), the local image frame corresponding to the target key frame will not be saved. The local image frame corresponding to the target key frame refers to a video frame in a local video that is acquired and determined when the target key tag is detected.

In some embodiments, the video frame in the local video that is acquired and determined when the target key tag is detected may be the local image frame acquired by the camera at the time when the target key tag is detected, or the local image frame that is acquired by the camera at the time or an adjacent moment when the target key tag is detected and has a high matching degree with the target key frame.

Figure 18:
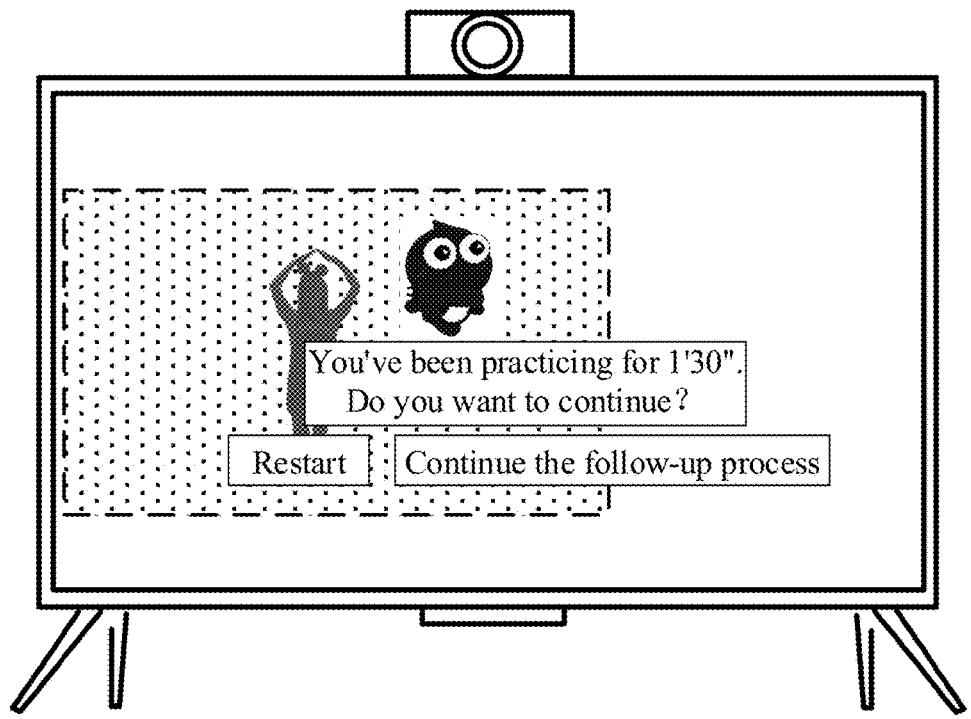
FIG. 18 illustrates a user interface presenting alert information for resuming according to an embodiment.

In some embodiments, when the user selects a video that has been played but not finished for follow-up, in response to an instruction for playing such an sample video from a user, an interface including resume prompt information is presented. The last playing duration and controls for the user to select whether to continue playing are shown in the resume prompt interface, so that the user may operate the controls on the interface to independently select whether to continue playing. FIG. 18 illustrates the resume prompt interface. As shown in FIG. 18, the interface shows the last playing duration (1'30") and the control for restart ("Restart") and the control for the user to continue playing (Continuing the follow-up process).

In some embodiments, in response to an instruction for replaying from the user in the resume prompt interface as shown in FIG. 18, the sample video is controlled to be replayed, for example, starting from 0'00"; or, in response to an instruction for continuing the playing input from the user in the resume prompt interface as shown in FIG. 18, the sample video continues to be played according to the last playing duration, for example, starting from 1'30".

In some embodiments, an experience score is user data related to level promotion, which is the user's acquisition of user behaviors in a target application, that is, the user may improve the experience score by following more sample videos. The experience score is also a quantitative representation of a degree of proficiency of the user behaviors, that is, the higher the experience score, the higher the degree of proficiency of the user in following actions. When the experience score accumulates to a certain value, the level of the user may be improved.

In some embodiments, experience score increments generated during a statistical period are counted by the server or display apparatus; and after entering the next statistical period, a total experience score of the user is updated based on experience score increments generated during the last statistical period.

Exemplarily, three, five or seven days may be preset as a statistical period; and correspondingly, when the time goes to 0:00 of the fourth, sixth or eighth day, it means entering the next statistical period. For example, assuming that a week (from 0:00 every Monday to 0:00 next Monday) is a statistical period, and when the time goes to 0:00 next Monday, the next statistical period is entered.

Based on the above experience score statistical method, in some embodiments, an experience score (increments) acquired by the user in the current statistical period is referred to as a first experience score, and the sum of experience scores obtained by the user in each statistical period before the current statistical period is referred to as a second experience score. It can be understood that the sum of the first experience score and the second experience score is the total experience score of the user at the current moment. Since the current moment has not reached the time to update the total experience score, the second experience score does not include the first experience score.

In some embodiments, when an application homepage needs to be displayed, the controller acquires the first experience score and the second experience score, and displays the application homepage according to the acquired first experience score and second experience score. The application homepage includes a control for showing the first experience score and the second experience score.

In some embodiments, the control for showing the first experience score and the second experience score includes: a first control for showing the first experience score and a second control for showing the second experience score. Exemplarily, the first control is a control where "This week +10" is located in FIG. 19, and the second control is a control where "dancing performance score 10012" is located in FIG. 19.

In some embodiments, the first experience score or the second experience score acquired by the controller is data returned from the server in real time, while in other embodiments, the first experience score or the second experience score acquired by the controller is data saved locally; where the data saved locally is returned from the server last time.

In some implementation scenes, when returning to the application homepage from a follow-up result interface, the controller of the display apparatus acquires the latest first experience score from the server, and updates the first control in the application homepage according to the latest first experience score. Since the second experience score has not been updated at this moment, there is no need to acquire the second experience score, that is, there is no need to update the second control in the application homepage.

In some implementation scenes, the controller of the display apparatus acquires the latest first experience score and second experience score from the server in response to the launch of the target application, and displays the first experience score in the first control of the application homepage and the second experience score in the second control of the application homepage according to the acquired first experience score and second experience score.

In some implementation scenes, when entering a next statistical period, the controller of the display apparatus acquires the latest second experience score from the server and saves the latest second experience score in local cache data. When the application homepage is loaded for the first time after the latest second experience score is acquired, the second control in the application homepage is updated according to the latest second experience score saved in the local cache data, that is, the latest second experience score saved in the local cache data is displayed in the second control.

In some implementation scenes, after the server updates the first experience score or the second experience score, the updated first experience score or second experience score is returned to the display apparatus. After the display apparatus receives the updated first experience score or second experience score returned from the server, the updated first experience score or second experience score is saved in the local cache data. When the application homepage needs to be displayed, the first experience score and the second experience score are displayed in the first control and the second control of the application homepage respectively according to the first experience score and the second experience score in the cache data.

In other embodiments, the total experience score of the user at the current moment is referred to as a third experience score. It can be understood that the third experience score is the sum of the first experience score and the second experience score.

In some embodiments, when the application homepage needs to be displayed, the controller acquires the first experience score and the third experience score, and displays the application homepage according to the acquired first experience score and third experience score. The application homepage includes controls for showing the first experience score and the third experience score.

In some embodiments, the controls for showing the first experience score and the third experience score in the application homepage include: the first control for showing the first experience score and a third control for showing the third experience score. When the application homepage is displayed according to the first experience score and the third experience score, the first experience score is displayed in the first control, and the third experience score is displayed in the third control.

It should be noted that the second control and the third control may be the same control or different controls. When being not the same control, the second control and the third control may be displayed on the application homepage at the same time.

According to the embodiments, it can be known that one or more of the first experience score, the second experience score, or the third experience score may be displayed on the application homepage.

In some embodiments, in response to a request for displaying the application homepage, the controller of the display apparatus sends a data request for acquiring the user experience score to the server; where the data request includes at least user information, such as a user identifier. In response to the data request, the server determines whether the second experience score has been updated by comparing the currently saved second experience score with the second experience score returned to the display apparatus last time. If the second experience score has been updated, the updated second experience score and the latest first experience score are returned to the display apparatus. If the second experience score has not been updated, only the latest first experience score is returned to the display apparatus. The latest first experience score is updated according to a follow-up result of the last follow-up process of the user.

In some embodiments, when the server receives the data request sent from the display apparatus, the server determines whether the second experience score needs to be updated; and if yes, the second experience score is updated, and the updated second experience score is returned to the display apparatus. Specifically, in response to the data request, the server acquires the time when the second experience score is updated last time, and determines whether the time interval from the time when the second experience score is updated last time meets the statistical period; if so, the first experience score corresponding to the last statistical period is acquired, and the second experience score is updated by accumulating the first experience score corresponding to the last statistical period to the second experience score; and if not, the second experience score is not updated, and the current first experience score and second experience score are directly returned to the display apparatus, or only the current first experience score is returned to the display apparatus.

In other embodiments, the server periodically and automatically updates the second experience score according to the corresponding first experience score. For example, the first experience score corresponding to the last statistical period is accumulated to the second experience score every preset interval (a statistical period) to obtain a new second experience score.

At the display apparatus side, if the controller receives the first experience score and the second experience score returned from the server, the controller draws the first control and the second control in the application homepage according to the first experience score and the second experience score. If the controller of the display apparatus only receives the first experience score returned from the server, the controller draws the first control and the second control in the application homepage according to the received first experience score and the second experience score in the local cache data. The second experience score in the local cache data is the second experience score returned from the server and received last time.

In some embodiments, the first control and the second control partially overlap, so that the user may intuitively see the two controls at the same time.

In some embodiments, the first control is superimposed above the second control during display. For example, in FIG. 19, the control where "This week +10" is located is superimposed above the control where "Dance performance value 10012" is located to be displayed.

In some embodiments, colors of the first control and the second control are different, so that the user may intuitively see the two controls at the same time, and conveniently distinguish the two controls.

In some embodiments, the first control is located in the upper right corner of the second control.

In some embodiments, when the controller receives an operation for exiting the follow-up process from a user, the controller closes the image collector, closes the first playing window and the second playing window in the follow-up interface as shown in FIG. 10A, and presents the follow-up result interface for showing a follow-up result.

In some embodiments, in response to the end of the follow-up process, the follow-up result interface is presented on the display based on the follow-up result of this follow-up process. The follow-up result includes at least one of the star score, score and experience score increments acquired during this follow-up process, the experience score (i.e., the first experience score) acquired in the current statistical period, the sum of the experience score acquired in each statistical period before the current statistical period (i.e., the second experience score), or the total experience score acquired up to the current time.

In some embodiments, the star score, score and experience score increments acquired during this follow-up process are determined based on the follow-up actions of the target key frames completed in the playing process of the target video as well as the action matching degree when the follow-up actions of the target key frames are completed. The number of the completed follow-up actions of the target key frames and the action matching degree when the follow-up actions of the target key frames are completed are both positively correlated with the score acquired in this follow-up process. The star score and experience score increments acquired in this follow-up process may be calculated based on the score based on a preset calculation rule.

It should be noted that, in some embodiments, if the user exits the follow-up process in advance, in response to an instruction for exiting the follow-up process from a user, the controller determines whether the playing duration of the target video is greater than the preset value. If yes, score information and detailed result information are generated based on the generated follow-up data (such as the collected local video stream and the score of part of the user actions). If not, the generated follow-up data is deleted.

Figure 19A:
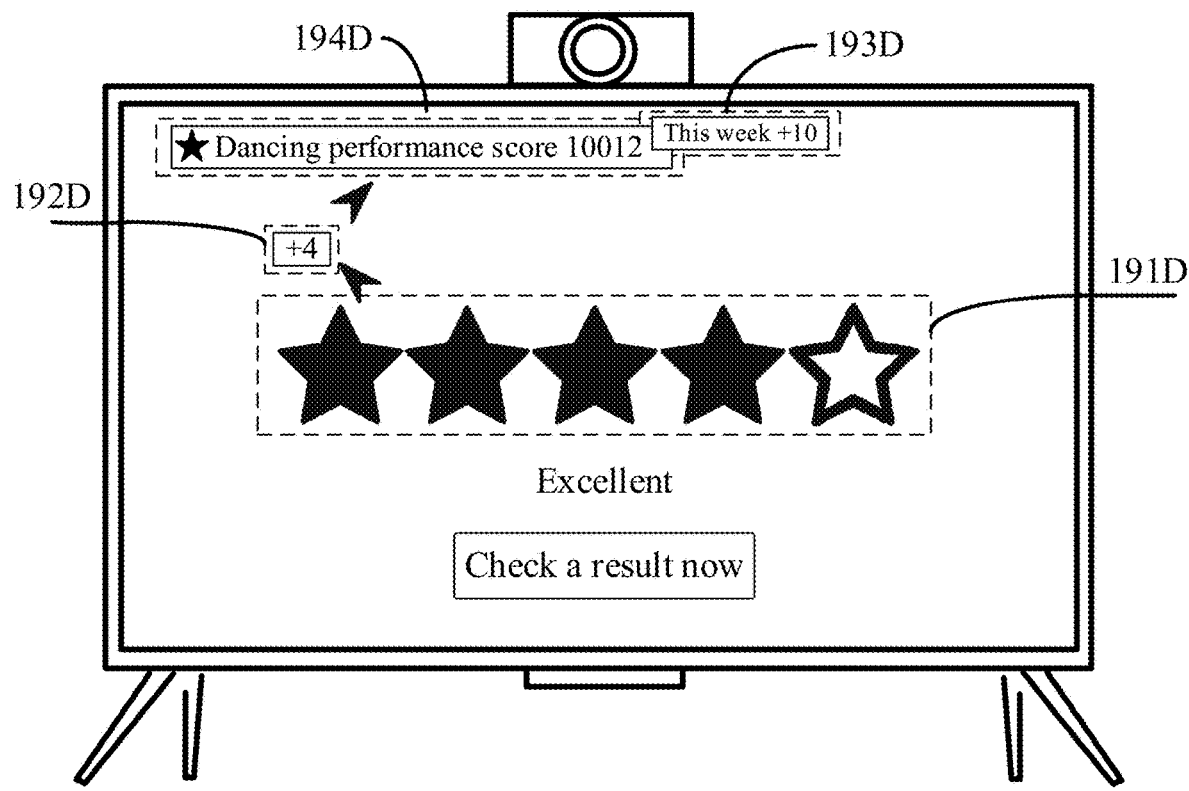
FIG. 19A illustrates a user interface presenting score information according to an embodiment.

FIG. 19A illustrates the follow-up result interface. As shown in FIG. 19A, the interface shows the star score (four stars), the experience score increment (+4), the first experience score (This week +10) and the second experience score (dancing performance score 10012) acquired in this follow-up process in the form of items or controls. In addition, in order to facilitate the user to check detailed results, FIGS. 19A-19C also show a control "Check a result now" for checking the detailed result, and the user may enter an interface showing the detailed result information as shown in FIG. 19D or 19E by operating the control.

In the follow-up result interface as shown in FIG. 19A, the star score (191D), the experience score increment (192D), the first experience score (193D) and the second experience score (194D) acquired in this follow-up process are shown through a third element combination (192D), where the displayed experience score increment is determined based on the score acquired in this follow-up process. The element combination refers to an interface element or a combination of multiple interface elements such as items, text boxes, icons, and controls.

In order to prevent the user from maliciously earning experience scores by repeatedly following the same sample video, in some embodiments, in the process of following the sample video by the user, the follow-up performance of the user is scored based on the local video stream collected by the image collector. The score result is associated with the sample video, so that the server may query the highest historical score of the user following the sample video according to the ID of the sample video and the user ID. If the score acquired in a certain follow-up process is higher than the recorded highest historical score, the experience score increment acquired in this follow-up process is calculated based on the score. If the score is not higher than the recorded highest historical score, the experience score increment acquired in this follow-up process is determined to be 0. The recorded highest historical score is the highest score acquired by the user following the sample video in the past time.

In some embodiments, after each follow-up process ends, whether the follow-up frequency of the user in the current statistical period reaches a preset frequency is determined, and if yes, an incentive experience score increment is generated.

Exemplarily, assuming that a week (from 0:00 on Monday to 0:00 on Sunday) is a statistical period and the preset frequency is 10, after each follow-up process ends, the recorded follow-up frequency in the current statistical period is increased by 1, whether the latest recorded follow-up frequency reaches 10 is determined, and if yes, an experience score value 5 will be generated to motivate the user. At every 0:00 on Sunday, the next statistical period will be entered, and then the recorded follow-up frequency data will be cleared. Optionally, multiple preset frequencies may be set, and different numbers of experience score values are generated when the follow-up frequency of the user in the current statistical period reaches the different preset frequencies. For example, when the follow-up frequency reaches 20, an experience score value 10 is generated, when the follow-up frequency reaches 30, an experience score value 15 is generated, and so on.

In some embodiments, after each follow-up process ends, whether the total score acquired by the user in the current statistical period reaches a preset value is determined, and if yes, an incentive experience score increment is generated.

Exemplarily, assuming that a week (from 0:00 on Monday to 0:00 on Sunday) is a statistical period and the preset score is 30, after each follow-up process ends, the score acquired in this follow-up process is accumulated to the recorded total score in the current statistical period, whether the latest recorded total score reaches 30 is determined, and if yes, an experience score value 5 will be generated to motivate the user. At every 0:00 on Sunday, the next statistical period will be entered, and the recorded total score data will be cleared. Optionally, multiple preset scores may be set, and different numbers of experience scores are generated when the total score of the user in the current statistical period reaches the different preset scores. For example, when the total score reaches 40, an experience score value 10 is generated; when the total score reaches 50, an experience score value 15 is generated, and so on.

In some embodiments, after the follow-up process ends, the follow-up result interface is presented according to the follow-up result. The follow-up result includes the score, star score, experience score increments and the like acquired in this follow-up process. The star score is determined based on the score. The experience score increments include the experience score increment determined based on the score, the experience score increment generated when the follow-up frequency of the user in the current statistical period reaches the preset frequency, and/or, the experience score increment generated when the total score acquired by the user in the current statistical period reaches the preset score.

In some embodiments, based on different sources of the experience score increments, contents displayed on the follow-up result interface are different. Specifically, if the follow-up frequency of the login user in the current statistical period reaches the preset frequency after this follow-up process ends, a follow-up result interface containing a first element combination is presented. The first element combination shows the experience score increment determined based on the follow-up score of this follow-up process and the experience score increment determined according to the preset frequency. If the total follow-up score of the login user in the current statistical period is greater than the preset value after this follow-up process ends, a follow-up result interface containing a second element combination is presented. The second element combination shows the experience score increment determined based on the follow-up score of this follow-up process and the experience score increment determined according to the preset value. If the follow-up frequency of the login user in the current statistical period does not reach the preset frequency and the total follow-up score is not greater than the preset value after this follow-up process ends, the follow-up result interface containing the third element combination is presented. The third element combination shows the experience score increment determined based on the follow-up score of this follow-up process.

It should be noted that the first element combination, the second element combination, and the third element combination may specifically be one interface element or a combination of multiple interface elements such as items, text boxes, icons, and controls.

Figure 19B:
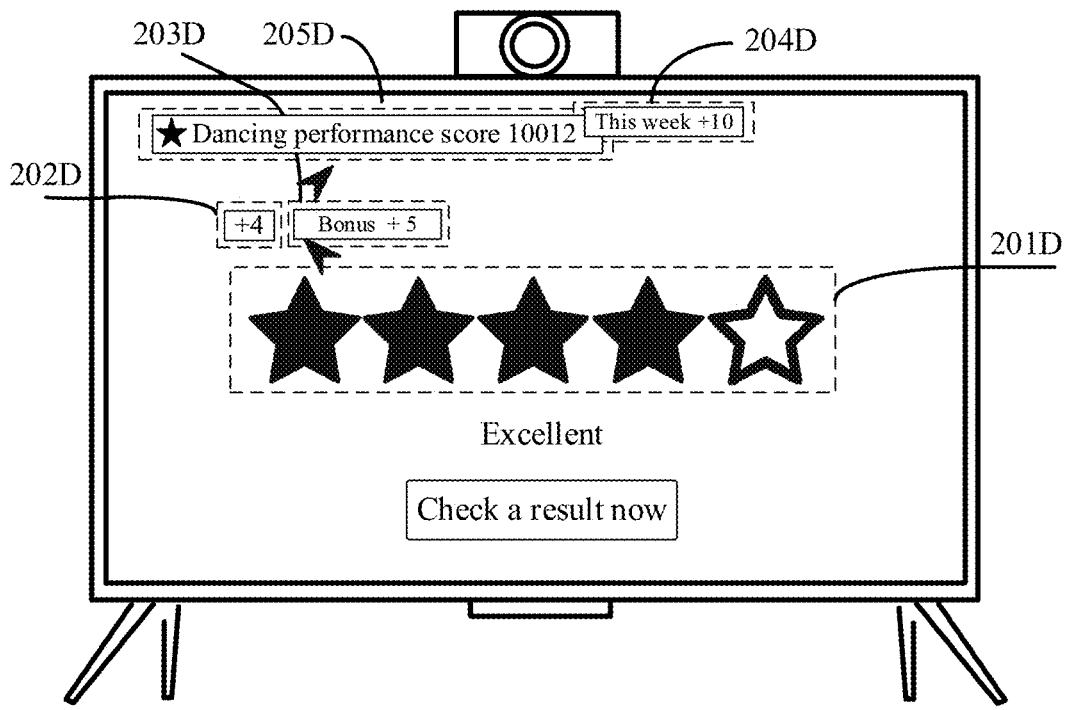
FIG. 19B illustrates a user interface presenting follow-up result information according to an embodiment.

FIG. 19B is a schematic diagram of the follow-up result interface according to an exemplary embodiment of the application, which is specifically the follow-up result interface that is presented when the follow-up frequency of the user in the current statistical period reaches the preset frequency. As shown in FIG. 19B, the star score (201D) acquired in this follow-up process, the experience score increment (202D) determined based on the score acquired in this follow-up process, the experience score increment (203D) determined based on the preset frequency reached by the follow-up frequency of the user, the first experience score (204D) and the second experience score (205D) are shown in the interface through the first element combination (202D and 203D).

Figure 19C:
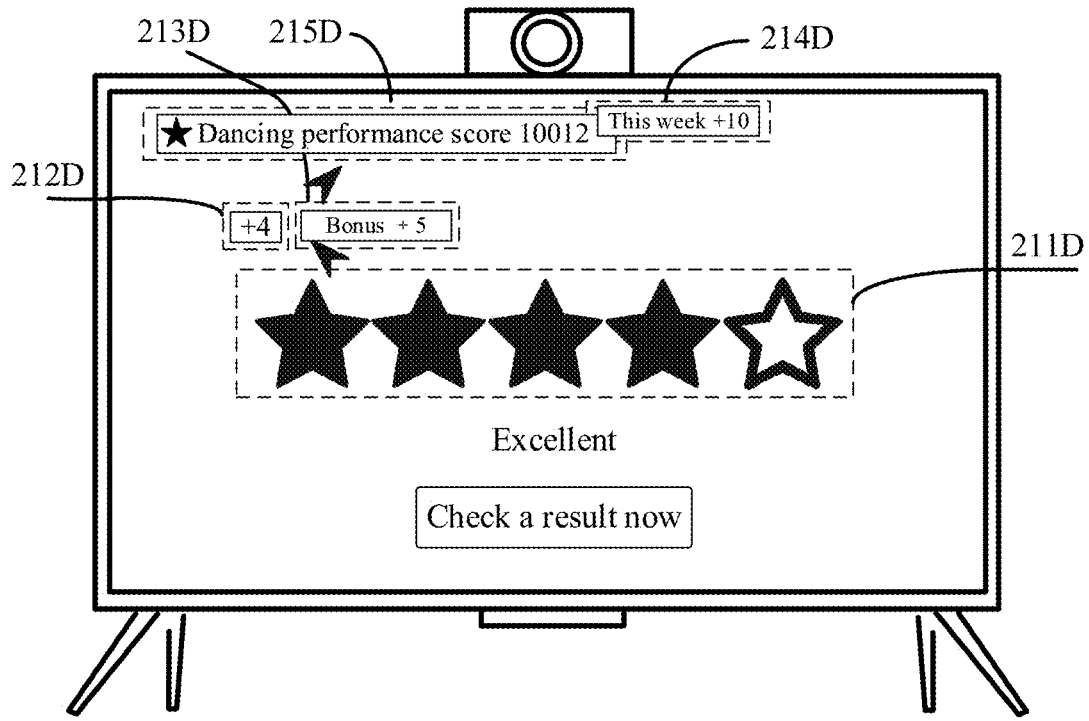
FIG. 19C illustrates a user interface presenting follow-up result information according to an embodiment.
Figure 19D:
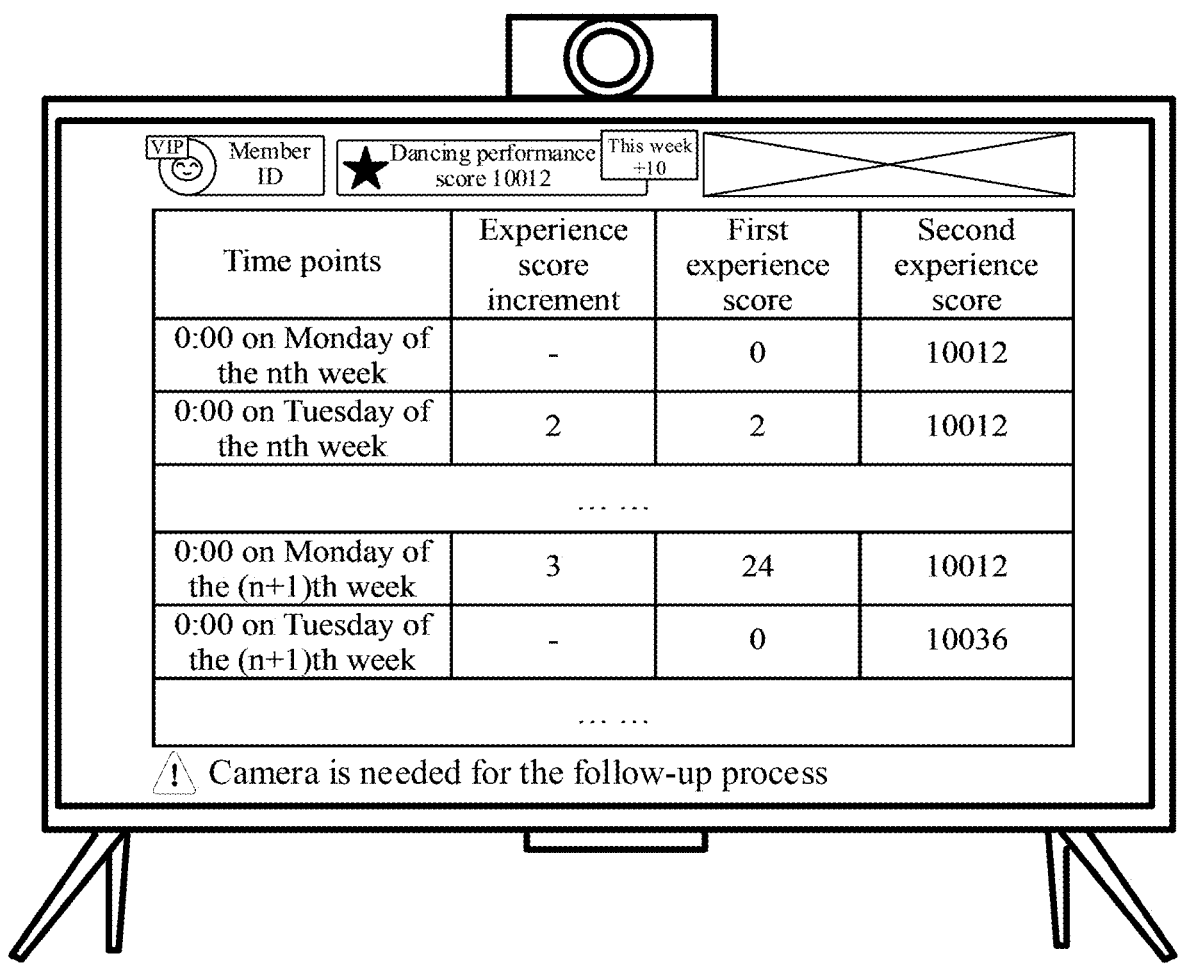
FIG. 19D illustrates a user interface presenting detailed experience data according to an embodiment.
Figure 19E:
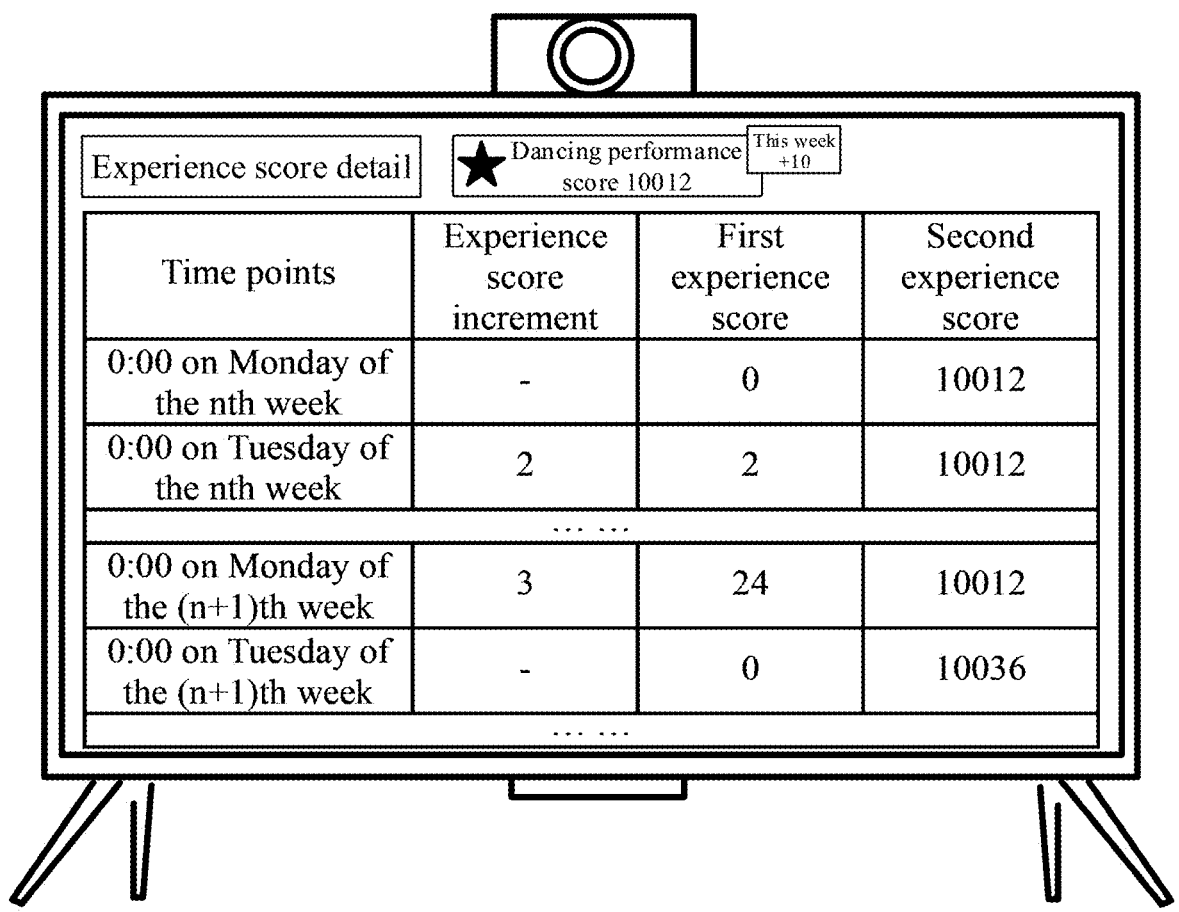
FIG. 19E illustrates a user interface presenting detailed experience data according to an embodiment.

FIG. 19C is a schematic diagram of the follow-up result interface according to an exemplary embodiment of the present application, which is specifically the follow-up result interface that is presented when the total score acquired by the user in the current statistical period reaches the preset score. As shown in FIG. 19C, the star score (211D) acquired in this follow-up process, the experience score increment (212D) determined based on the score acquired in this follow-up process, the experience score increment (213D) determined based on the preset score reached by the total score acquired by the user, the first experience score (214D) and the second experience score (215D) are shown in the interface through the second element combination (212D and 213D).

It can be seen from the embodiments that when the follow-up frequency of the user in the current statistical period reaches the preset frequency and/or when the total score acquired by the user in the current statistical period reaches the preset score, the user is rewarded or is given a bonus with a certain number of experience score values which will be displayed on the follow-up result interface, so as to improve the user's enthusiasm for practice and improving user experience.

In some embodiments, while the follow-up result interface is displayed, a speech prompt corresponding to the content of the follow-up result interface may also be controlled to be played.

In some embodiments, in the process of playing the sample video (i.e., in the follow-up process), action matching is performed on the sample video and the local video stream to acquire the score of this follow-up process. After the sample video finishes playing (i.e., after the follow-up process ends), the corresponding star score, the experience score increment, etc. are determined based on the acquired score; and the follow-up result interface is generated.

In some embodiments, the controller acquires the sample video in response to an input instruction for indicating playing (following) the sample video, and collects the local video stream through the image collector. The sample video includes the first video frames for showing the sample actions required to be followed by the user, and the local video stream includes the second video frames for showing the user actions. The first video frames and the second video frames corresponding to each other match to acquire a score based on the matching result. If the score is higher than the recorded highest historical score, the experience score increment is determined based on the score. If the score is not higher than the recorded highest historical score, the experience score increment is determined to be 0.

In some embodiments, when the controller receives an operation for exiting the follow-up process from a user, the controller closes the image collector, closes the first playing window and the second playing window in the follow-up interface as shown in FIG. 10A, and presents the interface containing the score information.

In some embodiments, in response to the end of the follow-up process, an interface containing the score information is presented on the display. The score information includes at least one of the star score, score, experience score increments, or the total experience score.

In some embodiments, the star score, score and experience score increments are determined based on the follow-up actions of the target key frames completed in the playing process of the target video as well as the action matching degree when the follow-up actions of the target key frames are completed. The number of the completed follow-up actions of the target key frames and the action matching degree when the follow-up actions of the target key frames are completed are both positively correlated with the star score, score and experience score increments.

It should be noted that, in some embodiments, if the user exits the follow-up process in advance, in response to an instruction for exiting the follow-up process from a user, the controller determines whether the playing duration of the target video is greater than the preset value. If yes, the score information and the detailed result information are generated based on the generated follow-up data (such as the collected local video stream and the score of part of the user actions). If not, the generated follow-up data is deleted.

FIG. 19A illustrates the interface presenting the score information. As shown in FIG. 19A, the interface shows the star score, the experience score increments and the total experience score in the forms of items or controls. In addition, in order to facilitate the user to check the detailed results, FIG. 19A also shows the control "Check a result now" for checking the detailed result, and the user can enter the interface presenting the detailed result information as shown in any of FIGS. 19D-19E by operating the control.

Embodiments of Experience Score Calculation Schemes.

In some embodiments, an experience score is user data related to level promotion, which is the user's acquisition of user behaviors in a target application, that is, a user may improve the experience score by following more sample videos. The experience score is also a quantitative representation of a degree of proficiency of the user behaviors, that is, the higher the experience score, the higher the degree of proficiency of following actions of the user. When the experience score accumulates to a certain value, the level of the user may be improved.

In order to prevent the user from maliciously earning the experience score by repeatedly following the same sample video, in some embodiments, in the process of following the sample video by the user, the follow-up situation of the user is scored according to the local video stream collected by an image collector, and there is a mapping relationship between the score and the sample video. A server may query the recorded highest historical score of the sample video followed by the user according to an ID of the sample video and a user ID. If the score is higher than the recorded highest historical score, a new experience score acquired according to the score is shown; and if the score is not higher than the recorded highest historical score, an original experience score is shown. The recorded highest historical score is the highest score acquired when the user follows the sample video in the past time.

In some embodiments, for the score of the follow-up process, when a follow-up result interface of the follow-up process is shown, the score and the new experience score acquired according to the score are shown in the follow-up result interface.

In some embodiments, in the process of playing the sample video (that is, in the follow-up process), action matching is performed on the sample video and the local video stream to acquire a score of this follow-up process. After the sample video is played, (that is, after the follow-up process ends), the follow-up result interface is generated according to the acquired score, and the follow-up result interface has an experience score control for showing the experience score. When the score is higher than the highest historical score of the sample video followed by the user, the experience score control shows the experience score updated according to the score; and when the score is not higher than the highest historical score, the experience score control shows the experience score before this follow-up process.

In some embodiments, in response to an input instruction for playing (following up) the sample video, a controller acquires the sample video, and collects the local video stream through the image collector. The sample video includes first video frames for showing sample actions required to be followed by the user, and the local video stream includes second video frames for showing user actions; the first video frames and the second video frames corresponding to each other are matched to acquire a score based on a match result. If the score is higher than the recorded highest historical score, the new experience score acquired according to the score is loaded in the experience score control; and if the score is not higher than the recorded highest score, the original experience score is loaded and shown in the experience score control, and the original experience score is the experience score before this follow-up process.

In some embodiments, when the sample video is played, key tags on a time axis are detected; every time one key tag has been detected, a second key frame corresponding to a first key frame is acquired from the second video frames according to time information indicated by the key tag, and the second key frame is used for showing a key follow-up action of the user; and a match result of the first key frame and the second key frame corresponding to the key tag at the same time is acquired. For example, the first key frame and the second key frame corresponding to the key tag may be uploaded to a server, so that the server performs skeleton point matching on the key sample action shown in the first key frame and the key user action shown in the second key frame, and then the matching result returned from the server is received. For another example, the controller of the display apparatus may recognize the key sample action in the first key frame and the key follow-up action in the second key frame, and then perform skeleton point matching on the recognized key sample action and the key follow-up action so as to acquire the matching result. It can be seen that each second key frame corresponds to one matching result, which represents the matching degree or similarity between the user action in the second key frame and the key action in the corresponding first key frame. When the matching result indicates the matching degree/similarity of the user action and the sample action is low, it means that the user action is not standard enough; and when the matching result indicates that the matching degree/similarity of the user action and the sample action is high, it means that the user action is relatively standard.

In some embodiments, the display apparatus may acquire joint point data of the second key frames in the local video according to local video data, and upload the joint point data to the server to reduce the pressure of data communication.

In some embodiments, the display apparatus may upload key tag identifiers to the server to reduce the data communication pressure caused by communication of the first key frames.

In some embodiments, when the sample video is played, the key tags on the time axis are detected; every time a key tag is detected, the corresponding second key frame is acquired from the second video frames according to the time information of a first key tag, and the second key frame is used for showing the follow-up actions of the user.

In some embodiments, the second key frame is an image frame in the local video at the time of the first key tag.

In the embodiments of the present application, the time indicated by the key tag is the time corresponding to the first key frame, and the second key frame is a frame extracted from a sequence of second video frames according to the time information of the first key frame. Therefore, one key tag corresponds to a pair of first key frame and second key frame.

In some embodiments, the second key frames are image frames in the local video at the time of the first key tag and adjacent time points. An image for evaluation and show may be an image frame with the highest matching degree with the first key fame in the second key frames.

In some embodiments, the time information of the first key frame may be a time point when the display apparatus plays the frame; and according to the time point when the display apparatus plays the first key frame, the second video frame corresponding to the time point which is extracted from the sequence of second video frames is the second key frame corresponding to the first key frame. It should be noted that the video frame corresponding to a certain time point may be the video frame of which the time stamp is the time point, or the video frame of which time indicated by the time stamp is closest to the time point.

In some embodiments, the matching result is specifically a matching score, and the score calculated based on the matching result or the matching score may also be referred to as a total score.

In some embodiments, a certain target video includes M first key frames, which show M key actions; and the target video is provided with M key tags on the time axis. Second key frames corresponding to the M frames are extracted from the local video stream according to the M first key frames; and the M first key frames (the shown M key actions) and the M second key frames (the shown M user key actions) are sequentially subjected to corresponding matching to acquire M matching scores corresponding to the M second key frames. Summation, weighted summation, averaging or weighted averaging calculations is performed on the M matching scores to acquire the total score of this follow-up process.

In some embodiments, the display apparatus determines a frame extraction range for the local video stream according to the time information of the first key frames (key frames) in the target video, and extracts a preset number of local video frames from the local video stream according to the determined frame extraction range. For each extracted local video frame, the follow-up action of the user is recognized, the key follow-up action is compared longitudinally, and then the key follow-up action is matched with the corresponding key action to acquire the corresponding matching score. After the follow-up process ends, the total score of the follow-up process is calculated.

In other embodiments, the display apparatus sends the extracted local video frames to the server; and the server recognizes the follow-up action of the user in each frame, compares the key follow-up actions longitudinally, then matches the key follow-up actions with the corresponding key actions to acquire the corresponding matching score, calculates the total score of the follow-up process after the follow-up process ends, and returns the total score to the display apparatus.

In some embodiments, after the server acquires the matching score for a certain key follow-up action and sends a level identifier corresponding to the matching score to the display apparatus; and after the display apparatus receives the level identifier, the level identifier is displayed in a floating layer above a local picture in real time, such as GOOD, GREAT, PERFECT, etc., so as to feed the follow-up effect back to the user in real time. In addition, if the display apparatus determines the matching score of the follow-up actions of the user by itself, the display apparatus directly displays the level identifier corresponding to the matching score in the floating layer above the local picture.

In some embodiments, for the total score of each sample video for following, if the score is higher than the recorded highest score, a difference between the score and the recorded highest score is acquired; and the difference is added to the original total score to acquire a new total score, so as to avoid the situation that the user repeatedly follows the familiar video to increase the total score, and improve the fairness of the application.

In some embodiments, if the total score is higher than the recorded highest score, a corresponding experience score increment is acquired according to the total score; a new experience score is acquired by accumulating the experience score increment to the original experience score; and further, when the playing of the target video ends, the new experience score is shown on a display. For example, assuming that the total score is 85 and the highest historical score is 80, the experience score increment 5 is acquired according to the difference between the total score 85 and the highest historical score 80; and if the original experience score is 10005, the experience score increment 5 is accumulated into 10005 to acquire a new experience score 10010. Conversely, if the total score is not higher than the recorded highest score, the experience score increment is 0, that is, the experience score is not accumulated; and in this case, the original experience score is shown on the display.

In addition, if the total score is higher than the recorded highest score, the new experience score is used for replacing the original experience score; and if the total score is not higher than the recorded highest score, the original experience score is not updated.

It should be noted that "first" and "second" in the terms involved in the present application are used for distinguishing similar objects, and not necessarily used for describing a specific sequence or precedence order. In other embodiments, the first key frame may also be referred to as a key frame, and the second key frame may also be referred to as a local video frame or a follow-up screenshot.

In the above embodiments, in the process of following the target video by the user, the follow-up performance of the user is scored according to the local video stream collected by the image collector. If the score is higher than the recorded highest score, the new experience score is acquired according to the score and the new experience score is displayed; if the score is not higher than the recorded highest score, the experience score is not be updated and the original experience score is displayed, so as to prevent the user from maliciously getting the experience score by repeatedly following the same sample video.

In some embodiments, the above-mentioned first control for showing the first experience score and the second control for showing the second experience score are sub-controls of the experience score control. As the sub-controls, the first control and the second control are configured to be incapable of acquiring a focus, that is, they may not be operated alone; and the experience score control is configured to be capable of acquiring a focus, that is, it may be operated by the user.

In some embodiments, the user may operate the experience score control, such as a click operation, to enter an experience score detail page. Specifically, the controller of the display apparatus is configured to: in response to an operation for the experience score control, display the experience score detail page. The experience score detail page displays a plurality of time points within a preset time period and experience score detail data corresponding to the plurality of time points; and the experience score detail data corresponding to each time point includes the first experience score corresponding to the time point, the second experience score corresponding to the time point, and/or experience scores generated within a sub-time period between the time point and the last time point. Exemplarily, the preset time period is a time period including at least one statistical period. Exemplarily, the preset time period is a time period determined according to the current time point and a preset time length.

In some embodiments, the experience score detail page is a small window page of which size is smaller than an application homepage, and floats above the application homepage for display.

In some implementations, when the experience score detail page floats above the application homepage for display, the experience score control in the application homepage continues to be displayed, and the first control is still superposed on the second control for display.

FIG. 19D is an experience score detail page according to an exemplary embodiment of the present application. As shown in FIG. 19D, the experience score detail page shows: a plurality of time points from 0:00 on Monday of the nth week to 0:00 on Tuesday of the (n+1)th week, such as 0:00 on Monday of the nth week, 0:00 on Tuesday of the nth week, . . . , 0:00 on Tuesday of the (n+1)th week; and experience score detail data corresponding to the above-mentioned time points, specifically the first experience score corresponding to each time point, the second experience score corresponding to each time point, and the experience score generated within the sub-time period between two adjacent time points. It can also be seen from FIG. 19D that the experience score detail page is a small window page of which size is smaller than the application homepage, and is displayed on the upper layer of the application homepage. In this situation, the application homepage still displays the controls for showing the first experience score and the second experience score.

FIG. 19E is another experience score detail page according to an exemplary embodiment of the present application. Different from the experience score detail page as shown in FIG. 19D, the experience score detail page shown in FIG. 19E is a full-screen page and includes controls for showing the first experience score and the second experience score.

In some embodiments, the server or the display apparatus performs statistics on the experience score increment generated within a preset period, and when entering into the next period, according to the statistical experience score increment generated in the last period, the experience score of the user is updated. The preset period may be three days, seven days, and so on.

In some embodiments, in response to launching a target application, the controller of the display apparatus sends a request for acquiring the user experience score to the server, and the request includes at least user information. In response to the request, the server acquires the time of the last update of the user experience score, and determines whether an interval from the last update of the user experience score meets the time length of the above-mentioned preset period. If yes, the experience score increment generated in the last period is acquired, the user experience score is updated by accumulating the experience score increment generated in the last period to a total experience score, and the updated user experience score is returned to the display apparatus. If not, the user experience score is not updated, the current user experience score is directly returned to the display apparatus, or the display apparatus is notified to acquire the last issued user experience score data from cache data of the display apparatus.

Accordingly, the display apparatus receives the user experience score returned from the server to draw a user data display region in an interface so as to show the user experience score in the display region. If the display apparatus receives the updated user experience score, the user experience score in a cache of the display apparatus is updated at the same time.

In some embodiments, the experience score control includes an identifier set as shown in FIG. 9 in the user data display region, which is used for identifying the experience score increment that has been generated in the current period, for example, "this week +10" as shown in FIG. 9.

In some embodiments, the experience score controls include a first sub-control and a second sub-control. The first sub-control shows a total experience score at the end of the last statistical period, and the second sub-control shows the experience score increment that has been generated in the current statistical period. The first sub-control is a control where "dancing performance score 10012" is shown in FIG. 9, and the second sub-control is a control where "This Week +10" is shown in FIG. 9.

In some embodiments, the first sub-control and the second sub-control partially overlap, so that the user may intuitively see the two sub-controls at the same time.

In some embodiments, colors of the first sub-control and the second sub-control are different, so that the user may intuitively see the two sub-controls at the same time.

In some embodiments, the second sub-control is located in the upper right corner of the first sub-control.

In some embodiments, the user selects the identifier set in the user data display region to enter into a detail page showing the total experience score. After entering into the detail page, the second sub-control remains at the upper right corner of the first sub-control and shows the newly added point in the current statistical period.

In some embodiments, a follow-up result interface is further provided with a follow-up evaluation control, the follow-up evaluation control is used for showing a target state determined according to the score, and different scores correspond to different target states.

In some embodiments, the target state shown in the follow-up evaluation control is a star identifier as shown in FIG. 9.

In some embodiments, a corresponding relationship between the experience score data range and the star level is established in advance, for example, 0-20000 (the experience score range) corresponds to 1 star, 20001-40000 corresponds to 2 stars, and so on. Based on this, while showing the user experience score in the user data display region in FIG. 9, the star identifier corresponding to the experience score may also be shown in the follow-up evaluation control, such as 1 star shown in FIG. 9.

Embodiments of Follow-Up Screenshot Selection Schemes.

After a follow-up process ends, an interface for presenting score information as shown in FIG. 19A is presented on a display. When the interface is displayed on the display, a user may enter an interface for presenting detailed result information by operating a control used for checking a detailed result.

In some embodiments, the detailed result information may also be referred to as follow-up result information, and a user interface showing the follow-up result information is referred to as a follow-up result interface.

In some embodiments, in response to an instruction for checking the detailed result from a user, a display apparatus sends a request for acquiring the detailed result information interface to a server, and the display apparatus presents the detailed result information on the display according to detailed result information interface data issued by the server. The detailed result information includes at least one of login user information, star score information, evaluation words, and a plurality of follow-up screenshots. The follow-up screenshots are local video frames in a follow-up video collected from the user through a camera. The follow-up screenshots are used for showing follow-up actions of the user.

Figure 20:
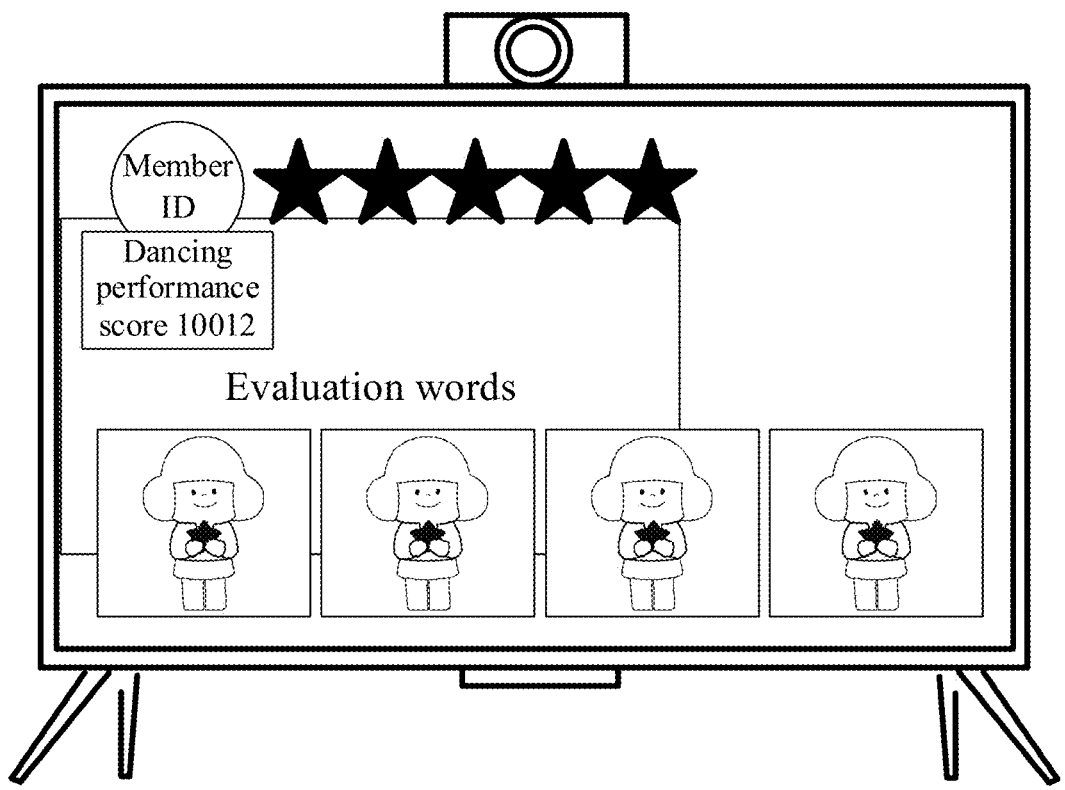
FIG. 20 illustrates a user interface presenting detailed result information according to an embodiment.

FIG. 20 illustrates an interface presenting detailed result information. As shown in FIG. 20, the interface shows the login user information (such as a member ID and a user experience score), the star score information, the evaluation words and four follow-up screenshots in the forms of items or controls.

In some embodiments, the follow-up screenshots are arranged and shown in the interface as shown in FIG. 20 in the form of thumbnails. The user may select a certain follow-up screenshot by operating a control device to move the position of a selector to check an original picture of the selected screenshot; and when the original picture of the selected screenshot is displayed on the display, the user may check original pictures corresponding to other follow-up screenshots by operating left and/or right direction keys.

Figure 21:
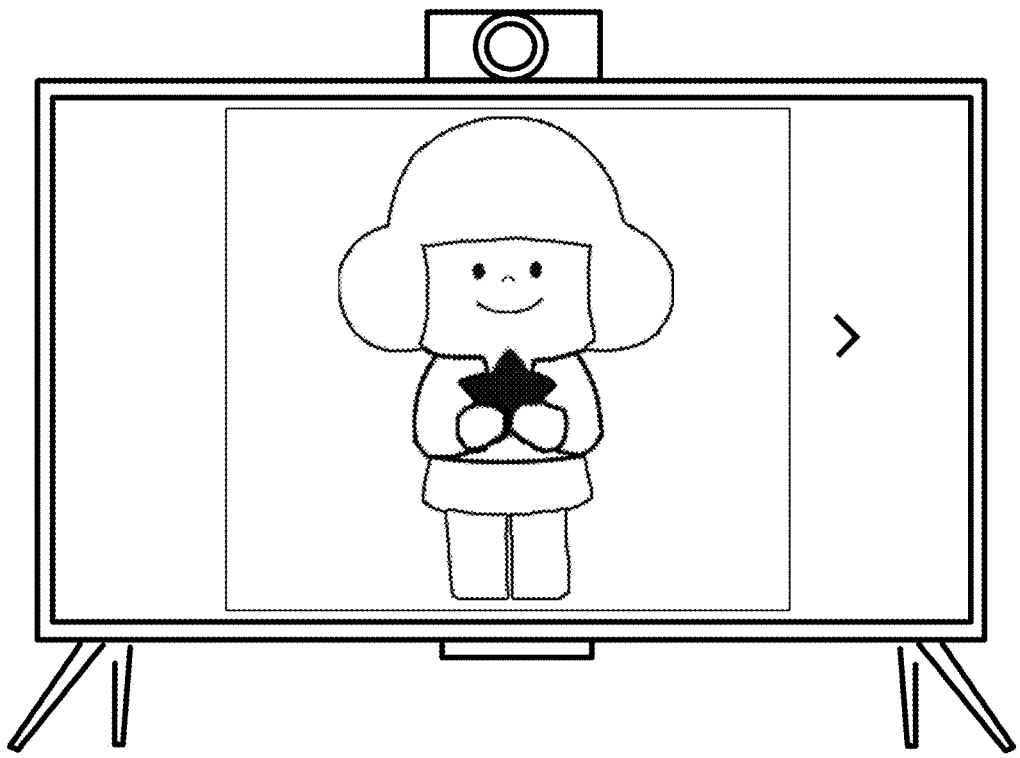
FIG. 21 illustrates a user interface to check an original file of a follow-up screenshot according to an embodiment.

In some embodiments, when the user selects a first follow-up screenshot for checking by operating the control device to move the selector, an original picture file corresponding to the selected screenshot is acquired and presented on the display, as shown in FIG. 21. In FIG. 21, the user may check original pictures corresponding to other follow-up screenshots by operating the left and/or right direction keys.

Figure 22:
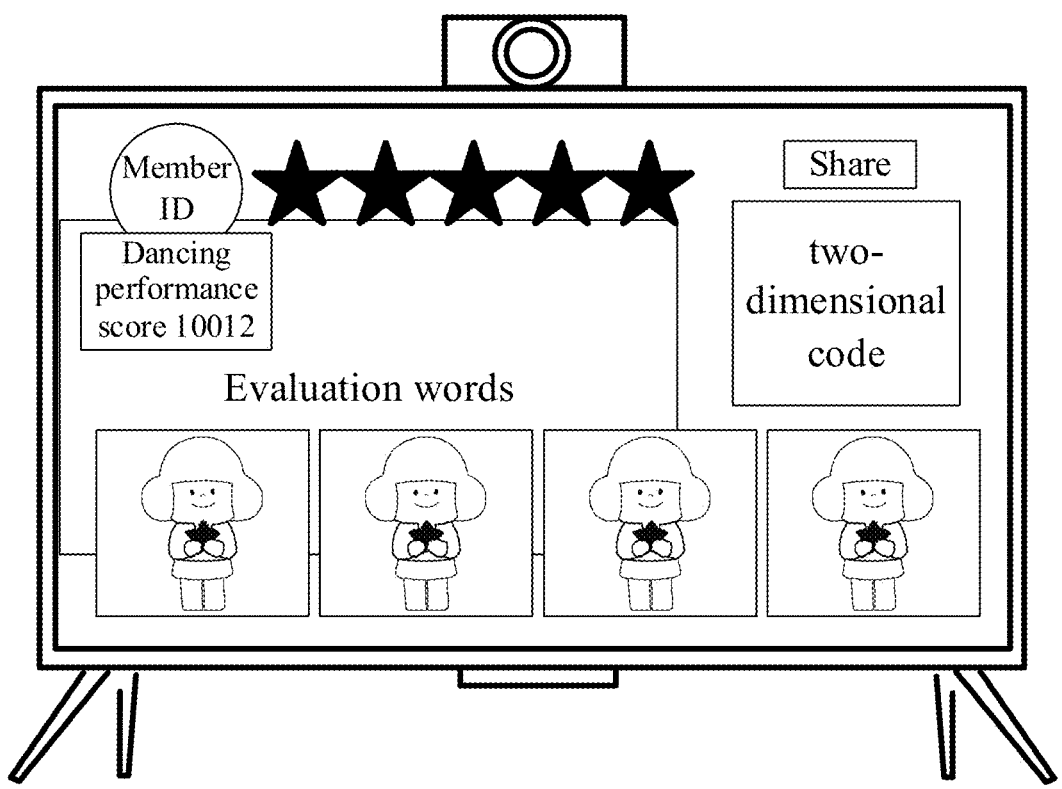
FIG. 22 illustrates another user interface presenting detailed result information according to an embodiment.

FIG. 22 illustrates another interface presenting detailed result information. Unlike the interface shown in FIG. 20, the interface shown in FIG. 22 also displays a sharing code picture (such as a two-dimensional code) containing a detailed result access address, the user may use a mobile terminal to scan the sharing code picture to check the detailed result information.

Figure 23:
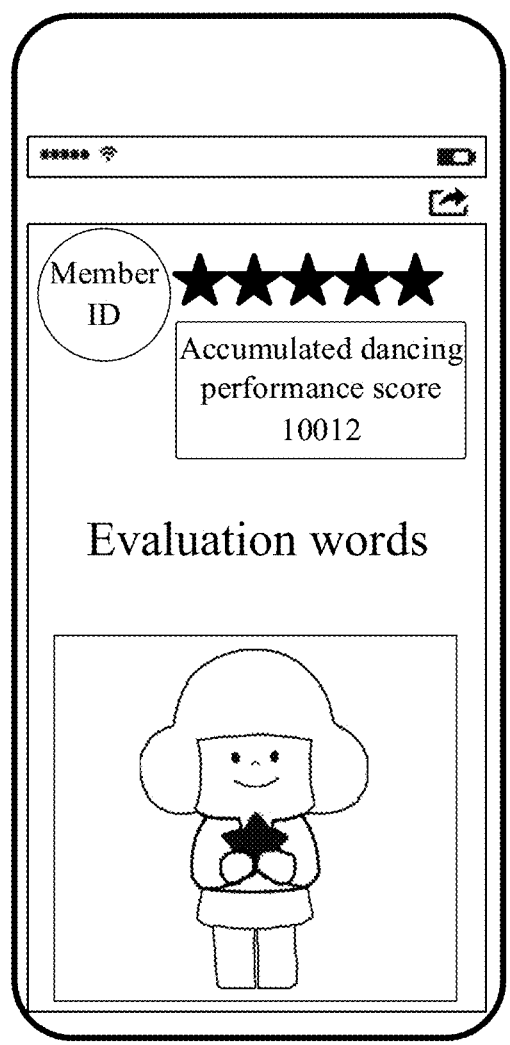
FIG. 23 illustrates a detailed result information page displayed on a mobile terminal device according to an embodiment.

FIG. 23 illustrates a detailed result information page displayed on a mobile terminal device. As shown in FIG. 23, the page shows login user information, the star score, evaluation words, and at least one follow-up screenshot. The user may share a page link to other users (that is, other terminal devices) by operating a sharing control on the page, and may also save the follow-up screenshot shown on the page and/or the original picture file corresponding to the follow-up screenshot on a local terminal device.

In order to motivate and urge the user, in some embodiments, if a total score of a follow-up process is higher than a preset value, N local video frames (TopN) with the highest matching score are shown on the detailed result information page (or the follow-up result interface), so that the highlight moment of the follow-up process is shown. If the total score is not higher than the preset value, N local video frames with the lowest matching score are shown on the detailed result information page, so that a moment required to be improved in the follow-up process is shown.

In some embodiments, after the server receives the request for acquiring the detailed result information interface, a score of the sample video followed by the user is acquired according to a matching degree of actions in key frames and the local video frames corresponding to each other. When the score is higher than a first value, a certain number of key frames (such as N, N≥1) and/or the corresponding local video frames with a high matching degree are issued to the display apparatus as detailed result information interface data. When the score is lower than a second value, a certain number of key frames and/or corresponding local video frames with a low matching degree are issued to the display apparatus as detailed result information interface data. In some embodiments, the first value and the second value may be the same value, and in other embodiments, the first value and the second value are different values.

In some embodiments, a controller acquires the sample video in response to an instruction for indicating following the sample video from a user. The sample video includes a sequence of key frames, the sequence of key frames includes a predetermined number (M) of key frames ordered in time, and each key frame shows a key action required to be followed by the user.

In some embodiments, after the server receives a request for acquiring the detailed result information interface, a score of the target video followed by the user is acquired according to a comparison relationship between target key frames and the corresponding local video frames. When the score is higher than the first value, a preset number of target key frames and/or corresponding local video frames with a high matching degree determined in the matching process are issued to the display apparatus as detailed result information interface data. When the score is lower than the second value, a preset number of target key frames and/or corresponding local video frames with a low matching degree determined in the matching process are issued to the display apparatus as detailed result information interface data.

In some embodiments, the controller plays a target video on a follow-up interface, and acquires the local video frames corresponding to the key frames from the local video stream in the process of playing the sample video; and the local video frames show the user actions.

In some embodiments, the comparison between the key frames and the local video frames is performed on the display apparatus. In the follow-up process, the controller matches key actions shown in the corresponding key frames with the user actions shown in the local video frames, so as to acquire a matching score corresponding to each local video frame, and acquire a total score according to the matching score corresponding to each local video frame. According to the total score, the target video frames to be shown as a follow-up result are selected, that is, if the total score is higher than a preset value, N local video frames (TopN) with the highest matching score are selected as the target video frames; if the total score is not higher than the preset value, N local video frames with the lowest matching score are selected as the target video frames, and N is the preset number of target video frames, for example, in FIG. 20, N=4. Finally, the follow-up result including the total score and the target video frames is shown, that is, the total score and the target video frames are shown in a detailed result page as shown in FIG. 20.

In some embodiments, the total score is obtained according to the summation, weighted summation, averaging, or weighted averaging calculations of the matching score corresponding to each local video frame.

In some embodiments, the controller detects key tags on a time axis in the process of controlling to play the sample video; every time one key tag is detected, a local video frame corresponding to the key frame in time is extracted from the local video stream according to time information of the key tag, a sequence of local video frames is generated according to the extracted local video frames, and the sequence of local video frames includes part or all of local video frames arranged in descending order according to the matching scores.

In some embodiments, first N local video frames in the sequence of local video frames serve as first local video frames, last N local video frames serve as second local video frames, the first local video frames are used for being shown in the follow-up result interface when the total score is higher than the preset value, and the second local video frames are used for being shown in the follow-up result interface when the total score is not higher than the preset value. In some embodiments, the preset value may be the first value or the second value in the above embodiments.

In some embodiments, the step of generating the sequence of local video frames may include: when a new local video frame is acquired, if the first local video frames and the second local video frames have an overlapping video frame, the newly acquired local video frame is inserted into the local video frame sequence according to a matching score corresponding to the newly acquired local video frame to obtain a sequence of new local video frames; and if the first local video frames and the second local video frames do not have overlapping video frames, the newly acquired local video frame is inserted into the sequence of local video frames according to the matching score corresponding to the newly acquired local video frame, and a local video frame with a matching score in the middle range is deleted to obtain a sequence of new local video frames.

In some embodiments, if the total score is higher than the preset value, N first local video frames are selected from the sequence of local video frames as the target video frames and shown in the follow-up result interface. If the total score is not higher than the preset value, N second local video frames are selected from the sequence of local video frames as the target video frames, and shown in the follow-up result interface.

It should be noted that the existence of the overlapping video frame in the first local video frames and the second local video frames means that the sequence of local video frames has a frame which can serve as both the first local video frame and the second local video frame. In this case, the number of frames in the sequence of local video frames is less than 2N.

It should also be noted that the absence of the overlapping video frame in the first local video frames and the second local video frames means that the sequence of local video frames has no frame which can serve as both the first local video frame and the second local video frame. In this case, the number of frames in the sequence of local video frames is greater than or equal to 2N. In some embodiments, when a sequence of pictures for showing detailed result information interface data is generated, either a display apparatus side (when the display apparatus executes the sequence generation) or the server (when the server executes the sequence generation) may adopt a bubble sorting algorithm.

The algorithm process is as follows: after the key frames and the local video frames are compared, the matching degree between the key frames and the local video frames is determined.

When the number of data frames in the sequence is lower than a preset value, the key frames and/or the local video frames are added to the sequence according to the matching degree. The preset value is a sum of the number of image frames required to be shown when the score is higher than the preset value and the number of image frames required to be shown when the score is lower than the preset value. For example, if the score is higher than the preset value, the number of image frames required to be displayed is 4 frames (groups), and the number of image frames required to be displayed when the score is lower than the preset value is 4 frames (groups), and then the preset value corresponding to the sequence is 8 frames (groups).

When the number of data frames in the sequence is greater than or equal to the preset value, according to the matching degree of this time and the matching degree corresponding to each frame (group) in the sequence, a new sequence is formed. In the new sequence, 4 frames (groups) with the highest matching degree are retained, 4 frames (groups) with the lowest matching degree are retained, and the middle frames (groups) are deleted, so as to keep the sequence at 8 frames (groups). In this way, it may be avoided that too many pictures are saved in cached data, which can improve the efficiency of processing.

In some embodiments, the frame refers to a local video frame contained in the sequence only, and the group refers to a group of parameters in the sequence that includes a local video frame in the sequence and a corresponding key frame.

In some embodiments, the comparison between the key frames and the local video frames is performed in the server, and the comparison process may refer to the description of other embodiments in the present application.

The server acquires the total score according to the matching score corresponding to each local video frame, and selects the target video frames to be displayed as the follow-up result according to the total score, that is, if the total score is higher than the preset value, N local video frames (TopN) with the highest matching score are selected and issued to the display apparatus as the target video frames; if the total score is not higher than the preset value, N local video frames with the lowest matching score are selected and issued to the display apparatus as the target video frames, and N is the preset number of target video frames, for example, in FIG. 20, N=4. Finally, the display apparatus shows the follow-up result including the total score and the target video frames according to the received data, that is, the total score and the target video frames are shown in the detailed result page as shown in FIG. 20.

In the case where the above-mentioned sequence of local video frames includes all the extracted local video frames, when each local video frame is extracted, the local video frame is inserted into the sequence of local video frames according to the matching score corresponding to the local video frame, so that the number of frames in the sequence of local video frames increases from 0 to M (the number of key frames included in the sample video), and the local video frames in the sequence are arranged in descending order according to the matching scores. When N frames with the highest matching score need to be shown, frames with the order as 1 to N are extracted from the sequence of local video frames; and when N frames with the lowest matching score need to be shown, frames with the order as (M−N+1) to M are extracted from the sequence of local video frames.

In the case where the above sequence of local video frames includes part of the extracted local video frames, an initial sequence is generated according to the acquired 1 to 2N local video frames, the 1 to 2N local video frames correspond to 1 to 2N key frames, and 2N local video frames are arranged in descending order according to the matching scores. Starting from a (2N+1)th frame (including a (N+1)th frame), every time a local video frame (the (2N+i)th frame) is acquired, the frame (the (2N+i)th frame) is inserted into the initial sequence according to the matching score corresponding to the frame (the (2N+i)th frame), and the frame with the order as (N+1) in the initial sequence is deleted until 2N+i is equal to the predetermined number, that is, the last frame is inserted to obtain the sequence of local video frames, where 2N is less than M, i∈(1, M−2N).

In some embodiments, when the sequence of pictures for showing the detailed result information interface data is generated, either the display apparatus side (when the display apparatus executes the sequence generation) or the server (when the server executes the sequence generation) may adopt a bubble sorting algorithm.

The algorithm process is as follows: after the key frames and the local video frames are compared, the matching degree between the key frames and the local video frames is determined.

When the number of data frames in the sequence is lower than the preset value, the key frames and/or the local video frames are added to the sequence according to the matching degree; where the preset value is a sum of the number of image frames required to be shown when the score is higher than the preset value and the number of image frames required to be shown when the score is lower than the preset value. For example, if the score is higher than the preset value, the number of image frames required to be displayed is 4 frames (groups), and the number of image frames required to be displayed when the score is lower than the preset value is 4 frames (groups), then the preset value corresponding to the sequence is 8 frames (groups).

When the number of data frames in the sequence is greater than or equal to the preset value, according to the matching degree of this time and the matching degree corresponding to each frame (group) in the sequence, the new sequence is formed. In the new sequence, 4 frames (groups) with the highest matching degree are retained, 4 frames (groups) with the lowest matching degree are retained, and the middle frame (group) is deleted so as to keep the sequence at 8 frames (groups). In this way, it may be avoided that too many pictures are saved in cached data, which can improve the efficiency of processing.

In some embodiments, the comparison between the key frames and the local video frames is performed in the server, and the comparison process may refer to the description of other embodiments in the present application.

The server acquires the total score according to the matching score corresponding to each local video frame, and selects the target video frames to be displayed as the follow-up result according to the total score, that is, if the total score is higher than the preset value, N local video frames (TopN) with the highest matching score are selected and issued to the display apparatus as the target video frames; if the total score is not higher than the preset value, N local video frames with the lowest matching score are selected and issued to the display apparatus as the target video frames, and N is the preset number of target video frames, for example, in FIG. 20, N=4. Finally, the display apparatus shows the follow-up result including the total score and the target video frames according to the data received, that is, the total score and the target video frames are shown in the detailed result page as shown in FIG. 20.

It should be noted that, in some embodiments, if the user exits the follow-up process in advance, the number of local video frames actually extracted may be less than the number N of target video frames to be displayed. In this case, the controller does not need to select the target video frames to be displayed according to the total score, and only the local video frames actually extracted are used as the target videos for display.

In some embodiments, upon receiving an operation for confirming the exit from a user, whether the number of video frames in the current sequence is greater than the number of video frames to be displayed is determined, if yes, the video frames to be shown are selected at the front section or the rear section of the sequence according to the scores, and if not, all the video frames are shown.

In some embodiments, upon receiving the operation for confirming the exit from a user, before whether the number of video frames in the current sequence is greater than the number of video frames to be displayed is determined, it's also necessary to determine whether the time length and/or the number of actions to be followed meets preset requirements, if yes, whether the number of video frames in the current sequence is greater than the number of video frames to be displayed will be determined, and if not, further determination is not performed.

In some embodiments, the display apparatus uploads the local video frames selected according to the total score to the server, so that the server adds the local video frames to practice record information of the user.

In some embodiments, what the display apparatus uploads to the server is joint point data of the local video frames and identifiers of the corresponding local video frames, and the server transmits information of the matching degree through the parameters and the display apparatus. In order to display pictures of this follow-up process in the subsequent usage history, after the display apparatus receives the detailed result page data, graphical scores are drawn according to the scores, comments are shown according to comment data, the local video frames in a cache are invoked according to the identifiers of the local video frames to show the follow-up pictures, and the local video frames corresponding to the identifiers of the local video frames and a detailed result page identifier are uploaded to the server. The server combines the received local video frames and detailed result page data into a piece of follow-up data according to the detailed result page identifier so as to be issued to the display apparatus in subsequent query of the follow-up history.

In some embodiments, in response to the end of the follow-up process, detecting whether an user input is received; and when the user input is not received within a preset time period, an auto-play prompt interface is presented and a countdown is started. The auto-play prompt interface displays countdown prompt information, auto-play video information, and a plurality of controls. The countdown prompt information at least includes a time length of the countdown, the auto-play video information includes a video cover and/or video name to be played after the countdown ends, and the plurality of controls may be a control for controlling replay, a control for exiting the current interface, and/or a control for playing the next video in a list of preset media resources, etc. During the countdown, continuing detecting whether the user input is received, e.g., the operation on the controls on the interface from a user via a control device. If the user input is not received before completing the countdown, the video displayed on the interface is played, and if the user input is received before completing the countdown, the countdown is stopped and a control logic corresponding to the user input is executed.

In some embodiments, the second value is less than or equal to the first value. In the case where the second value is less than the first value, when the score is higher than the second value but lower than the first value, the preset number of key frames and/or corresponding local video frames are allocated in each matching degree interval and issued to the display apparatus as follow-up screenshots.

Figure 24:
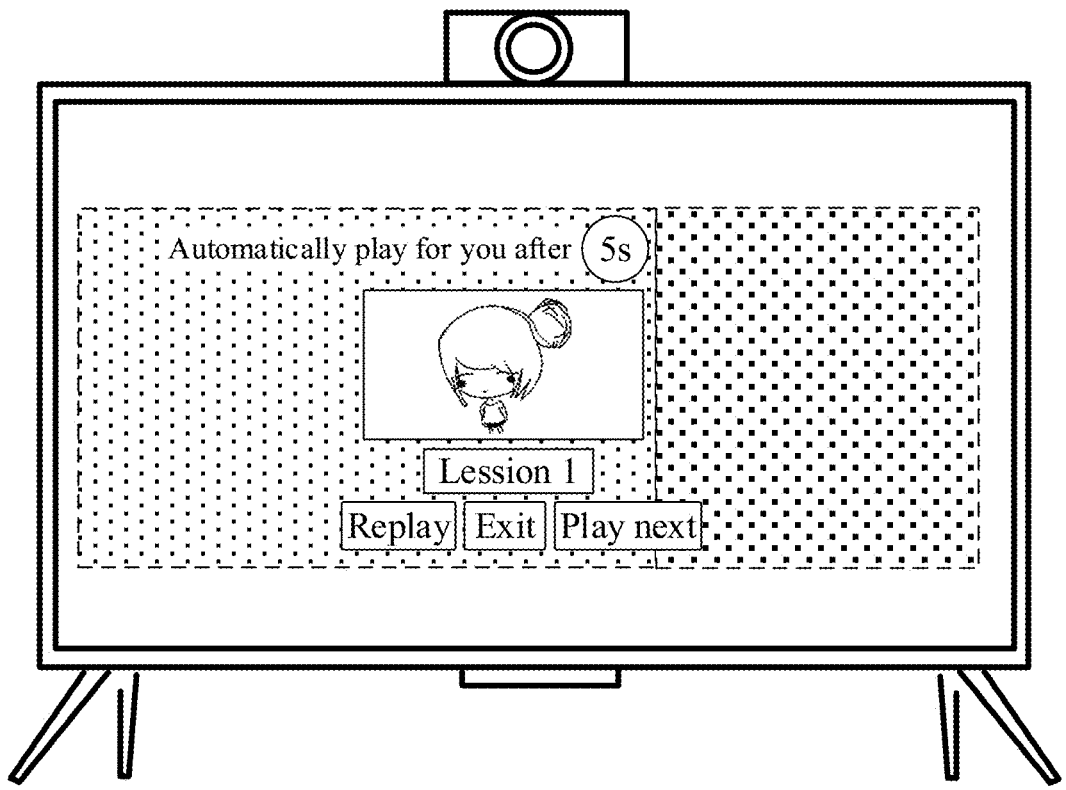
FIG. 24 illustrates a user interface displaying an auto-play prompt according to an embodiment.

FIG. 24 illustrates a user interface, which is an illustration of the above auto-play prompt interface. As shown in FIG. 24, the interface displays information, for example, countdown prompt information, that is, "Automatically play for you after 5 s"; the video information that is automatically played, that is, the video name "Lesson 1" and a cover picture of the video; a "Replay" control, an "Exit" control and a "Play next" control.

Embodiments of Follow-Up Record Show Schemes.

In some embodiments, a user may control the display of a follow-up record page of the user, or a practice record page by operating a control device. The practice record page includes a plurality of practice record entries, and each practice entry includes sample video information, score information, practice time information and/or at least one follow-up screenshot. The sample video information includes at least one of a cover, name, category, type, and time length of the sample video; the score information includes at least one of a star score, a score, and an experience score increment; the practice time information includes a practice start time and/or a practice end time; and the follow-up screenshot may be the follow-up screenshot displayed in the above detailed result information interface.

In some embodiments, when a display displays an application homepage as shown in FIG. 9, the user may operate a "My Dance" control on the page through the control device to input an instruction for indicating displaying the practice record page. When a controller receives the instruction, a request for acquiring the practice record information is sent to a server, and the request at least includes a user identification (ID). The server responds to the request sent from a display apparatus, searches for the corresponding practice record information according to the user identification therein, and returns the practice record information to the display apparatus. The practice record information includes at least one piece of historical practice record data, and each piece of historical practice record data includes sample video information, score information, practice time information, and at least one follow-up screenshot or a special identifier indicating no screenshot. The display apparatus generates the practice record page according to the practice record information returned from the server and presents the practice record page on the display.

It should be noted that the follow-up screenshots are displayed when the display apparatus collects images showing user actions.

In some embodiments, in response to the request sent from the display apparatus, the server searches for the corresponding practice record information according to the user identifier therein and determines whether each piece of historical practice record data in the practice record information includes a follow-up screenshot. For the entry not including the follow-up screenshot, the above-mentioned special identifier is added to the entry to indicate that no camera is detected in the follow-up process corresponding to the historical practice record data. At the display apparatus side, if the historical practice record data returned from the server includes data of the follow-up screenshots, such as file data or identifiers of the follow-up screenshots, the corresponding follow-up screenshots are displayed in the follow-up record entry on the follow-up record page. If the historical practice record data returned from the server does not include the follow-up screenshots but includes the above-mentioned special identifier, the follow-up record entry on the follow-up record page displays a preset identifier element for indicating no camera is detected.

In some embodiments, the display apparatus receives the data issued from the server and draws the follow-up record page; the follow-up record page includes one or more follow-up record entries; and each follow-up record entry includes a first picture control for showing the follow-up screenshots or a first identifier control for showing the preset identifier element, and further includes a second control for showing the sample video information and a third control for showing the score information and the practice time information.

In the process of drawing the follow-up record page, if historical follow-up record data does not include the above-mentioned special identifier, the follow-up screenshot is loaded in the first picture control of a first follow-up record entry, the sample video information is loaded in the second control, and the score information and the practice time information are loaded in the third control; and if historical follow-up record data includes the above-mentioned special identifier, the preset identifier element is loaded in the first identifier control of the first follow-up record entry, so as to alert that no camera is detected in this follow-up process.

In some embodiments, the follow-up screenshots displayed in the follow-up entries are follow-up screenshots displayed in the corresponding detailed result information page, and the specific implementation process refers to the above-mentioned embodiments, which will not be repeated here.

In some embodiments, the follow-up screenshots displayed in the follow-up record entries are also referred to as specified pictures.

In some embodiments, data of the specified pictures included in the historical follow-up record data are file data of the specified pictures or identifiers of the specified pictures, where the identifiers of the specified pictures are used for making the controller acquire the file data of the specified pictures corresponding to the identifiers of the specified pictures from a local cache of the display apparatus or from the server.

Figure 25:
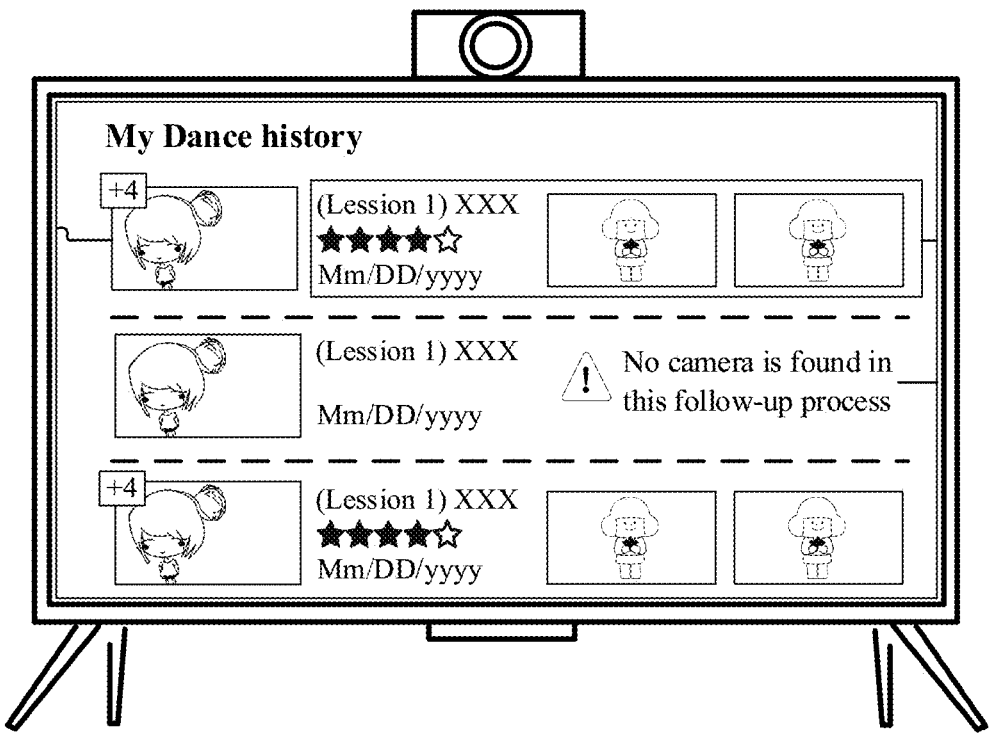
FIG. 25 illustrates a user interface displaying user practice records according to an embodiment.

FIG. 25 illustrates an interface displaying user practice records, which may be an interface entered by the user after operating the "My Dance" control in FIG. 9. As shown in FIG. 25, there are 3 practice entries displayed in the interface. In a showing region of each practice entry, the sample video information, the score information, the practice time information, and the follow-up screenshots or the identifier indicating that the camera is detected are shown. The sample video information includes the cover picture, the type (Lesson 1), and the name (XXX) of the sample video; the score information includes the experience score increment (such as +4) and the star identifier; and the practice time information is such as Mm/DD/yyyy.

In the above example, the user may acquire the past follow-up performance by checking the practice records, such as which sample videos have been followed up at what time, and the follow-up score, etc., so that the user may decide a later practice based on the past follow-up performance, or find the types of actions that the user is good at. For example, the user may follow the sample video with a lower score again, or focus on the corresponding type of videos according to the type of actions that the user is good at to further refine the practice.

Figure 26:
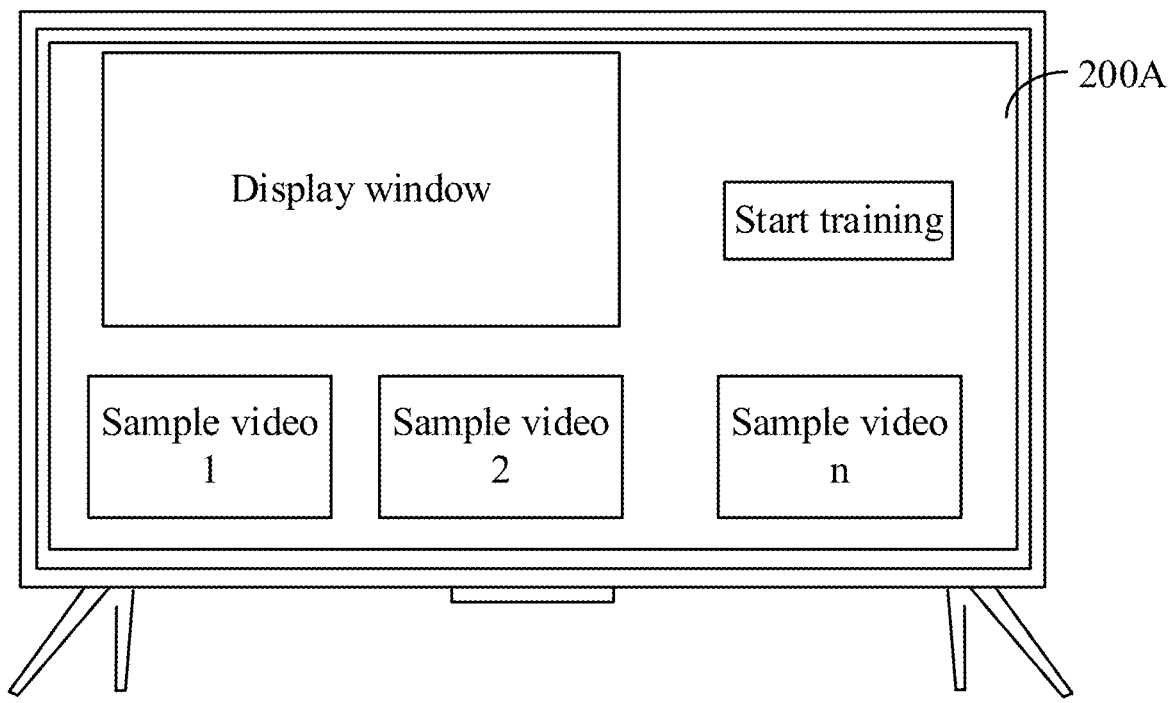
FIG. 26 is a schematic diagram of a first interface according to some embodiments.

A first interface of the display apparatus in a fitness environment is shown in FIG. 26. FIG. 26 is a schematic diagram of the first interface 200A. The first interface 200A may display a plurality of sample videos in a scrolling manner, so that the user selects a target sample video among the plurality of sample videos.

In some embodiments, fitness is also a kind of follow-up video, which is a kind of sample video.

Referring to FIG. 26, a displaying window is used for displaying the sample video selected by the user. When a confirmation instruction is received from a user, according to a position of a selector (focus) at a "start training" control of the first interface, the user selects the "start training" control in the first interface 200A. In response to the user's selection of the "start training" control, the controller may acquire and load a corresponding sample video source from the server based on an application programming interface (API).

In some embodiments, a playing window (also called a display window) is disposed in the first interface and used for playing a default training video or a previous training video in a playing history. At least one of an introduction showing control, the "start training" control (that is, a playing control) and a "favorite" control is disposed on the right side of the playing window. The interface also includes a training list control, and showing controls of a plurality of training videos are displayed in the training list control.

In some embodiments, after the "start training" control or the playing window is selected, the sample video may also be acquired after verification. Specifically, the sample videos which are downloaded in advance are displayed and stored; and then a mapping relationship between the sample videos and check codes is established. In response to the user's selection of the "start training" control, a check code is generated based on the sample video selected by the user. The controller may acquire the sample video corresponding to the check code in the stored sample videos based on the check code. Since the sample videos are pre-stored, after the controller acquires the check code, the sample video corresponding to the check code may be directly retrieved. The sample video is retrieved in the above manner, so that the lag problem caused by factors such as the network is avoided, the sample videos may be downloaded in advance before being acquired, and fluency of the sample videos is improved.

The camera is configured to collect local images or a local video; when the camera is not turned on, the camera is in a hidden position to keep the edge of the display apparatus smooth. After the camera is turned on, the camera raises and protrudes above the edge of the display apparatus to avoid shielding of the display to acquire image data.

In some embodiments, in response to the user's selection of the "start training" control, the camera is raised and started to acquire the image data. During the practice, the camera is always on, collects a local video in real time, and sends the collected local video to the controller so as to display the user actions on the follow-up interface. In this way, the users may watch their actions and actions of the sample video in real time.

In some embodiments, in response to the user's selection of the "start training" control, the camera is raised but in a standby state. Every time the sample video is played to a preset moment, the camera collects a local image and sends the collected local image to the controller. In this way, the pressure of a processor may be reduced, and the local image is maintained to be displayed to the next moment on the display.

The controller is configured to receive an input confirmation operation on the playing control, start the camera, and load video data of the sample video.

Figure 27:
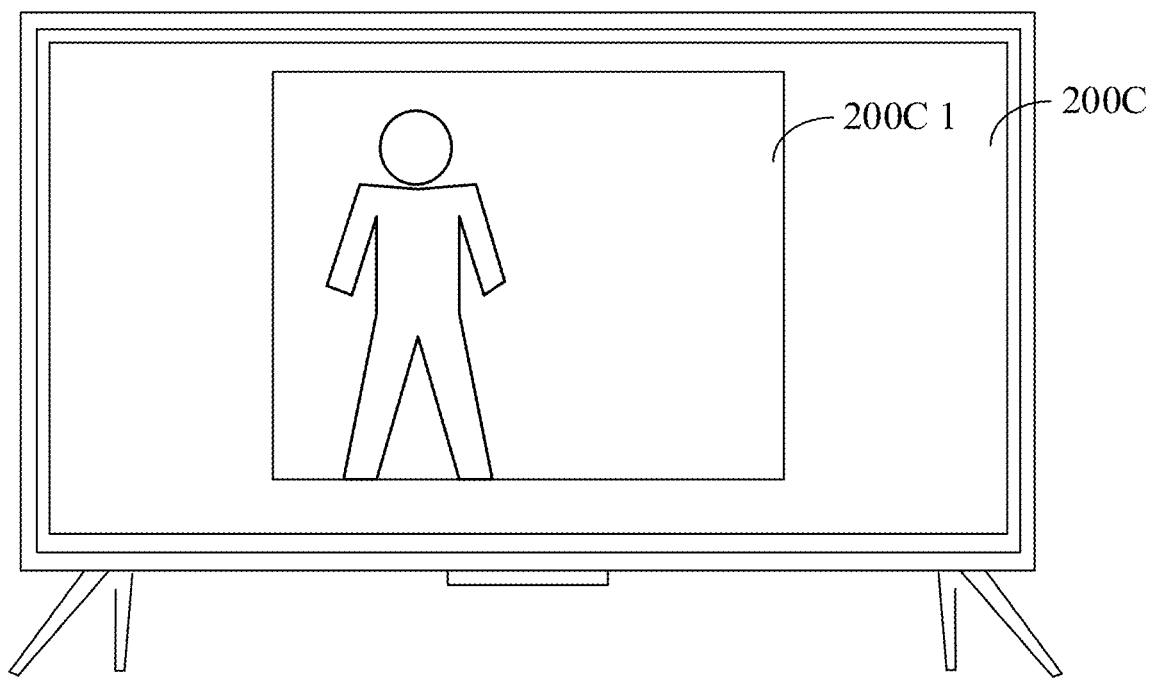
FIG. 27 is a schematic diagram of a prompt interface according to some embodiments.

In an implementation, in response to the confirmation operation which may be a selection of the "start training" control, the controller is further configured to control the display to display a prompt interface 200C (and a guide interface) for guiding the user to enter a predetermined region. The specific prompt interface may refer to FIG. 27 and FIG. 28. Specifically, FIG. 27 is a schematic diagram of a prompt interface according to some embodiments, and the user adjusts his or her position according to the prompt interface. After the user enters the predetermined region, the controller controls the display to show a second interface. Because there are edges in a collection region of the camera, in order to better collect the local data, the camera acquires the current image and creates a new floating layer above an image layer that displays the current image in the display process of the display, the best collection region is determined in the floating layer according to the position and angle of the camera, and the best position frame is displayed in the floating layer according to the best collection region, so as to guide the user to move in position. The position in the collected current image and the best position frame in the floating layer are consistent; and when the overlapping degree reaches a preset threshold value, the display apparatus displays a prompt message of success, cancels the floating layer, and skips to the follow-up interface shown in FIG. 29.

Figure 28:
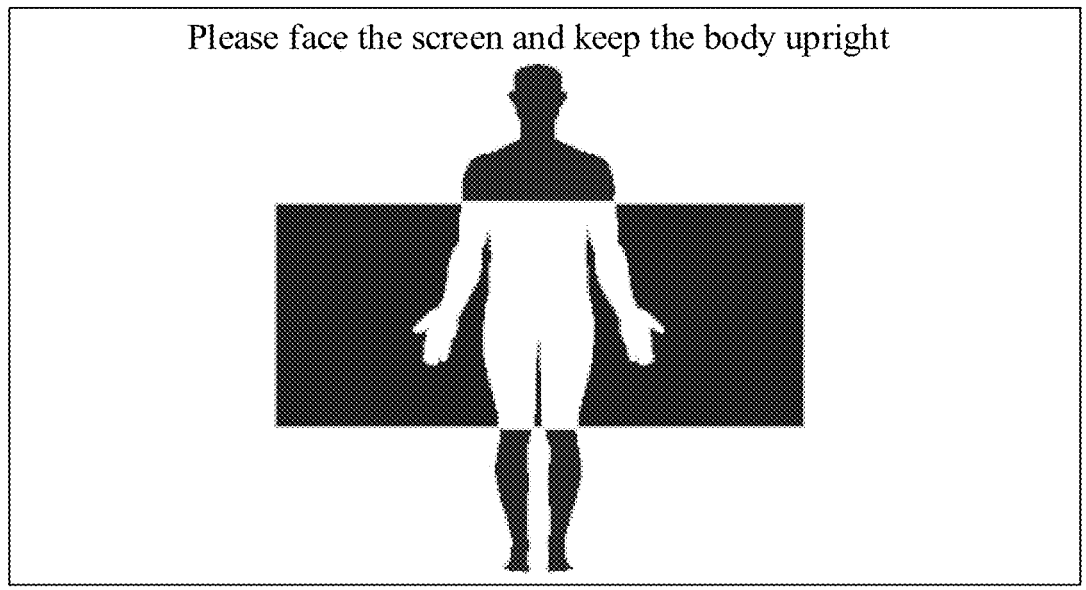
FIG. 28 is a schematic diagram of a prompt interface according to some embodiments.

For example, in some embodiments, a figure in the prompt interface 200C is located on the left side of a box region 200C1, and the user is correspondingly prompted to move to the right. If a figure in a display picture is located on the right side of the box region, the user is correspondingly prompted to move to the left, so that the user enters the predetermined region, where the predetermined region is a region which allows the camera to collect good images. The embodiment of the present application shows that the user is indicated to enter the predetermined region in the above-mentioned manner. In some embodiments, the prompt interface is also used for displaying prompt information. For details, refer to FIG. 28, and FIG. 28 is a schematic diagram of a prompt interface according to some embodiments. The prompt information is prompt information "Please face the screen and keep the body upright". A message prompting the user to move may be a text displayed on the floating layer, or a speech reminder, or an indication mark pointing to the best position frame.

In an implementation, the controller may also directly display the second interface in response to a confirmation operation, play the sample video in the first playing window, and play the local images in the second video window. The user may adjust his or her position according to an image displayed in the second video window in the second interface.

In an implementation, the controller may also determine the occurrence number of the guide interface in response to a confirmation operation, show the guide interface when the number of showing times of the guide interface does not meet a preset value, and directly show the second interface when the number of showing times of the guide interface meets the preset value. The sample video is played in the first playing window, and the local images are played in the second video window. The user may adjust his or her position according to the image displayed in the second video window in the second interface.

Figure 29:
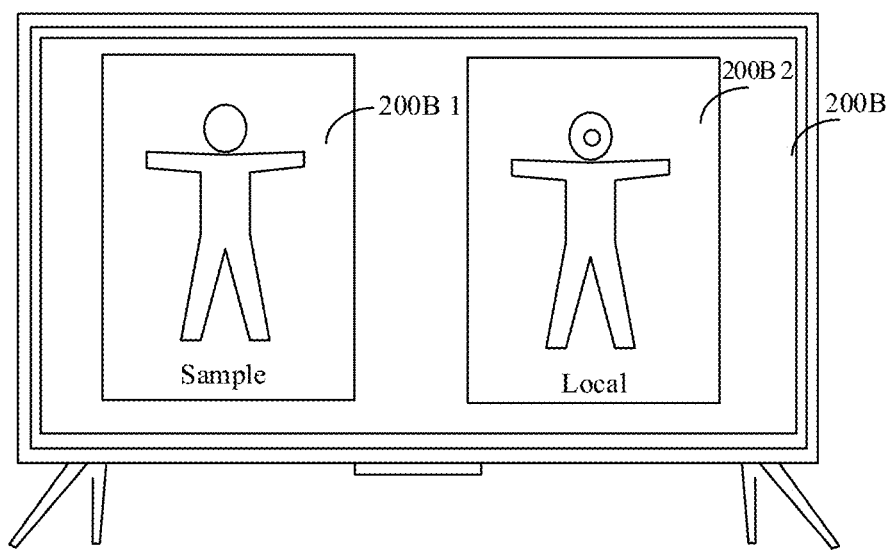
FIG. 29 is a schematic diagram of a second display interface according to some embodiments.

For details, please refer to FIG. 29, and FIG. 29 is a schematic diagram of a second display interface 200B according to some embodiments. The second display interface 200B includes a first playing window 200B1 for playing the sample video and a second playing window 200B2 for playing the local images collected by the camera.

In some embodiments, the sample video is played in the first playing window, and joint points are not shown in the sample video. The local image data played in the second playing window includes positions of joint points which correspond to the local image data and are acquired by the controller according to the local image data, and the local image data and joint point marks are superposed and then displayed on the second playing window according to the positions of the joint points.

In some embodiments, superposing the local image data and the joint point marks includes that the joint point marks are added to the local image according to the positions of the joint points in the local image data, and then are output in an image layer to display the local image after the joint points are superposed. It may also be that the local image acquired by the camera is displayed in an image layer, a floating layer is added above the layer, joint surface marks are added to the floating layer according to the positions of the joint points, and the local image is displayed after two image layers are superposed.

In some embodiments, the second playing window directly plays the local video collected by the camera.

The embodiments of the present application illustrate the display apparatus. The display apparatus includes a display, a camera and a controller. The controller is configured to, in response to a user's selection of the "start training" control in the display interface, acquire the sample video, and raise and turn on the camera; where the camera is configured to collect the local images; and control a first playing window of the display to play the sample videos; where a second playing window of the display shows the local images. It can be seen that according to the embodiments of the present application, the sample videos are shown through the first playing window; the local images are shown through the second playing window; during the practice, the user may adjust his or her actions in time by comparing contents shown in the two windows, therefore the user experience is improved.

The camera is configured to collect a local video, which is a collection of continuous local images. In the comparison process, if the comparison is performed for each frame of image, the data processing capacity of the controller is relatively large.

In view of the processing issues, in some embodiments, the controller may compare the local images with sample video frames to generate a comparison result. After the user practices, the user may watch the comparison result through the display interface, thereby helping the user to better understand own action defects, so that the user may overcome the action defects in the follow-up fitness process. The sample video frames are graphics corresponding to the local images in an sample video.

In some embodiments, there are a plurality of ways to collect the local images.

For example, the controller may control the camera to collect the local images when the sample video is played to a preset moment; and then, the local images collected by the camera are compared with the pre-stored sample video frames to acquire the comparison result. In some embodiments, when the sample video is played to the preset moment, the controller will control the camera to collect a local image. The preset moment appears every T time interval from the appearance of the first image in the sample video as a starting point until the last frame of image appears in the sample video. The preset moment may also be generated based on the content of the sample video, and each action node in the content of the sample video serves as a preset moment. For example, for a sample video, the starting point of the appearance of the first image is 3S, the T time interval is 10S, and the length of the sample video is 53S. The corresponding preset moments are: 3S, 13S, 23S, 33S, 43S and 53S. The controller may control the camera to collect a local image when the sample video is played to 3S, 13S, 23S, 33S, 43S and 53S. In the sample video, tags may be added according to the preset time nodes, and the local images may be collected when the tags appear in the playing time.

For another example, the camera is always on, records the local video in real time, and sends the local video to the controller. The controller may extract the corresponding local images in the collected local video at the preset moments, and then compare the extracted local images with the pre-stored sample video frames to obtain the comparison result. The specific implementation process is as follows: when the sample video is played to the preset moments, the controller extracts one or more local images from the local video collected by the camera. The preset moments may appear every T time interval (that is, the time when the sample actions appear) from the appearance of the first image in the sample video as the starting point until the last frame of image appears in the sample video. The preset moments may also be generated or pre-marked based on the content of the sample video, and each action node in the content of the sample video serves as one preset moment. For example, for a sample video, the starting point of the appearance of the first image is 3S, the preset moments are 3S, 16S, 23S, 45S, and 53S, and the controller may collect one local image when the sample video is played to 3S, 16S, 23S, 45S and 53S. It can be seen that the appearance time of the sample actions is arbitrary, and the acquisition of the images to be compared is triggered according to the tags or moments which identify the sample actions.

Usually, after watching the coaching actions played by the sample video, the user imitates the coaching actions to produce the corresponding actions. There is an inevitable delay between receiving the sample actions by the user and producing the corresponding actions by the user. In order to offset the delay, the embodiments of the present application show a collection method of a delayed image. The concept of the delayed collection moment is introduced in the present embodiment, wherein delayed collection moment=preset moment+preset response time length. When the sample video is played to the delayed collection moment, the controller controls the camera to collect the local video.

The embodiments of the present application have used a large amount of experimental data statistics. The reaction time of the user during the period from receiving the sample actions to producing the corresponding actions is 1S, and correspondingly, the embodiments of the present application configures the preset reaction time length to 1S. For example, the preset moments are 3S, 13S, 23S, 33S, 43S and 53S, and the corresponding delayed collection moments are 4S, 14S, 24S, 24S, 44S, and 54S. The appearance of the first frame of image in the sample video serves as the starting point, and the controller controls the camera to collect the local images respectively at the 14S, 14S, 24S, 24S, 44S, and 54S after the starting point.

The controller compares the local images with the sample video frames to generate a comparison result, where the sample video frames are images corresponding to the local images in the sample video, or standard image frames corresponding to the preset moments in the sample video. In the embodiments of the present application, the images in the sample video may be images with marks. The marks may be time marks, but are not limited to time marks. Subsequently, the corresponding relationship between the local images and the sample video frames may be determined based on the marks. For example, when the sample video is played to 4S, the controller controls the camera to collect the local video, the time mark corresponding to the local video is 3 s, and the local video is compared with a target video whose time mark is 3S.

In some embodiments, the joint point data of the sample video frames is stored in the sample video, and the joint point data is preset in advance. Since there is no requirement for other image frames except the sample video frames, joint point data of other image frames may not be preset.

In the above embodiments, the preset reaction time length is configured to be 1S. However, 1S is a piece of statistical data. Usually, the response time length of the user is 1S, but 1S is not suitable for all users. In the actual application process, the preset response time length may be set according to requirements.

Action comparison through image comparison may cause a greater processing burden. In order to further reduce the data processing amount of the controller, the embodiments of the present application may only compare some "key parts" in the local images with that in the sample video in the specific implementation process, i.e., action comparison is completed by comparison of the joint points.

Before the local images are played in the second video window, the controller is further configured to: recognize the joint points in the local images and compare the joint points in the local images with the joint points in the sample video.

Figure 30:
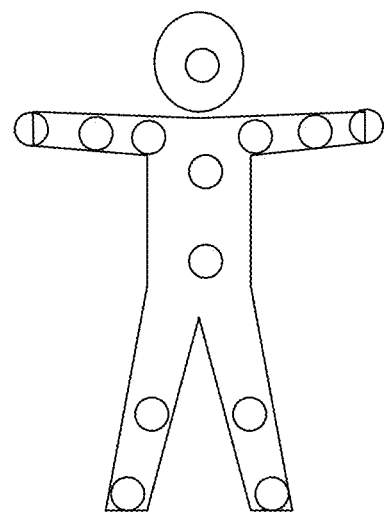
FIG. 30 is a local image marked with 13 joint positions according to some embodiments.

In some embodiments, the controller is configured to, in response to a user's selection of the "start training" control in a first display interface, control to start the camera, so that the camera collects the local images. The camera transmits the collected local images to the controller, and the controller recognizes the joint points in the local images. In some embodiments, the controller recognizes the joint points in the local images according to a preset model, the joint points are points corresponding to joints of a human body and the head of the human body, and the human body usually includes 13 joint positions. The controller marks 13 important bone joint positions in the whole body, where the local image marked with 13 joint positions may be referred to FIG. 30. The 13 joint positions are the left wrist, left elbow, left shoulder, thoracic cavity, waist, left knee, left ankle, head, right wrist, right elbow, right shoulder, right knee and right ankle. However, in some collected local images, the joint positions in the human body may sometimes partially miss, and in this case, only the human body part in the images may be recognized.

The controller is also configured to compare the joint points in the local images with the joint points in the sample video/sample video frames; and determine the degree of difference between the human actions in the local images and the human actions in the sample video; and mark the recognized joint points in the collected local images; where different colors mark the joint points with different degrees of action difference.

There are a plurality of implementation ways to determine the degree of difference between the human actions in the local images and the human actions in the sample video.

For example, the comparison method may be to compare positions of the joint points of the human body in the local images with relative positions of the joint points of the human body in the sample video. The comparison result is obtained based on the difference in relative position. Different comparison results are marked with different colors.

For example, the position of the left wrist of the human body in the local image differs from the position of the left wrist of the human body in the sample video by 10 standard values, and the joint point of the left wrist may be marked in red. The position of the right wrist of the human body in the local image differs from the position of the right wrist of the human body in the sample video by 1 standard value, and the joint point of the right wrist may be marked in green.

For another example, the comparison method may be to calculate a matching degree of the two joint positions, and generate the corresponding result according to the matching degree, or determine the matching degree of the actions according to the relative position relationship between the own joint points.

In some embodiments, the recognition and matching of the joint points may also be replaced with other implementation means in related technologies.

In some embodiments, exemplary joint positions are marked in the sample video in advance and are stored together with the sample video in a local data list. The marking process of the exemplary joint positions is similar to the marking process shown in some above embodiments, which will not be described in detail here.

In some embodiments, the controller compares a first angle in the local image with the corresponding standard angle to generate a comparison result, where the first angle is an included angle between a connection line of each joint position and the adjacent joint position and a connection line of the trunk in the local image, and the standard angle is an included angle between a connection line of each joint position and the adjacent joint position and a connection line of the trunk in the sample video.

The corresponding relationship between the first angle and the standard angle may be generated based on the time marks. For example, the collection moment of the local image is 10S, and then the standard angle corresponding to the first angle of the left ankle is an included angle between a connection line of the left ankle and the adjacent joint position and a connection line of the trunk in an image that appears at 10S in the sample video.

Figure 31:
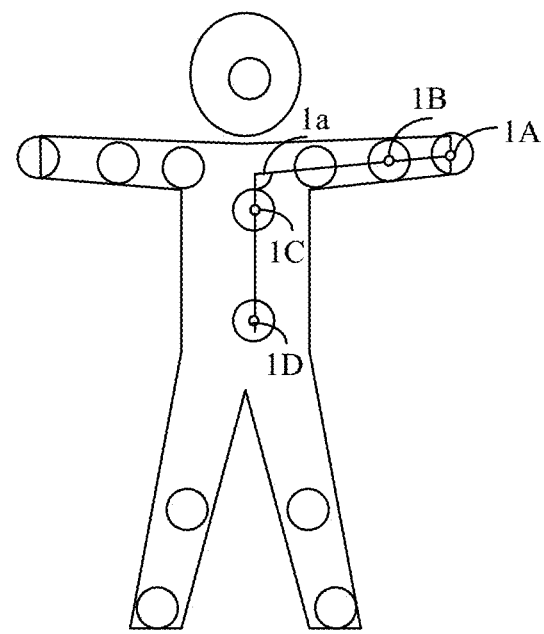
FIG. 31 is a local image with joint annotations according to some embodiments.

For example, please refer to FIG. 31, and FIG. 31 shows a local image with joint annotations according to some embodiments. For the left wrist 1A, the joint position adjacent to the left wrist 1A is the left elbow 1B, and correspondingly, an included angle between the connection line of the left wrist 1A and the left elbow 1B and the connection line of the trunk is called the first angle 1a. Through the above method, first angles corresponding to the left elbow, left shoulder, left knee, left ankle, head, right wrist, right elbow, right shoulder, right knee and right ankle may be calculated respectively.

The method for generating the standard angle may refer to the method for generating the first angle, which will not be repeated here.

The controller calculates the matching degree between each first angle and the corresponding standard angle; and the matching degree may be used for evaluating whether the complete user actions are standard.

It can be seen that the embodiments of the present application may calculate the difference between the position of each joint position and the standard position, thereby helping the user understand the completion of each part and improving the user experience.

In order to help the user further understand the completion degree of the actions of each part, in the embodiments of the present application, the controller calculates the matching degree between each first angle and the corresponding standard angle, and marks the joint points with the corresponding colors according to regions conforming to the matching degree.

For example, in some embodiments, the matching degree may be represented by an angle deviation, and a matching result is based on a preset standard deviation value. For the angle deviation greater than 15 degrees, the corresponding joint positions may be marked in red; for the angle deviation of 10 degrees to 15 degrees, the corresponding joint positions may be marked in yellow; and for the angle deviation below 10 degrees, the corresponding joint positions may be marked in green.

Figure 32:
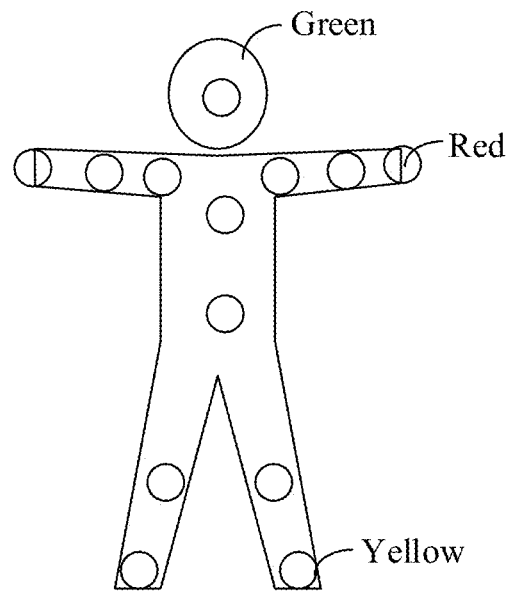
FIG. 32 is a local image with color marks according to some embodiments.

For example, the first angle of the left wrist joint in the local image collected at 10S is 20 degrees different from the standard angle corresponding to the 10S in the sample video, and the corresponding left wrist joint may be marked in red; the first angle of the left ankle joint in the local image collected at 10S is 12 degrees different from the standard angle corresponding to the 10 s in the sample video, and the corresponding left ankle joint may be marked in yellow; the first angle of the head in the local image collected by 10S is 6 degrees different from the standard angle corresponding to the 10 s in the sample video, and the corresponding head may be marked in green; and correspondingly, the marked local image may be seen in FIG. 32.

Due to the mismatch of actual human actions, the embodiments of the present application show a "range" comparison method. That is, when the sample video is played to the sample video frame, the display apparatus acquires a plurality of image frames at moments adjacent to the moment from the local video. In some embodiments, when the sample video is played to the preset moment, the controller selects the plurality of image frames at moments adjacent to the moment from the local video as a set of first images, and the first set of images at least includes a first local image and second local images, where the first local image is a local image corresponding to the preset moment, and the second local images are corresponding local images at moments adjacent to the preset moment.

In some embodiments, the controller calculates the matching degree between the local images in the first set of images and the sample video frame, takes a comparison result of the local image with the highest matching degree as the comparison result at the moment, and takes the local image with the best matching degree with the sample video frame as the local image corresponding to the moment.

In some embodiments, it may also be that the controller calculates the matching degree (also referred to as the difference degree of human actions) between the first local image and the sample video frame. When the difference degree of the human actions is greater than a preset threshold value, the controller selects an image with the highest matching degree with the sample video frame from the first set of images as a replacement image, and marks the replacement image according to a comparison result of the replacement image and the sample video frame.

For example, the matching degree between the first angle of the corresponding wrist joint in the local image collected at 10S and the standard angle corresponding to the 10S in the sample video is 20%, and the preset matching degree (preset threshold value) is 25%. In this case, the controller determines the first image set of the target data set; and the first image set includes the local images contained in the target data set during the period of 1S-13S. The matching degree between the first angle of the wrist joint in each local image and the standard angle of the wrist joint 10S of the sample video frame is calculated, and the calculation result is that the matching degree between the data corresponding to 8S and the standard angle of the wrist joint at 10S of sample video frame is 80%, which means the highest matching degree is 80%. The comparison result of the wrist joint corresponding to 10S is adjusted to 80%, the wrist joint is marked with the color corresponding to 80%, and the controller caches the marked local video.

In some embodiments, when the sample video finishes playing, the controller may control the display to show a practice evaluation interface, and the practice evaluation interface is used for showing marked local images. The practice evaluation interface may refer to FIG. 33. The practice evaluation interface may show a level of score of the user, user actions, and standard actions at the same time. The level of score may be generated based on the matching degree between the local images and the sample video frames.

In some embodiments, the practice evaluation interface may show a plurality of corresponding user actions and standard actions in a scrolling manner. The showing order may be that the user actions and the standard actions are shown in order from low to high score. The higher the matching degree with the sample video frames is, the higher the score is.

Figure 33:
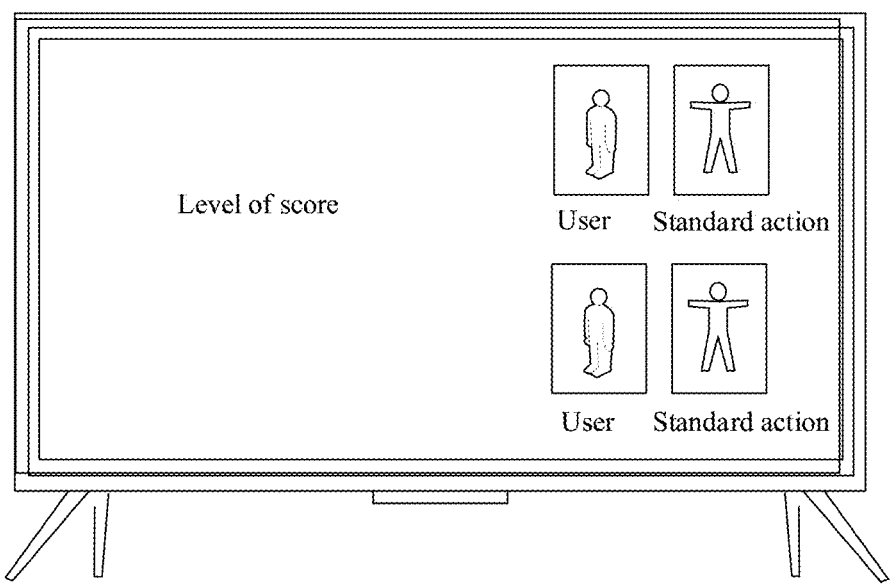
FIG. 33 is a practice evaluation interface according to some embodiments.

In other embodiments, the showing form of the practice evaluation interface may refer to FIG. 33. The practice evaluation interface is provided with two displaying windows. One displaying window displays the local image corresponding to the moment in the user actions, and the other playing window displays the sample video frame corresponding to the standard actions.

In some embodiments, in order to further reduce the data processing amount of the controller, the 'joint point comparison process' may be placed on a server side for execution. The specific implementation process is as follows.

In some embodiments, before the local images are played in the second video window, the controller is further configured to: recognize the joint points in the local image and send the joint points in the local image to the server, so that the server compares the joint points in the local image with the joint points of the sample video frame in the sample video, determines the difference degree between the human actions in the local image and the human actions of the sample video frame in the sample video, and generates feedback information for sending to the display apparatus.

In some embodiments, a joint point recognition unit in the display apparatus recognizes and marks the joint points of all images collected by the camera, and displays the joint points in the second playing window. When the sample video is played to the sample video frame, the display apparatus uploads the joint point data of the local image collected at this moment and/or the joint point data of the local images collected at adjacent moments to the server to determine the matching degree.

The comparison method of the difference degree between the human actions in the local images and the human actions in the sample video may refer to the above embodiments, which will not be repeated here.

The controller is further configured to receive feedback information sent from the server, and mark the recognized joint points in the local images according to the feedback information, where different colors mark the joint points with different difference degrees of actions.

Further, according to the embodiments of the present application, different colors are adopted to mark the completion of actions of each joint position. Different colors are used for distinguishing the completion of each joint of the user, and different colors play a distinguish role. It can be seen that the embodiments of the present application further helps the user understand the completion of actions of each part.

Figure 34:
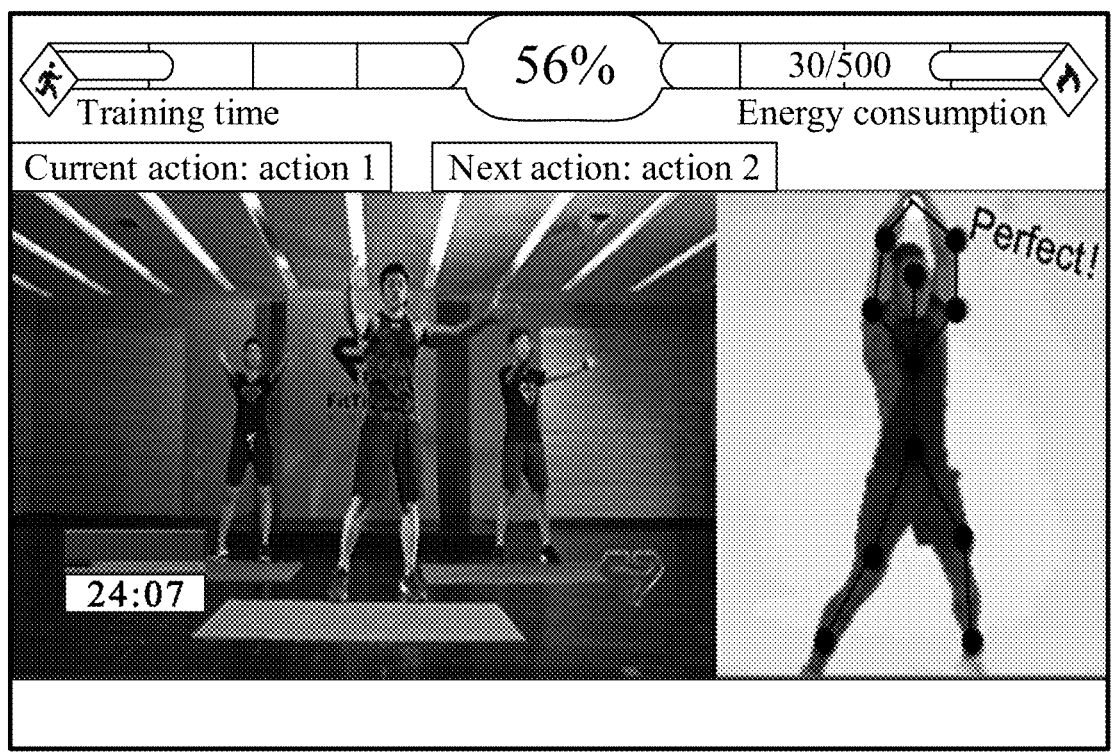
FIG. 34 is a schematic diagram of a second display interface according to some embodiments.

In some embodiments, as shown in FIG. 34, in the second display interface, if the matching degree between the user actions and the actions of the sample video frame at the moment is high, a floating layer is added in the second playing window to display a prompt text so as to encourage the user.

In some embodiments, as shown in FIG. 34, in the second display interface, a training progress control is also disposed above the second playing window to show the completion degree of the user actions; and the controller controls a completion degree value displayed in the training progress control to be increased when detecting that the matching degree between the user actions and the actions of the sample video frame is higher than the preset value. When detecting that the matching degree between the user actions and the actions of the sample action frame is lower than the preset value, the controller controls the completion degree value displayed in the training progress control to remain unchanged.

In order to reduce the data processing amount of the server, in some embodiments, the server may process the local images corresponding to the preset moments. The specific implementation process may be as follows: the controller sends the joint points in the local image to the server, specifically, when the playing time of the sample video reaches the preset moment, the controller caches the local images collected within a predetermined time period before and after the preset moment, recognizes the joint point data of the cached local image and sends the recognized joint point data to the server.

The caching process of the local images may refer to the above embodiments, which will not be repeated here.

It is worth noting that, because the images occupy a large bandwidth in the transmission process, in order to reduce the bandwidth occupied in the data transmission process, the embodiments sends the joint points of the local video to the server.

In some embodiments, the controller may be further configured to send the recognized joint point data to the server, and in this case, send the preset moments to the server, so that the server determines image frames (that is, target images) of the sample video for comparison according to the preset moments.

In some embodiments, the controller marks the local images and caches pictures of the marked local images and the sample video frames corresponding to the preset moments when the difference degree of human actions is greater than a preset threshold value, so that at the end of playing of the sample video, the local video with a large difference of actions is retrieved.

In some embodiments, the controller controls the display to display the practice evaluation interface after playing ends, and shows the cached pictures of the marked local images and the sample videos corresponding to the preset moments on the practice evaluation interface.

In some embodiments, the sample video frames at the preset moments and the corresponding local images are sorted according to the matching degrees (or scores), and after the sample video finishes playing, the sample video frames with the low matching degree (or score) at the preset number of moments and the corresponding local images are selected and shown. For example, the sample video frames with 5 moments and the corresponding local images are cached according to the matching degree, and after the sample video is played, the sample video frames with the lower matching degree (or score) like 3 moments and the corresponding local images are selected and shown.

The showing mode of the practice evaluation interface may refer to the above embodiments.

The showing mode of the practice evaluation interface may refer to the above embodiments.

The embodiments of the present application further provides a display apparatus, including:

a display screen, configured to display a first display interface and a second display interface, where the first display interface includes a playing control for controlling playing of an sample video, and the second display interface includes a first playing window for playing the sample video and a second playing window for playing local images collected by a camera; the camera, configured to collect the local images; and a controller, configured to:

receive a confirmation operation on the playing control, start the camera, and load video data of the sample video;

in response to the confirmation operation, display the second interface;

in the playing process of the sample video, when a tag indicating that playing time of the sample video reaches a preset moment is detected, intercept a current video frame of a collected local video and at least one video frame adjacent to the current video frame in time;

recognize joint points of the current video frame and joint points of the at least one video frame;

compare the joint points of the current video frame with joint points of an sample video frame corresponding to the preset moment in the sample video; compare the joint points of the at least one video frame with the joint points of the sample video frame corresponding to the preset moment in the sample video;

mark a difference degree of human actions between the current video frame or the at least one video frame according to a comparison result; and cache the marked current video frame or the at least one marked video frame with the difference degree of human actions lower than a difference threshold value, and the sample video frame so as to show an exercise evaluation interface.

The embodiments of the present application further provide a display apparatus, including:

a display screen, configured to display a first display interface and a second display interface, where the first display interface includes a playing control for controlling playing of an sample video, and the second display interface includes a first playing window for playing the sample video and a second playing window for playing local images collected by a camera;

the camera, configured to collect the local images; and a controller, configured to:

receive a confirmation operation on the playing control, start the camera, and load video data of the sample video; and in response to the confirmation operation, show the second interface, play the sample video in the first playing window, and play the local images with joint points marked in the second playing window, where in the local images with the joint points marked, first joint points are marked in first color, second joint points are marked in second color, and a difference degree of actions between the body part where the first joint points are located and the corresponding body part in the sample video is greater than that between the body part where the second joint points are located and the corresponding body part in the sample video.

The embodiments of the present application further provide an interface display method, including:

when a first interface is displayed, receiving a confirmation operation on a playing control in the first interface, starting a camera, and loading video data of an sample video; and in response to the confirmation operation, displaying a second interface, playing the sample video in a first playing window in the second interface, and playing local images in a second playing window in the second interface.

The embodiments of the present application further provide an interface display method, including:

when a first interface is displayed, receiving a confirmation operation on a playing control, starting a camera, and loading video data of an sample video;

in response to the confirmation operation, displaying a second interface;

in the playing process of the sample video, when a tag indicating that playing time of the sample video reaches a preset moment is detected, intercepting a current video frame of a collected local video and at least one video frame adjacent to the current video frame in time, where the video frames may also be called images in the embodiments of the present application;

recognizing joint points of the current video frame and joint points of the at least one video frame;

comparing the joint points of the current video frame with joint points of an sample video frame corresponding to the preset moment in the sample video; comparing the joint points of the at least one video frame with the joint points of the sample video frame corresponding to the preset moment in the sample video;

marking a difference degree of human actions between the current video frame or the at least one video frame according to a comparison result;

caching the marked current video frame or the at least one marked video frame with the difference degree of human actions lower than a difference threshold value, and the sample video frame; and in response to the end of playing of the sample video, displaying an exercise evaluation interface, where the exercise evaluation interface displays the marked current video frame or the at least one marked video frame with a lower difference degree of human actions, and the sample video frame.

The embodiments of the present application further provide an interface display method, including:

when a first interface is displayed, receiving a confirmation operation on a playing control in the first interface, starting a camera, and loading video data of an sample video; and in response to the confirmation operation, displaying a second interface, playing the sample video in a first playing window in the second interface, and playing local images with joint points marked in a second playing window in the second interface, where in the local images with the joint points marked, first joint points are marked in first color, second joint points are marked in second color, and a difference degree of actions between the body part where the first joint points are located and the corresponding body part in the sample video is greater than that between the body part where the second joint points are located and the corresponding body part in the sample video.

In specific implementations, the present application further provides a computer non-volatile storage medium. The computer storage medium may store programs, and the programs may include some or all of steps in each embodiment of the methods provided in the present application when the programs are executed. The storage medium may be a magnetic disk, an optical disc, a read-only memory (ROM), or a random access memory (RAM), etc.

What is claimed is:

1. A display apparatus, comprising:

a display, configured to display a user interface, wherein at least one video window is displayed in the user interface, and at least one floating layer is displayed above the video window;

an image collector, configured to collect local images; and a controller, configured to:

control the image collector to collect the local images to generate a local video stream in response to a preset instruction;

play a local video picture in the video window, and display a graphic element for identifying a preset expected position in the floating layer above the local video picture;

in response to at least one moving object existing in the local video picture and an offset of a target position of the moving object in the local video picture relative to the expected position being greater than a preset threshold value, present a prompt control for guiding the moving object to move to the expected position in the floating layer above the local video picture according to the offset of the target position relative to the expected position; and in response to the moving object existing in the local video picture and the offset of the target position of the moving object relative to the expected position being not greater than the preset threshold value, cancel displaying of the graphic element and the prompt control;

set a first video window for playing a sample video at a first speed and a second video window for playing the local video picture in the user interface;

acquire a type identifier of the sample video;

in response to the type identifier being a preset type for requiring a higher practice capability, adjust a playing speed of the sample video from the first speed to a second speed lower than the first speed when key clips of the sample video start to play, and play audio data of the key clips at the first speed repeatedly during playing video data of the key clips at the second speed, wherein the sample video comprises one or more key clips and one or more non-key clips; and in response to the type identifier being not the preset type, maintain the playing speed of the sample video at the first speed until a user manually adjusts the first speed.

2. The display apparatus according to claim 1, wherein the controller is further configured to:

before presenting the prompt control for guiding the moving object to move to the expected position in the floating layer above the local video picture, detect whether the moving object exists in the local video picture;

in response to the moving object existing in the local video picture, acquire position coordinates of the moving object and the expected position in a preset coordinate system; and calculate an offset of the target position relative to the expected position according to the position coordinates of the moving object and the expected position in the preset coordinate system.

3. The display apparatus according to claim 2, wherein the controller is further configured to:

recognize a target contour from the local video picture, wherein the target contour comprises a trunk part and/or a target reference point; and acquire position coordinates of the trunk part and/or the target reference point in the preset coordinate system;

wherein the graphic element for identifying the expected position comprises a graphic trunk part and/or a graphic reference point, and the graphic reference point corresponds to the target reference point.

4. The display apparatus according to claim 1, wherein the controller is further configured to:
   determine a move direction of the moving target according to the offset of the target position relative to the expected position, wherein the move direction points to the expected position; and
   according to the move direction, present an interface prompt for indicating the move direction in the floating layer above the local video picture, and/or play a voice prompt of the move direction.

5. The display apparatus according to claim 4, wherein the controller is further configured to:
   in response to one moving object existing in the local video picture, determine the move direction according to the offset of the target position of the one moving object relative to the expected position; and
   in response to a plurality of moving objects existing in the local video picture, determine the move direction according to a minimum offset of a plurality of offsets corresponding to the plurality of moving objects.

6. The display apparatus according to claim 1,
   wherein the sample video is used for showing actions required to be followed by the moving object when being played;
   wherein the second video window and the first video window are displayed in the user interface in a tile mode.

7. The display apparatus according to claim 6, wherein key actions required to be practiced by a user are shown when the key clips are played.

8. The display apparatus according to claim 7, wherein the controller is further configured to:
   start playing the sample video in the first video window at a first speed;
   when the key clips start to play, adjust a playing speed of the sample video from the first speed to a second speed; and
   when the key clips finish playing, adjust the playing speed of the sample video from the second speed to the first speed;
   wherein the second speed is different from the first speed.

9. The display apparatus according to claim 7, wherein a plurality of groups of start-end tags are disposed on a time axis of the sample video, one key clip corresponds to one group of start-end tags on the time axis, and a group of start-end tags comprises a start tag and an end tag.

10. The display apparatus according to claim 9, wherein the controller is further configured to:
    detect start tags and end tags on the time axis;
    in response to the start tags being detected, adjust the playing speed of the sample video from the first speed to the second speed; and
    in response to the end tags being detected, adjust the playing speed of the sample video from the second speed to the first speed.

11. The display apparatus according to claim 1 wherein the controller is further configured to:
    when the key clips finish playing, adjust a playing speed of video data of a next clip to the first speed, and play audio data of the next clip synchronously at the first speed, wherein the next clip is a file clip located after the key clips and adjacent to the key clips in the sample video.

12. The display apparatus according to claim 6, wherein the controller is further configured to:
    acquire the local video stream, wherein sample actions required to be followed by a user are shown when the sample video is played;
    perform action matching on the sample video and the local video stream to generate a score corresponding to current follow-up process according to a matching degree of the local video stream and the sample video; and
    generate a follow-up result interface according to the score after the sample video finishes playing; wherein an experience score control for showing an experience score is disposed in the follow-up result interface.

13. The display apparatus according to claim 12, wherein the controller is further configured to:
    in response to the score being higher than a highest historical score of the sample video followed by the user, present an experience score updated according to the score in the experience score control; and
    in response to the score being not higher than the highest historical score, present an experience score acquired before the follow-up process in the experience score control.

14. The display apparatus according to claim 13, wherein the sample video comprises a first video frame for showing the sample actions, and the local video stream comprises a second video frame for showing user actions;
    wherein the controller is further configured to:
    match the sample actions shown in the first video frame with the user actions shown in the second video frame to obtain a matching result; and
    determine the score corresponding to the current follow-up process according to the matching result of the first video frame and the second video frame.

15. A method for displaying a user interface comprising at least one video window and at least one floating layer displayed above the video window, wherein the method comprises: controlling an image collector of a display apparatus to collect local images of the display apparatus to generate a local video stream in response to a preset instruction;
    playing a local video picture in the video window, and displaying a graphic element for identifying a preset expected position in the floating layer above the local video picture;
    in response to at least one moving object existing in the local video picture and an offset of a target position of the moving object in the local video picture relative to the expected position being greater than a preset threshold value, presenting a prompt control for guiding the moving object to move to the expected position in the floating layer above the local video picture according to the offset of the target position relative to the expected position; and
    in response to the moving object existing in the local video picture and the offset of the target position of the moving object relative to the expected position being not greater than the preset threshold value, cancelling displaying of the graphic element and the prompt control;
    setting a first video window for playing a sample video at a first speed and a second video window for playing the local video picture in the user interface;
    acquiring a type identifier of the sample video;
    in response to the type identifier being a preset type for requiring a higher practice capability, adjusting a playing speed of the sample video from the first speed to a second speed lower than the first speed when key clips of the sample video start to play, and playing audio data of the key clips at the first speed repeatedly during playing video data of the key clips at the second speed, wherein the sample video comprises one or more key clips and one or more non-key clips; and in response to the type identifier being not the preset type, maintaining the playing speed of the sample video at the first speed until a user manually adjusts the first speed.

16. The method according to claim 15, wherein before presenting the prompt control for guiding the moving object to move to the expected position in the floating layer above the local video picture, the method further comprises:

detecting whether the moving object exists in the local video picture;

in response to the moving object existing in the local video picture, acquiring position coordinates of the moving object and the expected position in a preset coordinate system; and calculating an offset of the target position relative to the expected position according to the position coordinates of the moving object and the expected position in the preset coordinate system.

17. The method according to claim 16, further comprising:

recognizing a target contour from the local video picture, wherein the target contour comprises a trunk part and/or a target reference point; and acquiring position coordinates of the trunk part and/or the target reference point in the preset coordinate system;

wherein the graphic element for identifying the expected position comprises a graphic trunk part and/or a graphic reference point, and the graphic reference point corresponds to the target reference point.

18. The method according to claim 15, further comprising:

determining a move direction of the moving target according to the offset of the target position relative to the expected position, wherein the move direction points to the expected position; and according to the move direction, presenting an interface prompt for indicating the move direction in the floating layer above the local video picture, and/or playing a voice prompt of the move direction.

* * * * *